(12) United States Patent
Liu et al.

(10) Patent No.: US 12,335,945 B2
(45) Date of Patent: Jun. 17, 2025

(54) COMMUNICATION METHOD AND APPARATUS

(71) Applicant: Huawei Technologies Co., Ltd., Shenzhen (CN)

(72) Inventors: Zhe Liu, Shanghai (CN); Hao Tang, Ottawa (CA); Jinlin Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 302 days.

(21) Appl. No.: 17/672,037

(22) Filed: Feb. 15, 2022

(65) Prior Publication Data

US 2022/0174710 A1 Jun. 2, 2022

Related U.S. Application Data

(63) Continuation of application No. PCT/CN2020/109368, filed on Aug. 14, 2020.

(30) Foreign Application Priority Data

Aug. 16, 2019 (CN) .......................... 201910760916.X

(51) Int. Cl.
*H04W 72/1273* (2023.01)
*H04L 5/00* (2006.01)
(Continued)

(52) U.S. Cl.
CPC ....... *H04W 72/1273* (2013.01); *H04L 5/0051* (2013.01); *H04L 27/26025* (2021.01); *H04W 72/0446* (2013.01)

(58) Field of Classification Search
CPC ......... H04W 72/1273; H04W 72/0446; H04W 72/044; H04W 72/23; H04L 5/0051;
(Continued)

(56) References Cited

U.S. PATENT DOCUMENTS

2015/0117291 A1 4/2015 Seo et al.
2015/0181572 A1 6/2015 Guo et al.
(Continued)

FOREIGN PATENT DOCUMENTS

CN 103874207 A 6/2014
CN 110034883 A 7/2019
(Continued)

OTHER PUBLICATIONS

"3rd Generation Partnership Project; Technical Specification Group Radio Access Network; Evolved Universal Terrestrial Radio Access (E-UTRA); User Equipment (UE) radio transmission and reception (Release 14)," 3GPP TS 36.101 V14.4.0, Jun. 2017, 1389 pages.
(Continued)

*Primary Examiner* — Sharmin Chowdhury
(74) *Attorney, Agent, or Firm* — Slater Matsil, LLP

(57) ABSTRACT

A communication method and apparatus, the method including receiving first indication information sent by a network device, where the first indication information is used to indicate a time domain position of a demodulation reference signal (DMRS) set on a physical downlink shared channel (PDSCH), and the DMRS set includes N DMRSs, where a quantity of candidate PDSCHs that meet a first condition in M candidate PDSCHs of the PDSCH is greater than or equal to a first threshold, receiving second indication information sent by the network device, where the second indication information is used to indicate a first PDSCH, and receiving, on the first PDSCH based on the first indication information and the second indication information, data sent by the network device.

21 Claims, 46 Drawing Sheets

(51) Int. Cl.
*H04L 27/26* (2006.01)
*H04W 72/0446* (2023.01)

(58) Field of Classification Search
CPC ............. H04L 27/26025; H04L 5/0053; H04L 5/0044; H04L 5/005; H04L 5/0094; H04L 5/0048; H04L 5/0007
See application file for complete search history.

(56) References Cited

U.S. PATENT DOCUMENTS

| | | | |
|---|---|---|---|
| 2015/0327226 | A1 | 11/2015 | Cheng et al. |
| 2019/0150142 | A1 | 5/2019 | Huang et al. |
| 2019/0200326 | A1 | 6/2019 | Shin et al. |
| 2019/0386801 | A1 | 12/2019 | Ren et al. |
| 2019/0394781 | A1 | 12/2019 | Liu |
| 2021/0067295 | A1* | 3/2021 | Sun ................ H04W 28/26 |
| 2021/0399857 | A1* | 12/2021 | Baldemair ........... H04W 16/14 |
| 2022/0303092 | A1* | 9/2022 | Maki ................ H04L 5/0048 |
| 2023/0344596 | A1* | 10/2023 | Shin ................ H04L 5/005 |

FOREIGN PATENT DOCUMENTS

| | | |
|---|---|---|
| CN | 110035527 A | 7/2019 |
| EP | 3145109 A1 | 3/2017 |
| WO | 2019137274 A1 | 7/2019 |

OTHER PUBLICATIONS

"3rd Generation Partnership Project; Technical Specification Group Radio Access Network; NR; Physical channels and modulation (Release 15)," 3GPP TS 38.211 V15.6.0, Jun. 2019, 97 pages.

"3rd Generation Partnership Project; Technical Specification Group Radio Access Network; NR; Multiplexing and channel coding (Release 15)," 3GPP TS 38.212 V15.6.0, Jun. 2019, 101 pages.

"3rd Generation Partnership Project; Technical Specification Group Radio Access Network; NR; Physical layer procedures for data (Release 15)," 3GPP TS 38.214 V15.6.0, Jun. 2019, 105 pages.

"3rd Generation Partnership Project; Technical Specification Group Radio Access Network; NR; Radio Resource Control (RRC) protocol specification (Release 15)," 3GPP Ts 38.331 V15.6.0, Jun. 2019, 519 pages.

"Simultaneous transmission in sTTI," Source: ZTE, Agenda item: 6.2.1.2.1.4, Document for: Discussion and Decision, 3GPP TSG RAN WG1 Meeting #89, R1-1707274, Hangzhou, P.R. China May 15-19, 2017, 8 pages.

"Remaining Issues on Resource Allocation," Agenda item: 7.1.3.3.1, Source: Nokia, Nokia Shanghai Bell, Document for: Discussion and Decision, 3GPP TSG RAN WG1 Meeting #93, R1-1807280, Busan, South Korea, May 21-25, 2018, 12 pages.

"Enhancements for Dynamic Spectrum Sharing in Rel-16," 3GPP TSG-RAN Meeting #84, RP-191599, Newport Beach, CA, USA, Jun. 3-6, 2019, 2 pages.

Weimin, T., "The Research and Design of 5G New Radio Numerology," Beijing University of Posts and Telecommunications, 2018, 2 pages.

* cited by examiner

COMMUNICATION METHOD AND APPARATUS

CROSS-REFERENCE TO RELATED APPLICATIONS

This application is a continuation of International Application No. PCT/CN2020/109368, filed on Aug. 14, 2020, which claims priority to Chinese Patent Application No. 201910760916.X, filed on Aug. 16, 2019. The aforementioned applications are hereby incorporated by reference in their entireties.

TECHNICAL FIELD

This application relates to the field of communications technologies, and in particular, to a communication method and apparatus.

BACKGROUND

Currently, fifth generation (5G) new radio (NR) supports spectrum resource sharing with long term evolution (LTE). In 5G NR, a symbol occupied by a time domain resource used for physical downlink shared channel (PDSCH) transmission may dynamically change. For example, a start symbol may be the first symbol or any other symbol in a slot or a subframe, and an end symbol may also be any symbol in the slot or the subframe.

How to configure a time domain position of a demodulation reference signal (DMRS) on a PDSCH in 5G NR, to reduce interference to a cell common signal (e.g. cell-specific reference signal, (CRS)) in LTE remains to be studied.

SUMMARY

Embodiments of this application provide a communication method and apparatus, to help reduce mutual interference between a DMRS and a CRS in communication when LTE and NR share a spectrum, and improve transmission performance.

According to a first aspect, an embodiment of this application provides a communication method. The method includes receiving first indication information sent by a network device, where the first indication information is used to indicate a time domain position of a DMRS set on a PDSCH, and the DMRS set includes N DMRSs, where a quantity of candidate PDSCHs that meet a first condition in M candidate PDSCHs of the PDSCH is greater than or equal to a first threshold, the first condition is: a time domain position, obtained based on the first indication information, of a candidate DMRS set on the candidate PDSCH does not overlap a time domain position of a cell common signal CRS set on the candidate PDSCH, and N and M are both positive integers greater than or equal to 2, receiving second indication information sent by the network device, where the second indication information is used to indicate a first PDSCH, and the first PDSCH is a candidate PDSCH that meets the first condition in the M candidate PDSCHs, and receiving, on the first PDSCH based on the first indication information and the second indication information, data sent by the network device.

In this embodiment of this application, due to the time domain position, indicated by the first indication information, of the DMRS set on the PDSCH, the quantity of candidate PDSCHs that meet the first condition is greater than or equal to the first threshold. When LTE and NR share a spectrum resource, the time domain position of the DMRS set on the first PDSCH indicated by the second indication information does not overlap the time domain position of the CRS set. In this way, mutual interference between a DMRS in NR and a CRS in LTE is reduced in communication, and transmission performance is improved.

In a possible design, a quantity of candidate PDSCHs that meet a second condition in the M candidate PDSCHs is less than or equal to a second threshold. The second condition is: a time domain position, obtained based on the first indication information, of a candidate DMRS set on the candidate PDSCH overlaps a time domain position of a CRS set on the candidate PDSCH. Further, due to the time domain position, indicated by the first indication information, of the DMRS set on the PDSCH, the time domain position of the DMRS set on the first PDSCH indicated by the second indication information does not overlap the time domain position of the CRS set.

In a possible design, a frame structure parameter corresponding to the DMRS set is a 15 kHz subcarrier spacing, a 30 kHz subcarrier spacing, a 60 kHz subcarrier spacing, or a 120 kHz subcarrier spacing.

In a possible design, a frame structure parameter corresponding to the CRS set is a 15 kHz subcarrier spacing.

In a possible design, a length of a DMRS in the N DMRSs in time domain is one orthogonal frequency division multiplexing OFDM symbol or K consecutive OFDM symbols, where K is a positive integer greater than or equal to 2.

In a possible design, a length of the PDSCH in time domain is L OFDM symbols, where L is a positive integer greater than or equal to the second threshold.

In a possible design, when N is 2, and the DMRS set includes a first DMRS and a second DMRS, the first indication information is specifically used to indicate a PDSCH mapping type being a type B, L being 9, $l_0$ being 0, $l_0+\Delta l$, and $\Delta l$ being 7, or a PDSCH mapping type being a type B, L being 9, $l_0$ being 0, $l_0+\Delta l$, and $\Delta l$ being 8, or a PDSCH mapping type being a type B, L being 10, $l_0$ being 0, $l_0+\Delta l$, and $\Delta l$ being 7, or a PDSCH mapping type being a type B, L being 10, $l_0$ being 0, $l_0+\Delta l$, and $\Delta l$ being 8, or a PDSCH mapping type being a type B, L being 10, $l_0$ being 0, $l_0+\Delta l$, and $\Delta l$ being 9, where L is used to indicate a total quantity of symbols of the PDSCH, $l_0$ is used to indicate a start symbol of the PDSCH, and $l_0$ is used to indicate a start symbol of the first DMRS on the PDSCH, $\Delta l$ is used to indicate a quantity of symbols between the start symbol of the first DMRS and a start symbol of the second DMRS, and $l_0+\Delta l$ is used to indicate the start symbol of the second DMRS on the PDSCH.

This helps improve reliability of channel estimation.

In a possible, when N is 3, and the DMRS set includes a first DMRS, a second DMRS, and a third DMRS, the first indication information is specifically used to indicate a PDSCH mapping type being a type B, L being 9, $l_0$ being 0, $l_0+\Delta l_1$, $l_0+\Delta l_2$, $\Delta l_1$ being 2, and $\Delta l_2$ being 7, or a PDSCH mapping type being a type B, L being 9, $l_0$ being 0, $l_0+\Delta l_1$, $l_0+\Delta l_2$, $\Delta l_1$ being 3, and $\Delta l_2$ being 7, or a PDSCH mapping type being a type B, L being 9, $l_0$ being 0, $l_0+\Delta l_1$, $l_0+\Delta l_2$, $\Delta l_1$ being 2, and $\Delta l_2$ being 8, or a PDSCH mapping type being a type B, L being 9, $l_0$ being 0, $l_0+\Delta l_1$, $l_0+\Delta l_2$, $\Delta l_1$ being 3, and $\Delta l_2$ being 8, or a PDSCH mapping type being a type B, L being 10, $l_0$ being 0, $l_0+\Delta l_1$, $l_0+\Delta l_2$, $\Delta l_1$ being 2, and $\Delta l_2$ being 7, or a PDSCH mapping type being a type B, L being 10, $l_0$ being 0, $l_0+\Delta l_1$, $l_0+\Delta l_2$, $\Delta l_1$ being 3, and $\Delta l_2$ being 7, or a PDSCH mapping type being a type B, L being 10, $l_0$ being 0, $l_0+\Delta l_1$, $l_0+\Delta l_2$, $\Delta l_1$ being 2, and $\Delta l_2$ being 8, or a PDSCH mapping type being a type B, L being 10, $l_0$ being 0, $l_0+\Delta l_1$, $l_0+\Delta l_2$, $\Delta l_1$ being 3, and $\Delta l_2$ being 8, where L is used to indicate a total quantity of symbols of the PDSCH, $l_0$ is used to indicate a start symbol of the PDSCH, and $l_0$ is used to indicate a start symbol of the first DMRS on the PDSCH, $\Delta l_1$ is used to indicate a quantity of symbols between the start symbol of the first DMRS and a start symbol of the second DMRS, $\Delta l_2$ is used to indicate a quantity of symbols between the start symbol of the first DMRS and a start symbol of the third DMRS, $l_0+\Delta l_1$ is used to indicate the start symbol of the second DMRS on the PDSCH, and $l_0+\Delta l_2$ is used to indicate the start symbol of the third DMRS on the PDSCH.

This helps improve reliability of channel estimation.

In a possible design, when N is 4, and the DMRS set includes a first DMRS, a second DMRS, a third DMRS, and a fourth DMRS, the first indication information is specifically used to indicate a PDSCH mapping type being a type B, L being 9, $l_0$ being 0, $l_0+\Delta l_1$, $l_0+\Delta l_2$, $l_0+\Delta l_3$, $\Delta l_1$ being 3, $\Delta l_2$ being 6, and $\Delta l_3$ being 8, or a PDSCH mapping type being a type B, L being 10, $l_0$ being 0, $l_0+\Delta l_1$, $l_0+\Delta l_2$, $l_0+\Delta l_3$, $\Delta l_1$ being 3, $\Delta l_2$ being 6, and $\Delta l_3$ being 8, or a PDSCH mapping type being a type B, L being 9, $l_0$ being 0, $l_0+\Delta l_1$, $l_0+\Delta l_2$, $l_0+\Delta l_3$, $\Delta l_1$ being 2, $\Delta l_2$ being 4, and $\Delta l_3$ being 7, or a PDSCH mapping type being a type B, L being 10, $l_0$ being 0, $l_0+\Delta l_1$, $l_0+\Delta l_2$, $l_0+\Delta l_3$, $\Delta l_1$ being 2, $\Delta l_2$ being 4, and $\Delta l_3$ being 7, where L is used to indicate a total quantity of symbols of the PDSCH, $l_0$ is used to indicate a start symbol of the PDSCH, and $l_0$ is used to indicate a start symbol of the first DMRS on the PDSCH, $\Delta l_1$ is used to indicate a quantity of symbols between the start symbol of the first DMRS and a start symbol of the second DMRS, $\Delta l_2$ is used to indicate a quantity of symbols between the start symbol of the first DMRS and a start symbol of the third DMRS, $\Delta l_3$ is used to indicate a quantity of symbols between the start symbol of the first DMRS and a start symbol of the fourth DMRS, $l_0+\Delta l_1$ is used to indicate the start symbol of the second DMRS on the PDSCH, $l_0+\Delta l_2$ is used to indicate the start symbol of the third DMRS on the PDSCH, and $l_0+\Delta l_3$ is used to indicate the start symbol of the fourth DMRS on the PDSCH.

This helps improve reliability of channel estimation.

According to a second aspect, an embodiment of this application provides another communication method. The method includes receiving first indication information sent by a network device, where the first indication information is used to indicate a time domain position of a demodulation reference signal DMRS set on a physical downlink shared channel PDSCH, and the DMRS set includes N DMRSs, receiving second indication information sent by the network device, where the second indication information is used to schedule the PDSCH, and receiving, on the PDSCH based on the first indication information and the second indication information, data sent by the network device.

When N is 2, and the DMRS set includes a first DMRS and a second DMRS, the first indication information is specifically used to indicate a PDSCH mapping type being a type B, L being 9, $l_0$ being 0, $l_0+\Delta l$, and $\Delta l$ being 7, or a PDSCH mapping type being a type B, L being 9, $l_0$ being 0, $l_0+\Delta l$, and $\Delta l$ being 8, or a PDSCH mapping type being a type B, L being 10, $l_0$ being 0, $l_0+\Delta l$, and $\Delta l$ being 7, or a PDSCH mapping type being a type B, L being 10, $l_0$ being 0, $l_0+\Delta l$, and $\Delta l$ being 8, or a PDSCH mapping type being a type B, L being 10, $l_0$ being 0, $l_0+\Delta l$, and $\Delta l$ being 9, where L is used to indicate a total quantity of symbols of the PDSCH, $l_0$ is used to indicate a start symbol of the PDSCH, and $l_0$ is used to indicate a start symbol of the first DMRS on the PDSCH, $\Delta l$ is used to indicate a quantity of symbols between the start symbol of the first DMRS and a start symbol of the second DMRS, and $l_0+\Delta l$ is used to indicate the start symbol of the second DMRS on the PDSCH.

Alternatively, when N is 3, and the DMRS set includes a first DMRS, a second DMRS, and a third DMRS, the first indication information is specifically used to indicate a PDSCH mapping type being a type B, L being 9, $l_0$ being 0, $l_0+\Delta l_1$, $l_0+\Delta l_2$, $\Delta l_1$ being 2, and $\Delta l_2$ being 7, or a PDSCH mapping type being a type B, L being 9, $l_0$ being 0, $l_0+\Delta l_1$, $l_0+\Delta l_2$, $\Delta l_1$ being 3, and $\Delta l_2$ being 7, or a PDSCH mapping type being a type B, L being 9, $l_0$ being 0, $l_0+\Delta l_1$, $l_0+\Delta l_2$, $\Delta l_1$ being 2, and $\Delta l_2$ being 8, or a PDSCH mapping type being a type B, L being 9, $l_0$ being 0, $l_0+\Delta l_1$, $l_0+\Delta l_2$, $\Delta l_1$ being 3, and $\Delta l_2$ being 8, or a PDSCH mapping type being a type B, L being 10, $l_0$ being 0, $l_0+\Delta l_1$, $l_0+\Delta l_2$, $\Delta l_1$ being 2, and $\Delta l_2$ being 7, or a PDSCH mapping type being a type B, L being 10, $l_0$ being 0, $l_0+\Delta l_1$, $l_0+\Delta l_2$, $\Delta l_1$ being 3, and $\Delta l_2$ being 7, or a PDSCH mapping type being a type B, L being 10, $l_0$ being 0, $l_0+\Delta l_1$, $l_0+\Delta l_2$, $\Delta l_1$ being 2, and $\Delta l_2$ being 8, or a PDSCH mapping type being a type B, L being 10, $l_0$ being 0, $l_0+\Delta l_1$, $l_0+\Delta l_2$, $\Delta l_1$ being 3, and $\Delta l_2$ being 8, where L is used to indicate a total quantity of symbols of the PDSCH, $l_0$ is used to indicate a start symbol of the PDSCH, and $l_0$ is used to indicate a start symbol of the first DMRS on the PDSCH, $\Delta l_1$ is used to indicate a quantity of symbols between the start symbol of the first DMRS and a start symbol of the second DMRS, $\Delta l_2$ is used to indicate a quantity of symbols between the start symbol of the first DMRS and a start symbol of the third DMRS, $l_0+\Delta l_1$ is used to indicate the start symbol of the second DMRS on the PDSCH, and $l_0+\Delta l_2$ is used to indicate the start symbol of the third DMRS on the PDSCH.

Alternatively, when N is 4, and the DMRS set includes a first DMRS, a second DMRS, a third DMRS, and a fourth DMRS, the first indication information is specifically used to indicate a PDSCH mapping type being a type B, L being 9, $l_0$ being 0, $l_0+\Delta l_1$, $l_0+\Delta l_2$, $l_0+\Delta l_3$, $\Delta l_1$ being 3, $\Delta l_2$ being 6, and $\Delta l_3$ being 8, or a PDSCH mapping type being a type B, L being 10, $l_0$ being 0, $l_0+\Delta l_1$, $l_0+\Delta l_2$, $l_0+\Delta l_3$, $\Delta l_1$ being 3, $\Delta l_2$ being 6, and $\Delta l_3$ being 8, or a PDSCH mapping type being a type B, L being 9, $l_0$ being 0, $l_0+\Delta l_1$, $l_0+\Delta l_2$, $l_0+\Delta l_3$, $\Delta l_1$ being 2, $\Delta l_2$ being 4, and $\Delta l_3$ being 7, or a PDSCH mapping type being a type B, L being 10, $l_0$ being 0, $l_0+\Delta l_1$, $l_0+\Delta l_2$, $l_0+\Delta l_3$, $\Delta l_1$ being 2, $\Delta l_2$ being 4, and $\Delta l_3$ being 7, where L is used to indicate a total quantity of symbols of the PDSCH, $l_0$ is used to indicate a start symbol of the PDSCH, and $l_0$ is used to indicate a start symbol of the first DMRS on the PDSCH, $\Delta l_1$ is used to indicate a quantity of symbols between the start symbol of the first DMRS and a start symbol of the second DMRS, $\Delta l_2$ is used to indicate a quantity of symbols between the start symbol of the first DMRS and a start symbol of the third DMRS, $\Delta l_3$ is used to indicate a quantity of symbols between the start symbol of the first DMRS and a start symbol of the fourth DMRS, $l_0+\Delta l_1$ is used to indicate the start symbol of the second DMRS on the PDSCH, $l_0+\Delta l_2$ is used to indicate the start symbol of the third DMRS on the PDSCH, and $l_0+\Delta l_3$ is used to indicate the start symbol of the fourth DMRS on the PDSCH.

According to a third aspect, an embodiment of this application provides another communication method. The method includes sending first indication information to a terminal device, where the first indication information is used to indicate a time domain position of a demodulation reference signal DMRS set on a physical downlink shared channel PDSCH, and the DMRS set includes N DMRSs, where a quantity of candidate PDSCHs that meet a first condition in M candidate PDSCHs of the PDSCH is greater than or equal to a first threshold, the first condition is: a time domain position, obtained based on the first indication information, of a candidate DMRS set on the candidate PDSCH does not overlap a time domain position of a cell common signal CRS set on the candidate PDSCH, and N and M are both positive integers greater than or equal to 2, sending second indication information to the terminal device, where the second indication information is used to indicate a first PDSCH, and the first PDSCH is a candidate PDSCH that meets the first condition in the M candidate PDSCHs, and sending data to the terminal device on the first PDSCH.

In a possible design, a quantity of candidate PDSCHs that meet a second condition in the M candidate PDSCHs is less than or equal to a second threshold. The second condition is: a time domain position, obtained based on the first indication information, of a candidate DMRS set on the candidate PDSCH overlaps a time domain position of a CRS set on the candidate PDSCH.

In a possible design, a frame structure parameter corresponding to the DMRS set is a 15 kHz subcarrier spacing, a 30 kHz subcarrier spacing, a 60 kHz subcarrier spacing, or a 120 kHz subcarrier spacing.

In a possible design, a frame structure parameter corresponding to the CRS set is a 15 kHz subcarrier spacing.

In a possible design, a length of a DMRS in the N DMRSs in time domain is one orthogonal frequency division multiplexing OFDM symbol or K consecutive OFDM symbols, where K is a positive integer greater than or equal to 2.

In a possible design, a length of the PDSCH in time domain is L OFDM symbols, where L is a positive integer greater than or equal to the second threshold.

In a possible design, when N is 2, and the DMRS set includes a first DMRS and a second DMRS, the first indication information is specifically used to indicate a PDSCH mapping type being a type B, L being 9, $l_0$ being 0, $l_0+\Delta l$, and $\Delta l$ being 7, or a PDSCH mapping type being a type B, L being 9, $l_0$ being 0, $l_0+\Delta l$, and $\Delta l$ being 8, or a PDSCH mapping type being a type B, L being 10, $l_0$ being 0, $l_0+\Delta l$, and $\Delta l$ being 7, or a PDSCH mapping type being a type B, L being 10, $l_0$ being 0, $l_0+\Delta l$, and $\Delta l$ being 8, or a PDSCH mapping type being a type B, L being 10, $l_0$ being 0, $l_0+\Delta l$, and $\Delta l$ being 9, where L is used to indicate a total quantity of symbols of the PDSCH, $l_0$ is used to indicate a start symbol of the PDSCH, and $l_0$ is used to indicate a start symbol of the first DMRS on the PDSCH, $\Delta l$ is used to indicate a quantity of symbols between the start symbol of the first DMRS and a start symbol of the second DMRS, and $l_0+\Delta l$ is used to indicate the start symbol of the second DMRS on the PDSCH.

In a possible design, when N is 3, and the DMRS set includes a first DMRS, a second DMRS, and a third DMRS, the first indication information is specifically used to indicate a PDSCH mapping type being a type B, L being 9, $l_0$ being 0, $l_0+\Delta l_1$, $l_0+\Delta l_2$, $\Delta l_1$ being 2, and $\Delta l_2$ being 7, or a PDSCH mapping type being a type B, L being 9, $l_0$ being 0, $l_0+\Delta l_1$, $l_0+\Delta l_2$, $\Delta l_1$ being 3, and $\Delta l_2$ being 7, or a PDSCH mapping type being a type B, L being 9, $l_0$ being 0, $l_0+\Delta l_1$, $l_0+\Delta l_2$, $\Delta l_1$ being 2, and $\Delta l_2$ being 8, or a PDSCH mapping type being a type B, L being 9, $l_0$ being 0, $l_0+\Delta l_1$, $l_0+\Delta l_2$, $\Delta l_1$ being 3, and $\Delta l_2$ being 8, or a PDSCH mapping type being a type B, L being 10, $l_0$ being 0, $l_0+\Delta l_1$, $l_0+\Delta l_2$, $\Delta l_1$ being 2, and $\Delta l_2$ being 7, or a PDSCH mapping type being a type B, L being 10, $l_0$ being 0, $l_0+\Delta l_1$, $l_0+\Delta l_2$, $\Delta l_1$ being 3, and $\Delta l_2$ being 7, or a PDSCH mapping type being a type B, L being 10, $l_0$ being 0, $l_0+\Delta l_1$, $l_0+\Delta l_2$, $\Delta l_1$ being 2, and $\Delta l_2$ being 8, or a PDSCH mapping type being a type B, L being 10, $l_0$ being 0, $l_0+\Delta l_1$, $l_0+\Delta l_2$, $\Delta l_1$ being 3, and $\Delta l_2$ being 8, where L is used to indicate a total quantity of symbols of the PDSCH, $l_0$ is used to indicate a start symbol of the PDSCH, and $l_0$ is used to indicate a start symbol of the first DMRS on the PDSCH, $\Delta l_1$ is used to indicate a quantity of symbols between the start symbol of the first DMRS and a start symbol of the second DMRS, $\Delta l_2$ is used to indicate a quantity of symbols between the start symbol of the first DMRS and a start symbol of the third DMRS, $l_0+\Delta l_1$ is used to indicate the start symbol of the second DMRS on the PDSCH, and $l_0+\Delta l_2$ is used to indicate the start symbol of the third DMRS on the PDSCH.

In a possible design, when N is 4, and the DMRS set includes a first DMRS, a second DMRS, a third DMRS, and a fourth DMRS, the first indication information is specifically used to indicate a PDSCH mapping type being a type B, L being 9, $l_0$ being 0, $l_0+\Delta l_1$, $l_0+\Delta l_2$, $l_0+\Delta l_3$, $\Delta l_1$ being 3, $\Delta l_2$ being 6, and $\Delta l_3$ being 8, or a PDSCH mapping type being a type B, L being 10, $l_0$ being 0, $l_0+\Delta l_1$, $l_0+\Delta l_2$, $l_0+\Delta l_3$, $\Delta l_1$ being 3, $\Delta l_2$ being 6, and $\Delta l_3$ being 8, or a PDSCH mapping type being a type B, L being 9, $l_0$ being 0, $l_0+\Delta l_1$, $l_0+\Delta l_2$, $l_0+\Delta l_3$, $\Delta l_1$ being 2, $\Delta l_2$ being 4, and $\Delta l_3$ being 7, or a PDSCH mapping type being a type B, L being 10, $l_0$ being 0, $l_0+\Delta l_1$, $l_0+\Delta l_2$, $l_0+\Delta l_3$, $\Delta l_1$ being 2, $\Delta l_2$ being 4, and $\Delta l_3$ being 7, where L is used to indicate a total quantity of symbols of the PDSCH, $l_0$ is used to indicate a start symbol of the PDSCH, and $l_0$ is used to indicate a start symbol of the first DMRS on the PDSCH, $\Delta l_1$ is used to indicate a quantity of symbols between the start symbol of the first DMRS and a start symbol of the second DMRS, $\Delta l_2$ is used to indicate a quantity of symbols between the start symbol of the first DMRS and a start symbol of the third DMRS, $\Delta l_3$ is used to indicate a quantity of symbols between the start symbol of the first DMRS and a start symbol of the fourth DMRS, $l_0+\Delta l_1$ is used to indicate the start symbol of the second DMRS on the PDSCH, $l_0+\Delta l_2$ is used to indicate the start symbol of the third DMRS on the PDSCH, and $l_0+\Delta l_3$ is used to indicate the start symbol of the fourth DMRS on the PDSCH.

According to a fourth aspect, an embodiment of this application provides another communication method. The method includes sending first indication information to a terminal device, where the first indication information is used to indicate a time domain position of a demodulation reference signal DMRS set on a physical downlink shared channel PDSCH, and the DMRS set includes N DMRSs, sending second indication information to the terminal device, where the second indication information is used to schedule the PDSCH, and sending data to the terminal device on the PDSCH.

When N is 2, and the DMRS set includes a first DMRS and a second DMRS, the first indication information is specifically used to indicate a PDSCH mapping type being a type B, L being 9, $l_0$ being 0, $l_0+\Delta l$, and $\Delta l$ being 7, or a PDSCH mapping type being a type B, L being 9, $l_0$ being 0, $l_0+\Delta l$, and $\Delta l$ being 8, or a PDSCH mapping type being a type B, L being 10, $l_0$ being 0, $l_0+\Delta l$, and $\Delta l$ being 7, or a PDSCH mapping type being a type B, L being 10, $l_0$ being 0, $l_0+\Delta l$, and $\Delta l$ being 8, or a PDSCH mapping type being a type B, L being 10, $l_0$ being 0, $l_0+\Delta l$, and $\Delta l$ being 9, where L is used to indicate a total quantity of symbols of the PDSCH, $l_0$ is used to indicate a start symbol of the PDSCH, and $l_0$ is used to indicate a start symbol of the first DMRS on the PDSCH, $\Delta l$ is used to indicate a quantity of symbols between the start symbol of the first DMRS and a start symbol of the second DMRS, and $l_0+\Delta l$ is used to indicate the start symbol of the second DMRS on the PDSCH.

Alternatively, when N is 3, and the DMRS set includes a first DMRS, a second DMRS, and a third DMRS, the first indication information is specifically used to indicate a PDSCH mapping type being a type B, L being 9, $l_0$ being 0, $l_0+\Delta l_1$, $l_0+\Delta l_2$, $\Delta l_1$ being 2, and $\Delta l_2$ being 7, or a PDSCH mapping type being a type B, L being 9, $l_0$ being 0, $l_0+\Delta l_1$, $l_0+\Delta l_2$, $\Delta l_1$ being 3, and $\Delta l_2$ being 7, or a PDSCH mapping type being a type B, L being 9, $l_0$ being 0, $l_0+\Delta l_1$, $l_0+\Delta l_2$, $\Delta l_1$ being 2, and $\Delta l_2$ being 8, or a PDSCH mapping type being a type B, L being 9, $l_0$ being 0, $l_0+\Delta l_1$, $l_0+\Delta l_2$, $\Delta l_1$ being 3, and $\Delta l_2$ being 8, or a PDSCH mapping type being a type B, L being 10, $l_0$ being 0, $l_0+\Delta l_1$, $l_0+\Delta l_2$, $\Delta l_1$ being 2, and $\Delta l_2$ being 7, or a PDSCH mapping type being a type B, L being 10, $l_0$ being 0, $l_0+\Delta l_1$, $l_0+\Delta l_2$, $\Delta l_1$ being 3, and $\Delta l_2$ being 7, or a PDSCH mapping type being a type B, L being 10, $l_0$ being 0, $l_0+\Delta l_1$, $l_0+\Delta l_2$, $\Delta l_1$ being 2, and $\Delta l_2$ being 8, or a PDSCH mapping type being a type B, L being 10, $l_0$ being 0, $l_0+\Delta l_1$, $l_0+\Delta l_2$, $\Delta l_1$ being 3, and $\Delta l_2$ being 8, where L is used to indicate a total quantity of symbols of the PDSCH, $l_0$ is used to indicate a start symbol of the PDSCH, and $l_0$ is used to indicate a start symbol of the first DMRS on the PDSCH, $\Delta l_1$ is used to indicate a quantity of symbols between the start symbol of the first DMRS and a start symbol of the second DMRS, $\Delta l_2$ is used to indicate a quantity of symbols between the start symbol of the first DMRS and a start symbol of the third DMRS, $l_0+\Delta l_1$ is used to indicate the start symbol of the second DMRS on the PDSCH, and $l_0+\Delta l_2$ is used to indicate the start symbol of the third DMRS on the PDSCH.

Alternatively, when N is 4, and the DMRS set includes a first DMRS, a second DMRS, a third DMRS, and a fourth DMRS, the first indication information is specifically used to indicate a PDSCH mapping type being a type B, L being 9, $l_0$ being 0, $l_0+\Delta l_1$, $l_0+\Delta l_2$, $l_0+\Delta l_3$, $\Delta l_1$ being 3, $\Delta l_2$ being 6, and $\Delta l_3$ being 8, or a PDSCH mapping type being a type B, L being 10, $l_0$ being 0, $l_0+\Delta l_1$, $l_0+\Delta l_2$, $l_0+\Delta l_3$, $\Delta l_1$ being 3, $\Delta l_2$ being 6, and $\Delta l_3$ being 8, or a PDSCH mapping type being a type B, L being 9, $l_0$ being 0, $l_0+\Delta l_1$, $l_0+\Delta l_2$, $l_0+\Delta l_3$, $\Delta l_1$ being 2, $\Delta l_2$ being 4, and $\Delta l_3$ being 7, or a PDSCH mapping type being a type B, L being 10, $l_0$ being 0, $l_0+\Delta l_1$, $l_0+\Delta l_2$, $l_0+\Delta l_3$, $\Delta l_1$ being 2, $\Delta l_2$ being 4, and $\Delta l_3$ being 7, where L is used to indicate a total quantity of symbols of the PDSCH, $l_0$ is used to indicate a start symbol of the PDSCH, and $l_0$ is used to indicate a start symbol of the first DMRS on the PDSCH, $\Delta l_1$ is used to indicate a quantity of symbols between the start symbol of the first DMRS and a start symbol of the second DMRS, $\Delta l_2$ is used to indicate a quantity of symbols between the start symbol of the first DMRS and a start symbol of the third DMRS, $\Delta l_3$ is used to indicate a quantity of symbols between the start symbol of the first DMRS and a start symbol of the fourth DMRS, $l_0+\Delta l_1$ is used to indicate the start symbol of the second DMRS on the PDSCH, $l_0+\Delta l_2$ is used to indicate the start symbol of the third DMRS on the PDSCH, and $l_0+\Delta l_3$ is used to indicate the start symbol of the fourth DMRS on the PDSCH.

According to a fifth aspect, an embodiment of this application provides an apparatus. The apparatus includes a processor, configured to implement the method described in the first aspect. The apparatus may further include a memory, configured to store an instruction and data. The memory is coupled to the processor, and when executing a program instruction stored in the memory, the processor can implement the method described in any one of the foregoing aspects and the possible designs of the aspects. The apparatus may further include a communications interface. The communications interface is used by the apparatus to communicate with another device. For example, the communications interface may be a transceiver, a circuit, a bus, a module, or another type of communications interface, and the another device may be a network device or a terminal device.

In a possible design, the apparatus includes a memory, configured to store a program instruction, and a processor, configured to invoke an instruction stored in the memory, so that the apparatus performs the method according to any one of the first aspect and the possible designs of the first aspect of the embodiments of this application, or the method designed in the second aspect of the embodiments of this application, or the method according to any one of the third aspect and the possible designs of the third aspect of the embodiments of this application, or the method designed in the fourth aspect of the embodiments of this application.

According to a sixth aspect, an embodiment of this application further provides a computer-readable storage medium. The computer-readable storage medium includes an instruction. When the instruction is run on a computer, the computer is enabled to perform the method according to any one of the first aspect and the possible designs of the first aspect, or the method designed in the second aspect, or the method according to any one of the third aspect and the possible designs of the third aspect of the embodiments of this application, or the method designed in the fourth aspect of the embodiments of this application.

According to a seventh aspect, an embodiment of this application further provides a chip system. The chip system includes a processor, and may further include a memory, configured to implement the method according to any one of the first aspect and the possible designs of the first aspect, or the method designed in the second aspect, or the method according to any one of the third aspect and the possible designs of the third aspect of the embodiments of this application, or the method designed in the fourth aspect of the embodiments of this application. The chip system may include a chip, or may include a chip and another discrete component.

According to an eighth aspect, an embodiment of this application further provides a computer program product. The computer program product includes an instruction. When the computer program product runs on a computer, the computer is enabled to perform the method according to any one of the first aspect and the possible designs of the first aspect, or the method designed in the second aspect, or the method according to any one of the third aspect and the possible designs of the third aspect of the embodiments of this application, or the method designed in the fourth aspect of the embodiments of this application.

In addition, for technical effects brought by any possible design manner in the second to the eighth aspects, refer to technical effects brought by different design manners in the method part. Details are not described herein again.

DETAILED DESCRIPTION OF ILLUSTRATIVE EMBODIMENTS

Description of Embodiments

Figure 1:
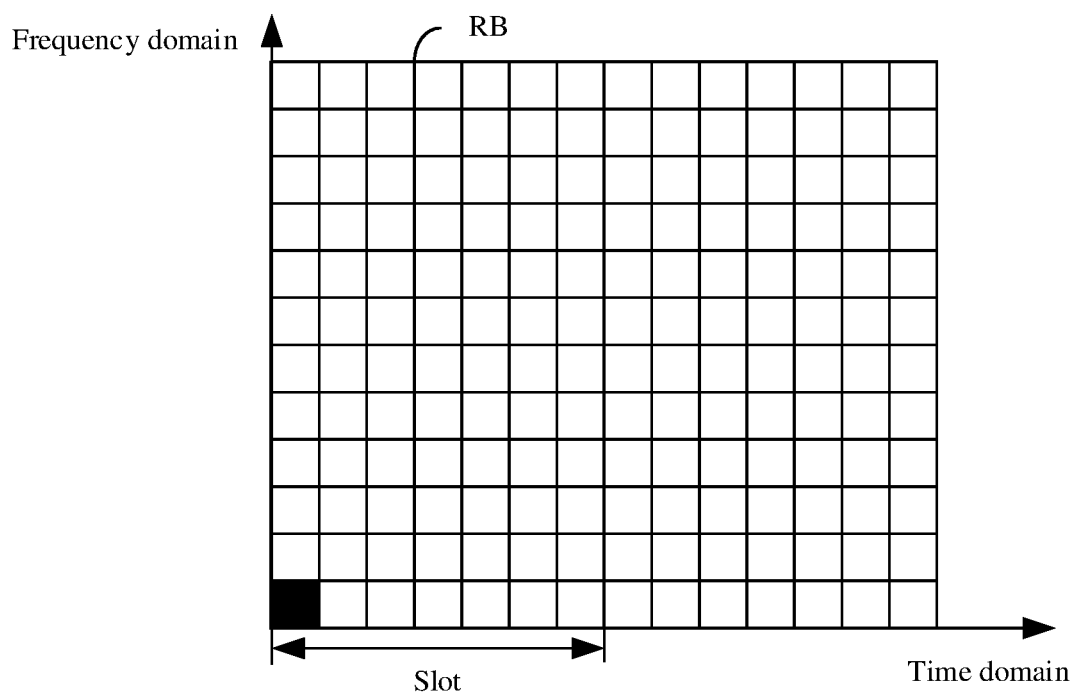
FIG. 1 is a schematic diagram of an RB according to an embodiment of this application.

In embodiments of this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" usually represents an "or" relationship between the associated objects. "At least one of the following items (pieces)" or a similar expression thereof indicates any combination of these items, including a single item (piece) or any combination of a plurality of items (pieces). For example, at least one (piece) of a, b, or c may indicate a, b, c, a and b, a and c, b and c, or a, b, and c, where each of a, b, and c may be an element, or may be a set including one or more elements.

In this application, the term "example", "in some embodiments", "in some other embodiments", or the like is used to represent giving an example, an illustration, or a description. Any embodiment or design scheme described as an "example" in this application should not be explained as being more preferred or having more advantages than another embodiment or design scheme. Exactly, the word "example" is used to present a concept in a specific manner.

In this application, "of", "relevant", and "corresponding" may be interchangeably used sometimes. It should be noted that meanings expressed by the terms are consistent when differences are not emphasized. In the embodiments of this application, "communication" and "transmission" may be interchangeably used sometimes. It should be noted that meanings expressed by the terms are consistent when differences are not emphasized. For example, transmission may include sending and/or receiving, and may be a noun or a verb.

It should be noted that, in the embodiments of this application, the terms "first", "second" and the like are only used for a purpose of description, and cannot be understood as an indication or implication of relative importance or an indication or implication of a sequence.

The following describes some terms in the embodiments of this application, to facilitate understanding by a person skilled in the art.

1. Terminal device: In the embodiments of this application, the terminal device is a device that has a wireless transceiver function, and may be referred to as a terminal, user equipment (UE), a mobile station (MS), a mobile terminal (MT), a vehicle-mounted terminal device, a remote station, a remote terminal device, or the like. A specific form of the terminal device may be a mobile phone, a cellular phone, a cordless phone, a session initiation protocol (SIP) phone, a wearable device, a tablet computer (e.g. pad), a desktop computer, a notebook computer, an all-in-one machine, a vehicle-mounted terminal, a wireless local loop (WLL) station, a personal digital assistant (PDA), or the like. The terminal device may be used in the following scenario: virtual reality (VR), augmented reality (augmented reality, AR), industrial control, self driving, remote surgery, a smart grid, transportation safety, a smart city, a smart home, or the like. The terminal device may be fixed or movable. It should be noted that the terminal device may support at least one wireless communications technology, such as LTE, NR.

2. Network device: In the embodiments of this application, the network device is a device that provides a wireless communication function for the terminal device, and may also be referred to as a radio access network (RAN) device or the like. The network device includes but is not limited to: a next-generation NodeB (gNB) in 5G, an evolved NodeB (eNB), a baseband unit (BBU), a transmission reception point (TRP), a transmission point (TP), a relay station, an access point, and the like. The network device may alternatively be a radio controller, a central unit (CU), a distributed unit (DU), or the like in a cloud radio access network (CRAN) scenario. The network device may support at least one wireless communications technology, such as LTE, NR.

3. Frame structure parameter: The frame structure parameter may also be referred to as a system parameter, a numerology, or the like. For example, the frame structure parameter may include a subcarrier spacing (SCS), a cyclic prefix (CP) type, and/or the like. For example, in NR, different subcarrier spacings, such as a 15 kHz subcarrier spacing, a 30 kHz subcarrier spacing, a 60 kHz subcarrier spacing, a 120 kHz subcarrier spacing, and a 240 kHz subcarrier spacing, are supported. For example, in LTE, a 15 kHz subcarrier spacing is usually supported.

4. Symbol: In the embodiments of this application, the symbol is an orthogonal frequency division multiplexing (OFDM) symbol, and data transmission is usually performed at a granularity of a symbol in time domain, where Duration of one symbol=1/Subcarrier spacing. For example, in LTE, if the 15 kHz subcarrier spacing is supported, duration of one symbol in LTE is $\frac{1}{15}$ kHz=66.7 μs. However, in NR, different subcarrier spacings are supported. Therefore, different subcarrier spacings also correspond to different duration of symbols. For example, duration of a symbol corresponding to the 30 kHz subcarrier spacing is $\frac{1}{30}$ kHz=33.3 μs.

Figure 2A:
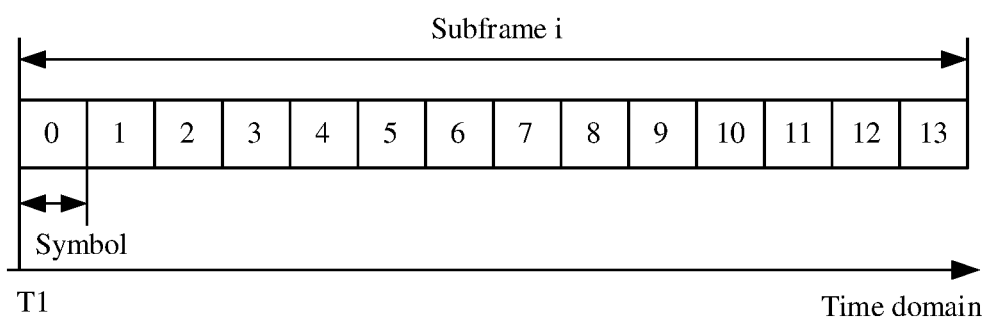
FIG. 2A is a schematic diagram of a subframe in LTE.
Figure 2B:
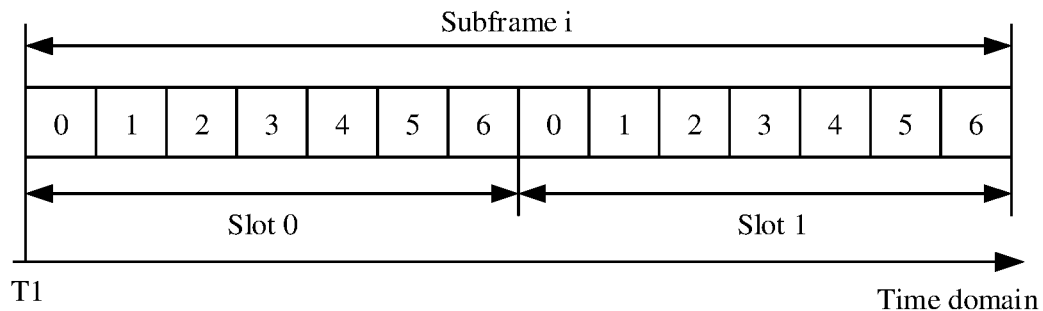
FIG. 2B is a schematic diagram of another subframe in LTE.

5. Resource block (RB): In LTE, resources are scheduled at a granularity of two RBs. For example, as shown in FIG. 1, one RB includes seven symbols in time domain, and includes 12 subcarriers in frequency domain, where a subcarrier spacing is 15 kHz. Specifically, in LTE, one slot may include seven symbols, and one subframe includes 14 symbols. A minimum resource granularity used for data transmission is a resource element (RE). As shown in a black shaded part in FIG. 1, a resource element includes one subcarrier in frequency domain, and includes one symbol in time domain. In addition, in LTE, resources are scheduled at a granularity of a subframe in time domain, and a minimum time granularity used for data transmission in time domain is a symbol. Therefore, to facilitate distinguishing between different symbols in one subframe, different symbols in the subframe may be identified in a time sequence. For example, different symbols are identified by using a subframe as a unit. As shown in FIG. 2A, in LTE, a subframe i includes 14 symbols: a symbol $l_0$, a symbol 1, a symbol 2, a symbol 3, a symbol 4, a symbol 5, a symbol 6, a symbol 7, a symbol 8, a symbol 9, a symbol 10, a symbol 11, a symbol 12, and a symbol 13. For another example, different symbols are identified by using a slot as a unit. As shown in FIG. 2B, in LTE, a subframe i includes a slot 0 and a slot 1, where the slot 0 includes seven symbols: a symbol $l_0$, a symbol 1, a symbol 2, a symbol 3, a symbol 4, a symbol 5, and a symbol 6, the slot 1 includes seven symbols: a symbol $l_0$, a symbol 1, a symbol 2, a symbol 3, a symbol 4, a symbol 5, and a symbol 6, and i is a subframe number, and may be an integer such as 0, 1, or 2.

Figure 3:
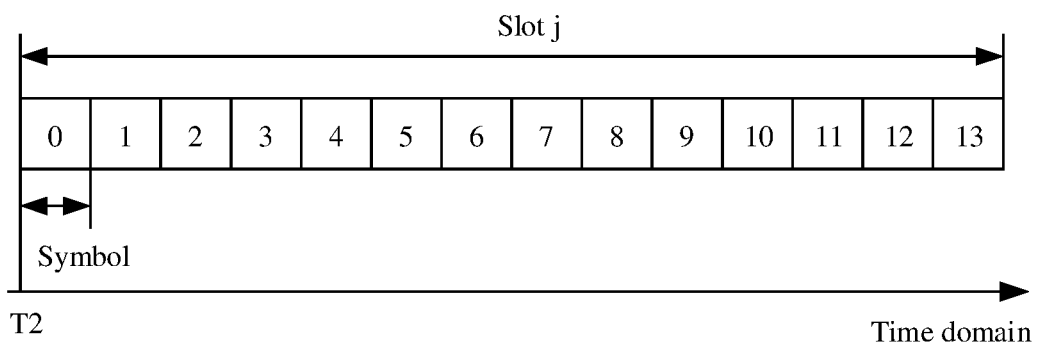
FIG. 3 is a schematic diagram of a slot in NR.

6. Slot: In LTE, one slot includes seven symbols. In NR, a quantity of symbols included in a slot is related to a CP type. For a normal CP, one slot includes 14 symbols, or for an extended CP, one slot includes 12 symbols. It should be noted that a communication method in the embodiments of this application is used in a scenario in which the CP type is the normal CP. In addition, in NR, resources are scheduled at a granularity of a slot in time domain, and a minimum time granularity used for data transmission in time domain is a symbol. Therefore, to facilitate distinguishing between different symbols in one slot, different symbols in the slot may be identified in a time sequence. For example, as shown in FIG. 3, in NR, a slot j includes 14 symbols: a symbol $l_0$, a symbol 1, a symbol 2, a symbol 3, a symbol 4, a symbol 5, a symbol 6, a symbol 7, a symbol 8, a symbol 9, a symbol 10, a symbol 11, a symbol 12, and a symbol 13, where j is a slot number, and may be a positive integer such as 0, 1, or 2.

7. PDSCH: The PDSCH is used to carry downlink data. In NR, in time domain, the PDSCH is usually scheduled in one slot, that is, a length of the PDSCH in time domain (namely, a total quantity of symbols of the PDSCH in time domain, referred to as duration of the PDSCH for short below) does not exceed a length of the slot. For example, if the slot in NR includes 14 symbols, the duration of the PDSCH does not exceed 14 symbols, and may be two symbols, three symbols, four symbols, six symbols, eight symbols, nine symbols, 10 symbols, or the like. For example, the duration of the PDSCH is nine symbols. The PDSCH may also be referred to as a nine-symbol PDSCH. For example, the duration of the PDSCH is three symbols. The PDSCH may also be referred to as a three-symbol PDSCH.

8. Candidate PDSCH: In NR, the candidate PDSCH may be understood as a PDSCH that may be scheduled in one slot. There are different possibilities of scheduling PDSCHs with different duration in the slot. Therefore, the PDSCHs with different duration may have different quantities of candidate PDSCHs. For example, the nine-symbol PDSCH has a maximum of six candidate PDSCHs. For another example, a 10-symbol PDSCH has a maximum of five candidate PDSCHs. The slot j shown in FIG. 3 is used as an example. A 10-symbol PDSCH has a maximum of five candidate PDSCHs: a candidate PDSCH 1, a candidate PDSCH 2, a candidate PDSCH 3, a candidate PDSCH 4, and a candidate PDSCH 5. A start symbol of the candidate PDSCH 1 is the symbol $l_0$ in the slot j, a start symbol of the candidate PDSCH 2 is the symbol 1 in the slot j, a start symbol of the candidate PDSCH 3 is the symbol 2 in the slot j, a start symbol of the candidate PDSCH 4 is the symbol 3 in the slot j, and a start symbol of the candidate PDSCH 5 is the symbol 4 in the slot j.

Figure 4:
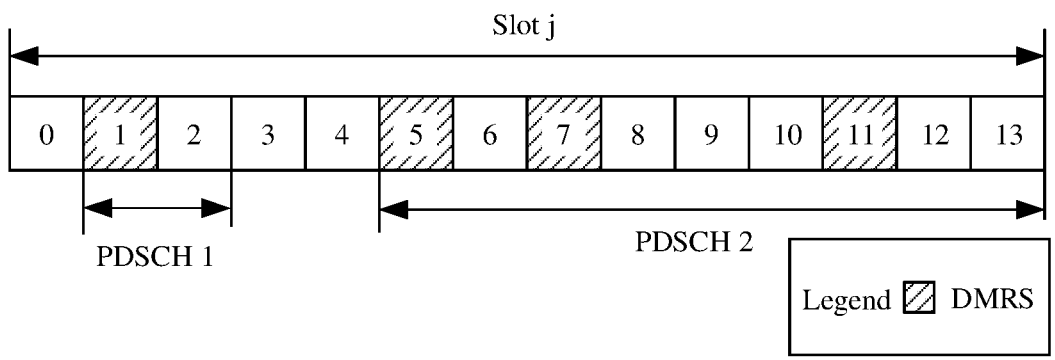
FIG. 4 is a schematic diagram of scheduling PDSCHs with different duration in a slot according to an embodiment of this application.

9. DMRS: In NR, the DMRS may be used by the terminal device to perform downlink channel estimation. A subcarrier occupied by the DMRS on one symbol is related to factors such as a DMRS type and a code division multiplexing (CDM) group number indicated by DCI. In addition, a length of one DMRS in time domain may be one symbol or K consecutive symbols, where a value of K may be 2 or a positive integer greater than 2. It should be noted that, when the length of the DMRS in time domain is one symbol, the DMRS may also be referred to as a single-symbol DMRS, a one-symbol DMRS, or the like, or when the length of the DMRS in time domain is two consecutive symbols, the DMRS may also be referred to as a double-symbol DMRS, a two-symbol DMRS, or the like. In NR, one or more DMRSs may be configured on the PDSCH. Specifically, a quantity of DMRSs configured on the PDSCH may be related to the duration of the PDSCH. Usually, when a channel condition changes rapidly, longer duration of the PDSCH indicates a larger quantity of DMRSs that need to be configured for the PDSCH. In a scenario in which a channel changes rapidly, this helps improve accuracy of downlink channel estimation performed by the terminal device. For example, if the duration of the PDSCH is two symbols or four symbols, one DMRS may be configured. For example, a time domain position of the DMRS on the PDSCH may be a start symbol of the PDSCH. As shown in FIG. 4, duration of a PDSCH 1 is two symbols, a time domain position of a one-symbol DMRS on the PDSCH 1 is a start symbol of the PDSCH 1, and the start symbol of the PDSCH 1 is a symbol 1 in a slot j. For another example, if the duration of the PDSCH is nine symbols or 10 symbols, two, three, or four DMRSs may be configured. For example, as shown in FIG. 4, duration of a PDSCH 2 is nine symbols, three one-symbol DMRSs are configured on the PDSCH 2, and time domain positions of the three one-symbol DMRSs are respectively a start symbol of the PDSCH 2, the third symbol of the PDSCH 2, and the seventh symbol of the PDSCH 2. The start symbol of the PDSCH 2 is a symbol 5 in the slot j, the third symbol of the PDSCH 2 is a symbol 7 in the slot j, and the seventh symbol of the PDSCH 2 is a symbol 11 in the slot j. In the slot j, a DMRS on the symbol 5 is a DMRS located at the first time domain position on the PDSCH 2, and may be referred to as the first DMRS on the PDSCH 2, and DMRSs on the symbols 7 and 11 may be referred to as additional DMRSs. It should be understood that a DMRS on the PDSCH other than the DMRS on the start symbol of the PDSCH may be referred to as an additional DMRS.

In time domain, a time domain position of the first DMRS on the PDSCH is related to a PDSCH mapping type. In NR, the PDSCH mapping type includes a type A or a type B. For example, a PDSCH is scheduled in a slot i, where i may be a positive integer such as 0, 1, or 2. When the PDSCH mapping type is the type A, in time domain, the time domain position of the first DMRS on the PDSCH may be a symbol 2 or a symbol 3 in the slot i, and a start symbol of the PDSCH may be a symbol $l_0$, a symbol 1, a symbol 2, or a symbol 3 in the slot i, and is usually not located after the time domain position of the first DMRS. In the mapping type, duration of the PDSCH may be a minimum of three symbols, or may be a maximum of 14 symbols. When the PDSCH mapping type is the type B, the time domain position of the first DMRS on the PDSCH is a start symbol of the PDSCH, and the start symbol of the PDSCH may be any of a symbol $l_0$ to a symbol 12 in the slot i, and is related to scheduling of the network device. In the mapping type, duration of the PDSCH may be two symbols, four symbols, seven symbols, nine symbols, 10 symbols, or the like.

Figure 5:
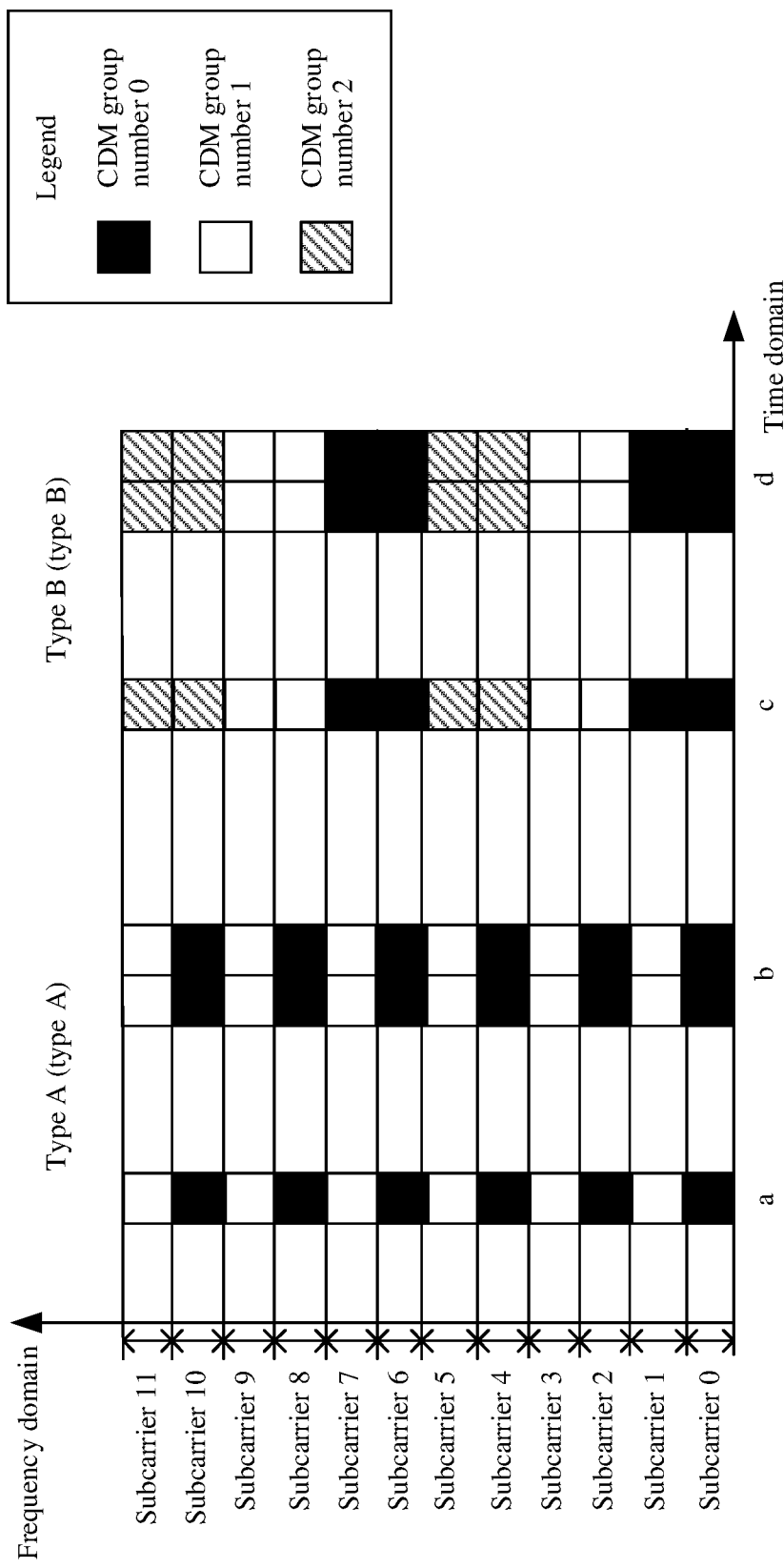
FIG. 5 is a schematic diagram of a DMRS pattern according to an embodiment of this application.

In addition, different PDSCH mapping types indicate different DMRS patterns. For example, a one-symbol DMRS is used as an example. When the PDSCH mapping type is the type A, if the CDM group number is 0 or 1, a pattern in which the DMRS occupies subcarriers on one symbol may be shown in a in FIG. 5. It can be learned from a in FIG. 5 that, when the CDM group number is 0, the subcarriers occupied by the DMRS on the symbol are subcarriers 0, 2, 4, 6, 8, and 10, or when the CDM group number is 1, the subcarriers occupied by the DMRS on the symbol are subcarriers 1, 3, 5, 7, 9, and 11. For another example, a two-symbol DMRS is used as an example. When the PDSCH mapping type is the type A, if the CDM group number is 0 or 1, a pattern in which the DMRS occupies subcarriers on two consecutive symbols may be shown in b in FIG. 5. It can be learned from b in FIG. 5 that, when the CDM group number is 0, the subcarriers occupied by the DMRS on the two symbols are subcarriers 0, 2, 4, 6, 8, and 10, or when the CDM group number is 1, the subcarriers occupied by the DMRS on the two symbols are subcarriers 1, 3, 5, 7, 9, and 11. For still another example, a one-symbol DMRS is used as an example. When the PDSCH mapping type is the type B, if the CDM group number is 0, 1, or 2, a pattern in which the DMRS occupies subcarriers on one symbol may be shown in c in FIG. 5. It can be learned from c in FIG. 5 that, when the CDM group number is 0, the subcarriers occupied by the DMRS on the symbol are subcarriers 0, 1, 6, and 7, when the CDM group number is 1, the subcarriers occupied by the DMRS on the symbol are subcarriers 2, 3, 8, and 9, or when the CDM group number is 2, the subcarriers occupied by the DMRS on the symbol are subcarriers 4, 5, 10, and 11. For yet another example, a two-symbol DMRS is used as an example. When the PDSCH mapping type is the type B, if the CDM group number is 0, 1 or 2, a pattern in which the DMRS occupies subcarriers on two consecutive symbols may be shown in d in FIG. 5. It can be learned from d in FIG. 5 that, when the CDM group number is 0, the subcarriers occupied by the DMRS on the two symbols are subcarriers 0, 1, 6, and 7, when the CDM group number is 1, the subcarriers occupied by the DMRS on the two symbols are subcarriers 2, 3, 8, and 9, or when the CDM group number is 2, the subcarriers occupied by the DMRS on the two symbols are subcarriers 4, 5, 10, and 11.

Figure 6:
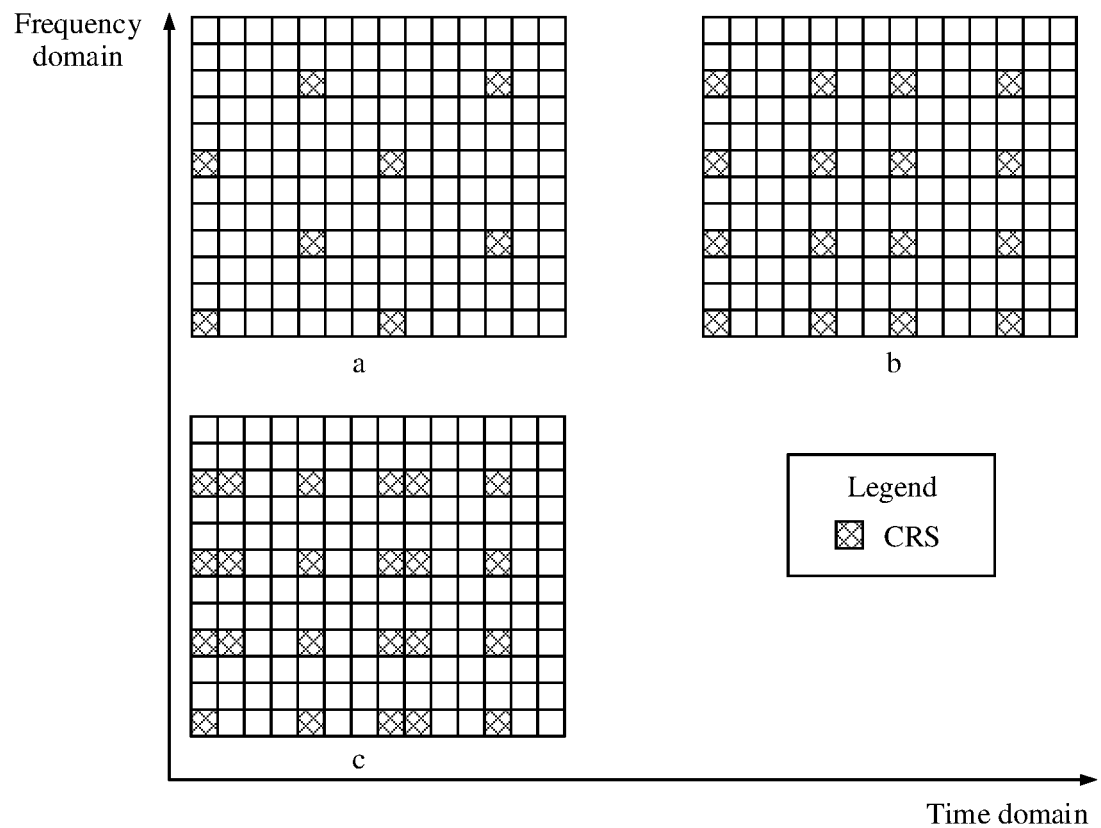
FIG. 6 is a schematic diagram of CRS patterns corresponding to different quantities of antenna ports according to an embodiment of this application.

10. CRS: In LTE, the CRS is used by the terminal device to perform channel estimation, or may be used for downlink channel quality measurement, for example, reference signal received power (RSRP) measurement. After receiving the CRS, the terminal device may perform channel estimation based on the CRS, and demodulate a control channel or a data channel based on a channel estimation result, so that the terminal device obtains control information transmitted on a downlink control channel (PDCCH) or data transmitted on the PDSCH. For example, the network device may send the CRS to the terminal device by using one or more antenna ports, to improve accuracy of channel estimation. Different quantities of antenna ports correspond to CRSs with different patterns. For example, when the quantity of antenna ports is 1, a CRS pattern may be shown in a in FIG. 6, when the quantity of antenna ports is 2, a CRS pattern may be shown in b in FIG. 6, or when the quantity of antenna ports is 4, a CRS pattern may be shown in c in FIG. 6. For an RE used to transmit the CRS, refer to a diagonal filled area.

In addition, an RE actually occupied by the CRS is further related to a shift value of the CRS. The shift value is equal to a result obtained after a physical cell identifier (ID) of a carrier mod 6. The shift value of the CRS indicates a cyclic shift of a CRS resource in frequency domain. For example, the quantity of antenna ports is 1. When the shift value of the CRS is 0, for an RE actually occupied by the CRS, refer to a diagonal filled area shown in a in FIG. 3. For example, the CRS actually occupies the first RE and the seventh RE on the first symbol (namely, the symbol $l_0$). For example, the quantity of antenna ports is 1. When the shift value of the CRS is 1, one subcarrier is cyclically shifted, and REs actually occupied by the CRS on the first symbol are respectively the second RE and the eighth RE. When the quantity of antenna ports is 2 or 4, an RE actually occupied by the CRS may also be obtained based on the pattern and the shift value shown in FIG. 3. Details are not described herein again.

However, a DMRS pattern and a CRS pattern are usually fixed. Therefore, when NR and LTE share a spectrum resource, if a time domain resource occupied by the DMRS conflicts with a time domain resource occupied by the CRS, mutual interference between the DMRS and the CRS is likely to be caused. In other words, channel estimation or channel quality measurement, such as RSRP measurement, performed when the terminal device receives the CRS in LTE is affected, and channel estimation performed when the terminal device receives the DMRS in NR is also affected. In addition, it should be noted that, when NR and LTE share the spectrum resource, NR and LTE are time-aligned in time domain. For example, a start moment of the slot j in NR is the same as a start moment of the subframe i in LTE, where i may be the same as or different from j. For example, the subframe i is shown in FIG. 2A, and a start moment of the subframe i is T1, and the slot j is shown in FIG. 3, and a start moment of the slot j is T2, where T1 is the same as T2. In this case, NR and LTE are time-aligned in the time domain.

In view of this, this application provides a communication method, so that the network device can indicate an appropriate time domain position of a DMRS on the PDSCH to the terminal device, to reduce a possibility that a time domain resource occupied by the DMRS overlaps a time domain resource occupied by the CRS. Therefore, this helps reduce mutual interference between the DMRS and the CRS and improve communication quality.

Figure 7:
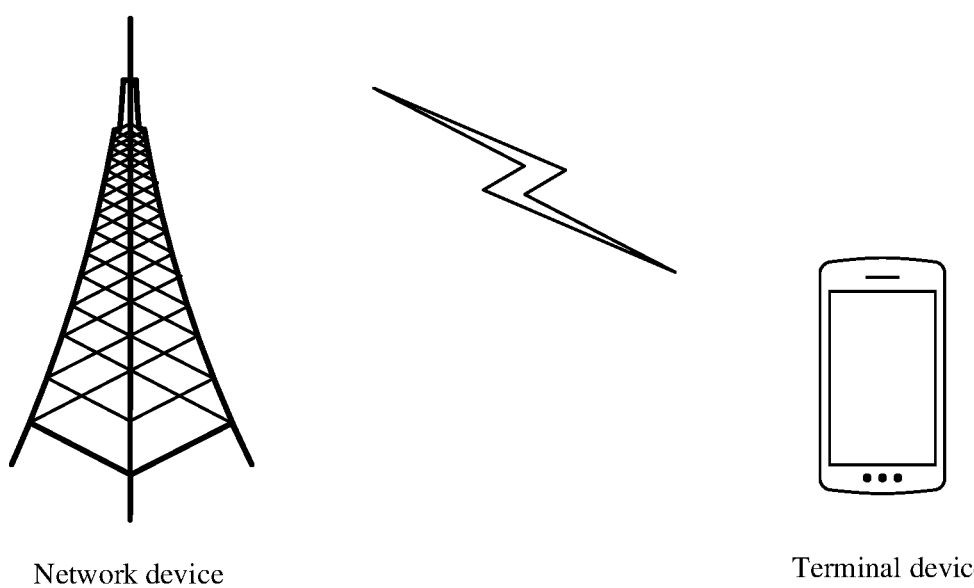
FIG. 7 is a schematic diagram of a network architecture of a communications system according to an embodiment of this application.

The embodiments of this application may be applied to an NR communications system, or may be applied to another communications system, for example, a future mobile communications system (for example, a 6G communications system). For example, FIG. 7 is a schematic diagram of a network architecture of a communications system according to an embodiment of this application. The communications system includes a network device and a terminal device.

It should be noted that, in this embodiment of this application, communication between the network device and the terminal device may be performed by using a licensed spectrum, or may be performed by using an unlicensed spectrum, or may be performed by using both a licensed spectrum and an unlicensed spectrum. This is not limited herein. Communication between the network device and the terminal device and communication between terminal devices may be performed by using a sub-6 gigahertz (GHz) spectrum, or may be performed by using a spectrum above 6 GHz, or may be performed by using both a sub-6 GHz spectrum and a spectrum above 6 GHz. In other words, this application is applicable to both a low-frequency (for example, sub 6G) scenario and a high-frequency (above 6G) scenario.

It should be understood that, the network architecture of the communications system shown in FIG. 7 is merely an example, and constitutes no limitation on the network architecture of the communications system in this embodiment of this application. A quantity of network devices and a quantity of terminal devices in the communications system are not limited in this embodiment of this application. For example, when the communications system in this embodiment of this application includes a plurality of network devices, coordinated multipoint communication may be performed between the network devices. For example, the communications system includes a plurality of macro base stations and a plurality of micro base stations. Coordinated multipoint communication may be performed between the macro base stations, between the micro base stations, or between the macro base station and the micro base station.

The communication method in the embodiments of this application is described in detail by using the network architecture of the communications system shown in FIG. 7 as an example.

Figure 8:
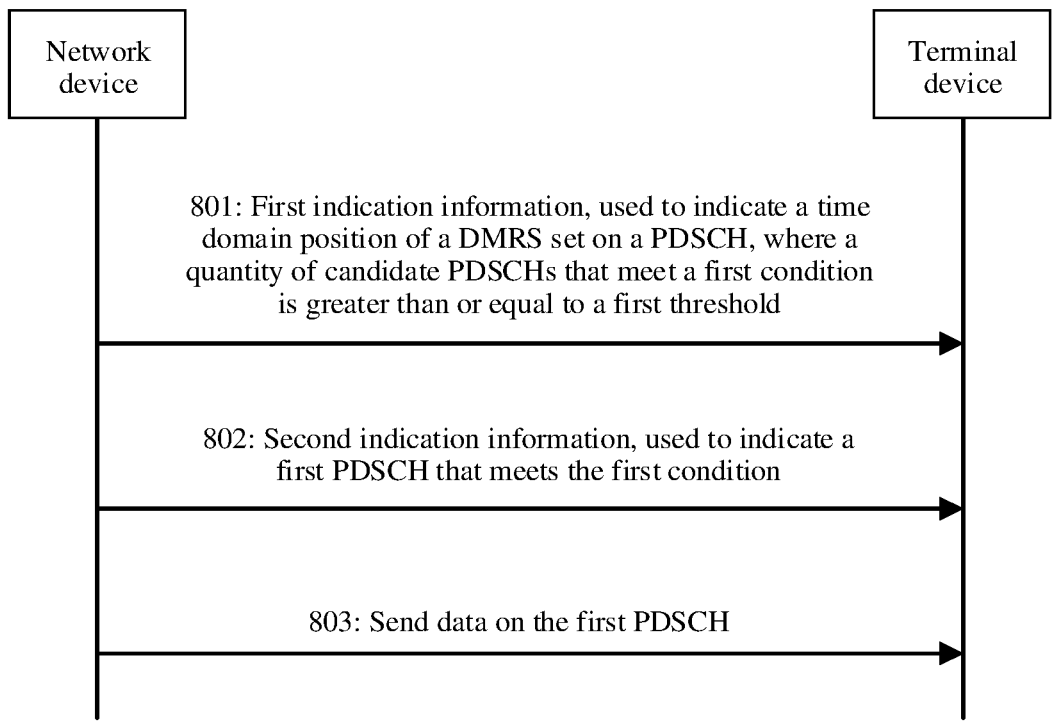
FIG. 8 is a schematic flowchart of a communication method according to an embodiment of this application.

For example, FIG. 8 is a schematic diagram of a communication method according to an embodiment of this application. The communication method specifically includes the following steps.

801: A network device sends first indication information to a terminal device. The first indication information is used to indicate a time domain position of a DMRS set on a PDSCH. The DMRS set includes N DMRSs.

A quantity of candidate PDSCHs that meet a first condition in M candidate PDSCHs of the PDSCH is greater than or equal to a first threshold. The first condition is: a time domain position, obtained based on the first indication information, of a candidate DMRS set on the candidate PDSCH does not overlap a time domain position of a CRS set on the candidate PDSCH. N and M are positive integers greater than or equal to 2. The first threshold may be correspondingly set based on an actual situation. For example, the first threshold may be set to 1 or 2.

For example, the first indication information may be carried in higher layer signaling, for example, radio resource control (RRC) signaling, and is sent by the network device to the terminal device, or may be carried in another message (for example, a customized message), and is sent by the network device to the terminal device. This is not limited.

802: The network device sends second indication information to the terminal device. The second indication information is used to indicate a first PDSCH. The first PDSCH is a candidate PDSCH that meets the first condition in the M candidate PDSCHs.

The second indication information may be carried in DCI or another message (for example, a customized message), and is sent by the network device to the terminal device. In addition, the second indication information may alternatively be understood as scheduling information, namely, information used to schedule the terminal device to perform data communication on the first PDSCH.

803: The terminal device receives the first indication information and the second indication information, and receives, on the first PDSCH based on the first indication information and the second indication information, data sent by the network device.

In some embodiments, a quantity of candidate PDSCHs that meet a second condition in the M candidate PDSCHs is less than or equal to a second threshold. The second condition is: a time domain position, obtained based on the first indication information, of a candidate DMRS set on the candidate PDSCH overlaps a time domain position of a CRS set on the candidate PDSCH.

The following describes this embodiment of this application in detail with reference to an example of a scenario in which LTE and NR share a spectrum resource.

In the scenario in which LTE and NR share a spectrum resource, the DMRS set is used by the terminal device to perform downlink channel estimation in NR, and the CRS set is used by the terminal device to perform downlink channel estimation or channel quality measurement in LTE.

Scenario 1:

For example, a frame structure parameter corresponding to the DMRS set is a 15 kHz subcarrier spacing, and a frame structure parameter corresponding to the CRS set is a 15 kHz subcarrier spacing. It should be noted that, that a frame structure parameter corresponding to the DMRS set is a 15 kHz subcarrier spacing may be understood as that the 15 kHz subcarrier spacing is used in NR, and that a frame structure parameter corresponding to the CRS set is a 15 kHz subcarrier spacing may be understood as that the 15 kHz subcarrier spacing is used in LTE.

Figure 9:
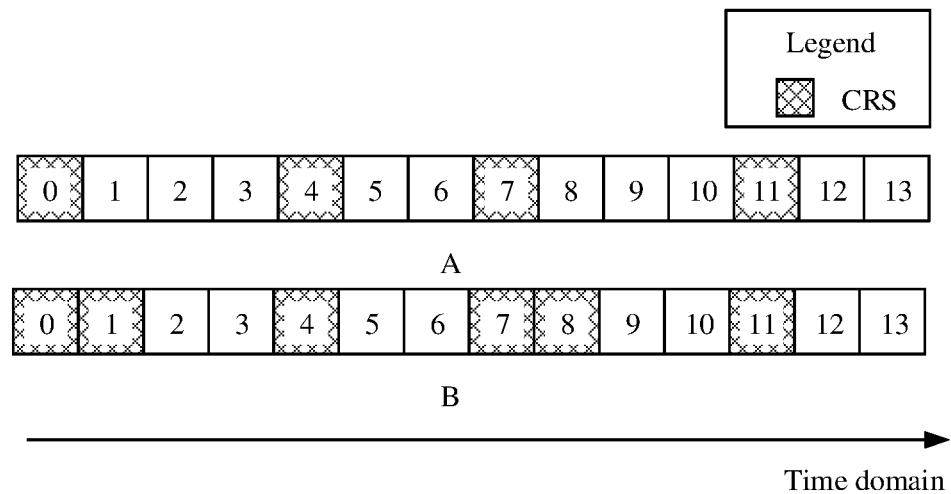
FIG. 9 is a schematic diagram of a time domain position of a CRS in a subframe according to an embodiment of this application.

A subframe i shown in FIG. 2A in LTE is used as an example. A time domain position, on the subframe i, of each CRS in the CRS set may be shown in A in FIG. 9. It may be understood that, when the time domain position, on the subframe i, of each CRS in the CRS set may be shown in A in FIG. 9, a CRS pattern is a CRS pattern shown in a in FIG. 6 when a quantity of antenna ports is 1, or a CRS pattern is a CRS pattern shown in b in FIG. 6 when a quantity of antenna ports is 2. Referring to FIG. 2A, the subframe i includes 14 symbols: a symbol $l_0$ to a symbol 13, and a start moment of the subframe i is T1. For example, in NR, a PDSCH is scheduled based on a type B in a slot j. As shown in FIG. 3, the slot j includes 14 symbols: a symbol $l_0$ to a symbol 13, and a start moment of the slot j is T2. T1 and T2 are a same moment.

In an implementation, when a value of N is 2, the DMRS set includes a first DMRS and a second DMRS. The first DMRS and the second DMRS are one-symbol DMRSs. A time domain position of the first DMRS on the PDSCH is a start symbol $l_0$ of the PDSCH. In this case, a time domain position of the second DMRS on the PDSCH is a symbol $l_0+\Delta l$ of the PDSCH. $\Delta l$ may be understood as a quantity of symbols between a start symbol of the first DMRS and a start symbol of the second DMRS. The start symbol of the first DMRS may be understood as the time domain position of the first DMRS on the PDSCH, and the start symbol of the second DMRS may be understood as the time domain position of the second DMRS on the PDSCH.

Figure 10A:
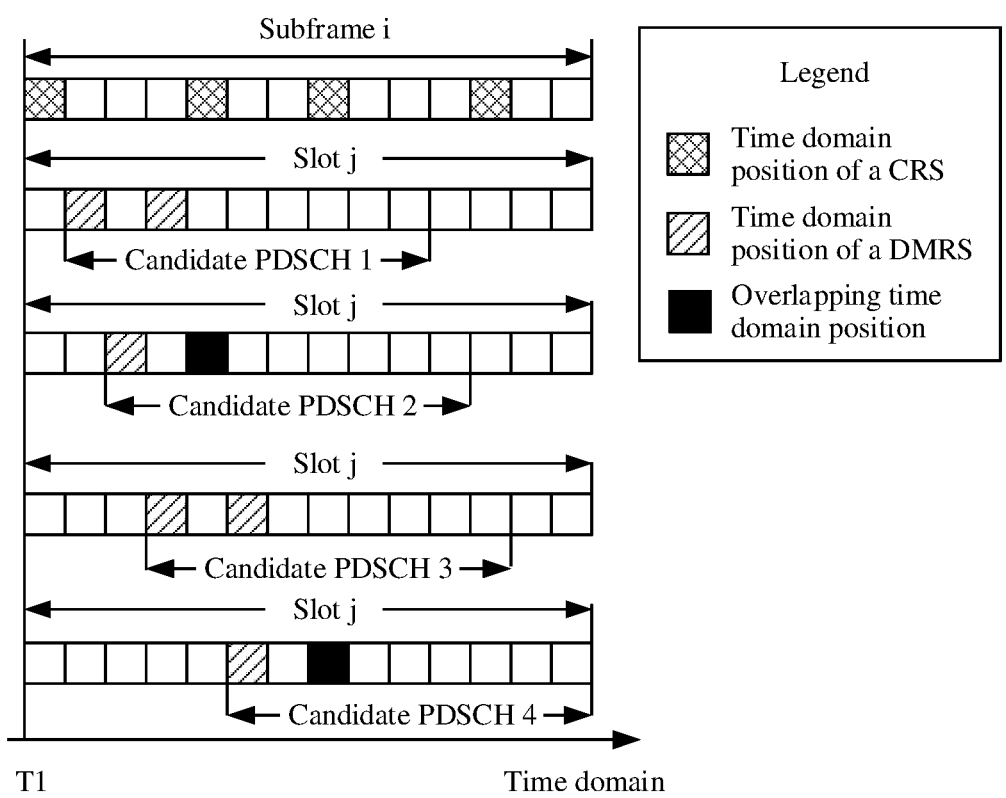
FIG. 10A to FIG. 10H are schematic diagrams of candidate PDSCHs in different scenarios according to an embodiment of this application.

As shown in FIG. 10A, when a nine-symbol PDSCH is scheduled in a slot j, $\Delta l=2$, and a start symbol of a PDSCH does not overlap a time domain position of a CRS set, candidate PDSCHs of the nine-symbol PDSCH are respectively a candidate PDSCH 1, a candidate PDSCH 2, a candidate PDSCH 3, and a candidate PDSCH 4. For example, the candidate PDSCH 1 is used as an example. If a time domain position of a first DMRS on the candidate PDSCH 1 is a symbol 1, a start symbol of the first DMRS is also the symbol 1. If a time domain position of a second DMRS on the candidate PDSCH 2 is a symbol 3, a start symbol of the second DMRS is the symbol 3. It can be learned from FIG. 10A that, for the nine-symbol PDSCH, when $\Delta l=2$, the quantity of candidate PDSCHs that meet the first condition is 2, and the candidate PDSCHs are respectively the candidate PDSCH 1 and the candidate PDSCH 3. When the start symbol of the PDSCH does not overlap the time domain position of the CRS set, the quantity of candidate PDSCHs that meet the second condition is also 2, and the candidate PDSCHs are respectively the candidate PDSCH 2 and the candidate PDSCH 4.

Figure 10B:
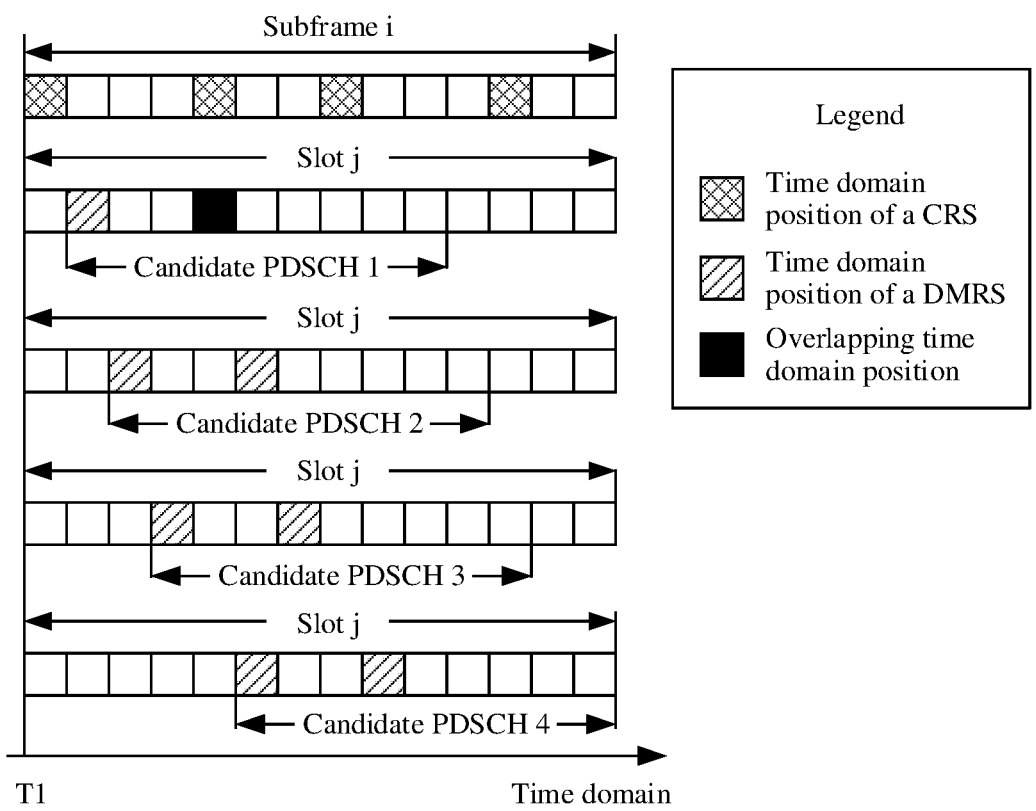

As shown in FIG. 10B, when a nine-symbol PDSCH is scheduled in a slot j, $\Delta l=3$, and a start symbol of a PDSCH does not overlap a time domain position of a CRS set, candidate PDSCHs of the nine-symbol PDSCH are respectively a candidate PDSCH 1, a candidate PDSCH 2, a candidate PDSCH 3, and a candidate PDSCH 4. It can be learned from FIG. 10B that, for the nine-symbol PDSCH, when $\Delta l=3$, the quantity of candidate PDSCHs that meet the first condition is 3, and the candidate PDSCHs are respectively the candidate PDSCH 2, the candidate PDSCH 3, and the candidate PDSCH 4. When the start symbol of the PDSCH does not overlap the time domain position of the CRS set, the quantity of candidate PDSCHs that meet the second condition is 1, and the candidate PDSCH is the candidate PDSCH 1.

Figure 10C:
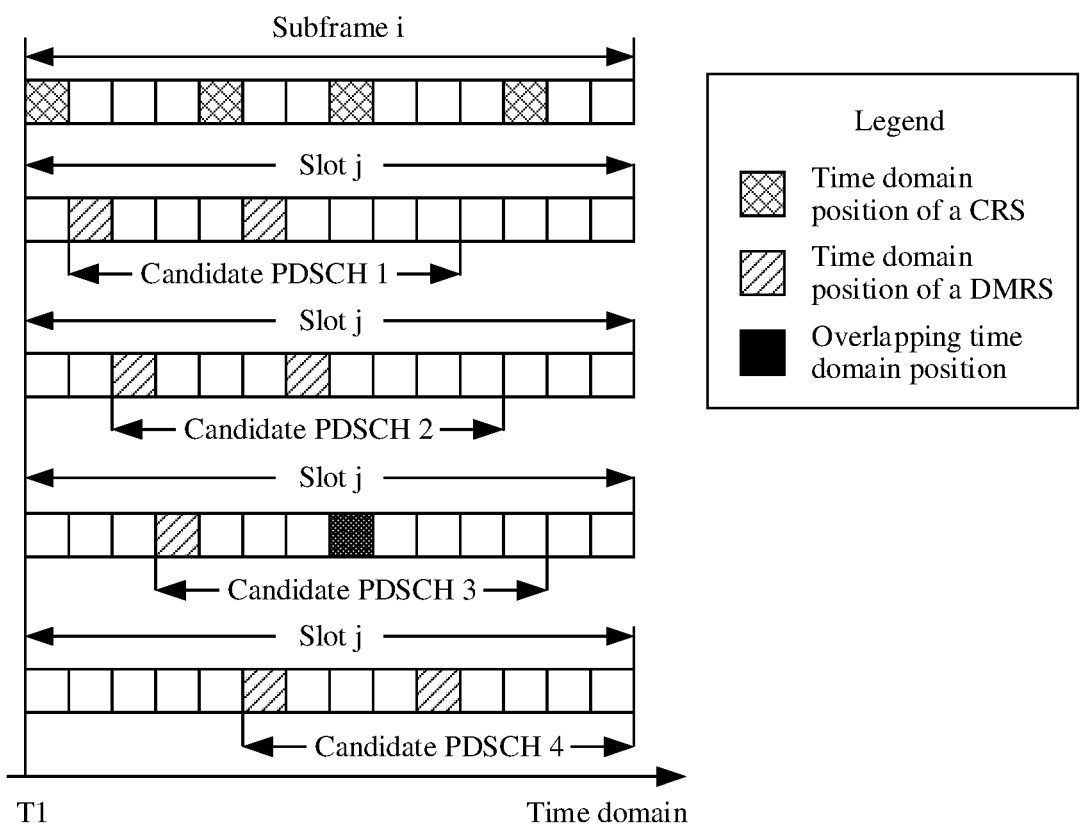

As shown in FIG. 10C, when a nine-symbol PDSCH is scheduled in a slot j, $\Delta l=4$, and a start symbol of a PDSCH does not overlap a time domain position of a CRS set, candidate PDSCHs of the nine-symbol PDSCH are respectively a candidate PDSCH 1, a candidate PDSCH 2, a candidate PDSCH 3, and a candidate PDSCH 4. It can be learned from FIG. 10C that, for the nine-symbol PDSCH, when $\Delta l=4$, the quantity of candidate PDSCHs that meet the first condition is 3, and the candidate PDSCHs are respectively the candidate PDSCH 1, the candidate PDSCH 2, and the candidate PDSCH 4. When the start symbol of the PDSCH does not overlap the time domain position of the CRS set, the quantity of candidate PDSCHs that meet the second condition is 1, and the candidate PDSCH is the candidate PDSCH 3.

Figure 10D:
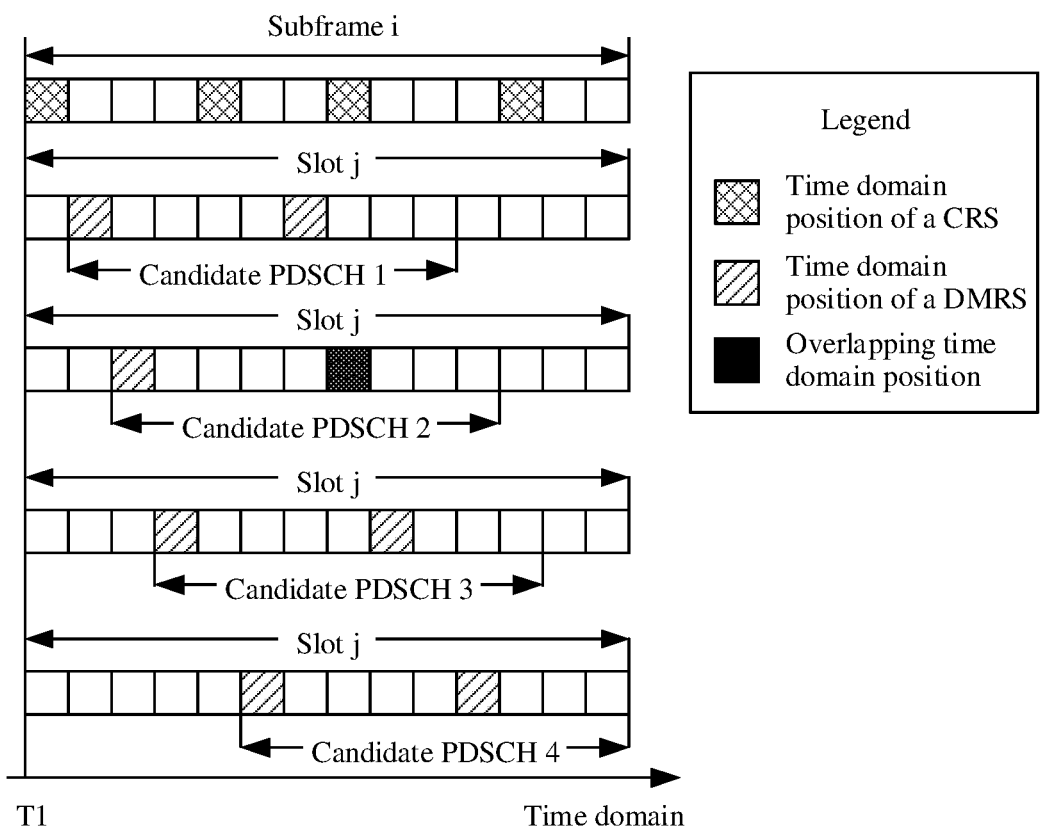

As shown in FIG. 10D, when a nine-symbol PDSCH is scheduled in a slot j, $\Delta l=5$, and a start symbol of a PDSCH does not overlap a time domain position of a CRS set, candidate PDSCHs of the nine-symbol PDSCH are respectively a candidate PDSCH 1, a candidate PDSCH 2, a candidate PDSCH 3, and a candidate PDSCH 4. It can be learned from FIG. 10D that, for the nine-symbol PDSCH, when $\Delta l=5$, the quantity of candidate PDSCHs that meet the first condition is 3, and the candidate PDSCHs are respectively the candidate PDSCH 1, the candidate PDSCH 3, and the candidate PDSCH 4. When the start symbol of the PDSCH does not overlap the time domain position of the CRS set, the quantity of candidate PDSCHs that meet the second condition is 1, and the candidate PDSCH is the candidate PDSCH 2.

Figure 10E:
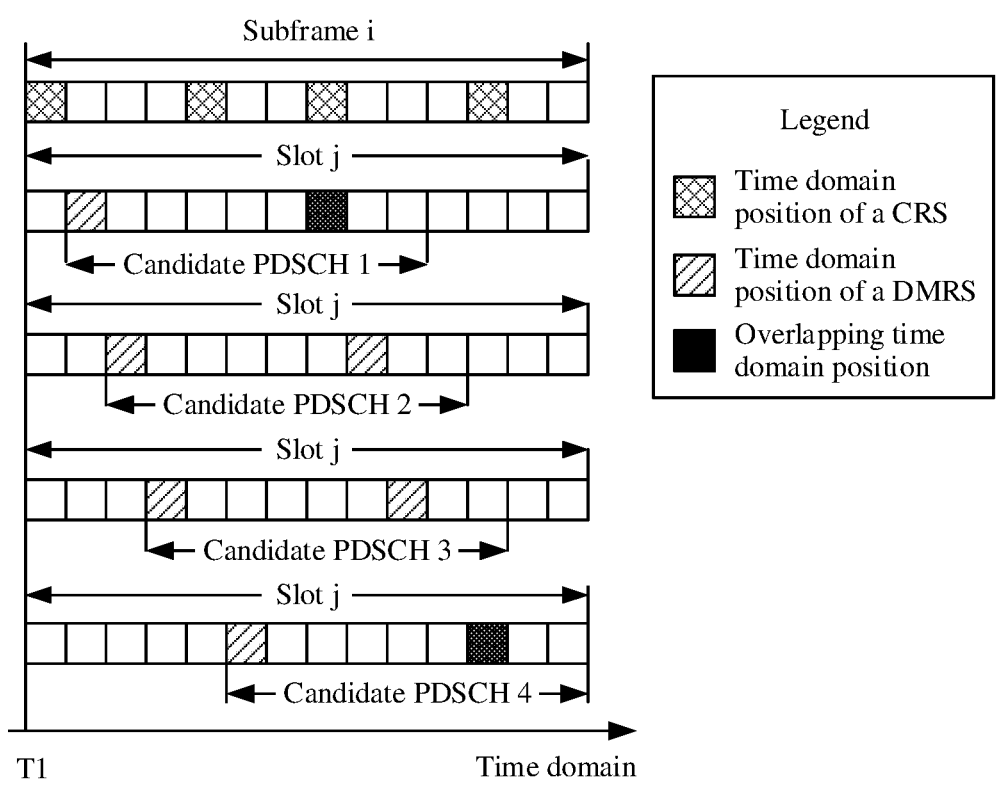

As shown in FIG. 10E, when a nine-symbol PDSCH is scheduled in a slot j, $\Delta l=6$, and a start symbol of a PDSCH does not overlap a time domain position of a CRS set, candidate PDSCHs of the nine-symbol PDSCH are respectively a candidate PDSCH 1, a candidate PDSCH 2, a candidate PDSCH 3, and a candidate PDSCH 4. It can be learned from FIG. 10E that, for the nine-symbol PDSCH, when $\Delta l=6$, the quantity of candidate PDSCHs that meet the first condition is 2, and the candidate PDSCHs are respectively the candidate PDSCH 2 and the candidate PDSCH 3. When the start symbol of the PDSCH does not overlap the time domain position of the CRS set, the quantity of candidate PDSCHs that meet the second condition is 2, and the candidate PDSCHs are respectively the candidate PDSCH 1 and the candidate PDSCH 4.

Figure 10F:
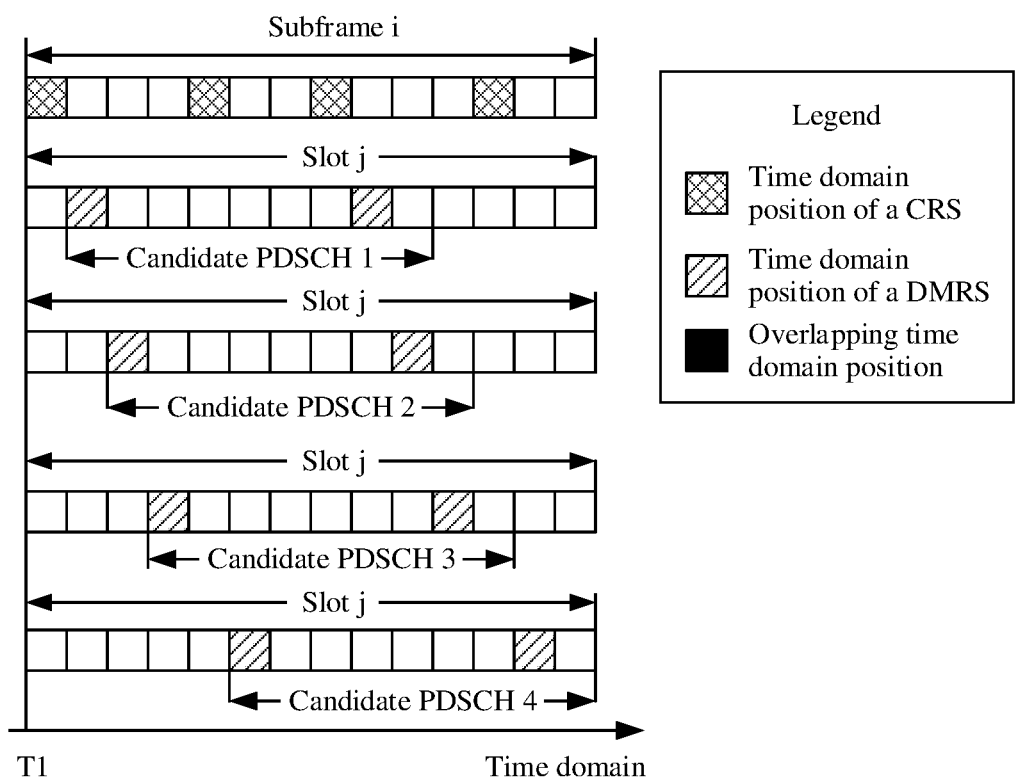

As shown in FIG. 10F, when a nine-symbol PDSCH is scheduled in a slot j, $\Delta l=7$, and a start symbol of a PDSCH does not overlap a time domain position of a CRS set, candidate PDSCHs of the nine-symbol PDSCH are respectively a candidate PDSCH 1, a candidate PDSCH 2, a candidate PDSCH 3, and a candidate PDSCH 4. It can be learned from FIG. 10F that, for the nine-symbol PDSCH, when $\Delta l=7$, the quantity of candidate PDSCHs that meet the first condition is 4, and the candidate PDSCHs are respectively the candidate PDSCH 1, the candidate PDSCH 2, the candidate PDSCH 3, and the candidate PDSCH 4. When the start symbol of the PDSCH does not overlap the time domain position of the CRS set, the quantity of candidate PDSCHs that meet the second condition is 0.

Figure 10G:
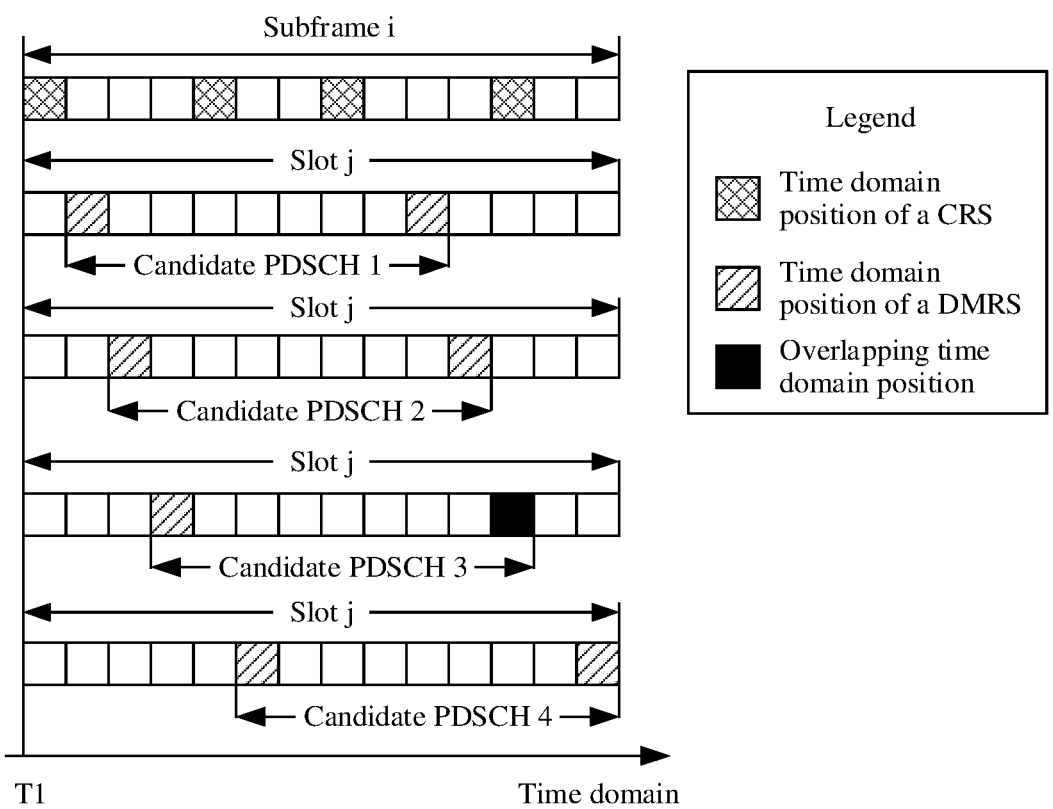

As shown in FIG. 10G, when a nine-symbol PDSCH is scheduled in a slot j, $\Delta l=8$, and a start symbol of a PDSCH does not overlap a time domain position of a CRS set, candidate PDSCHs of the nine-symbol PDSCH are respectively a candidate PDSCH 1, a candidate PDSCH 2, a candidate PDSCH 3, and a candidate PDSCH 4. It can be learned from FIG. 10G that, for the nine-symbol PDSCH, when $\Delta l=8$, the quantity of candidate PDSCHs that meet the first condition is 3, and the candidate PDSCHs are respectively the candidate PDSCH 1, the candidate PDSCH 2, and the candidate PDSCH 4. When the start symbol of the PDSCH does not overlap the time domain position of the CRS set, the quantity of candidate PDSCHs that meet the second condition is 1, and the candidate PDSCH is the candidate PDSCH 3.

Figure 10H:
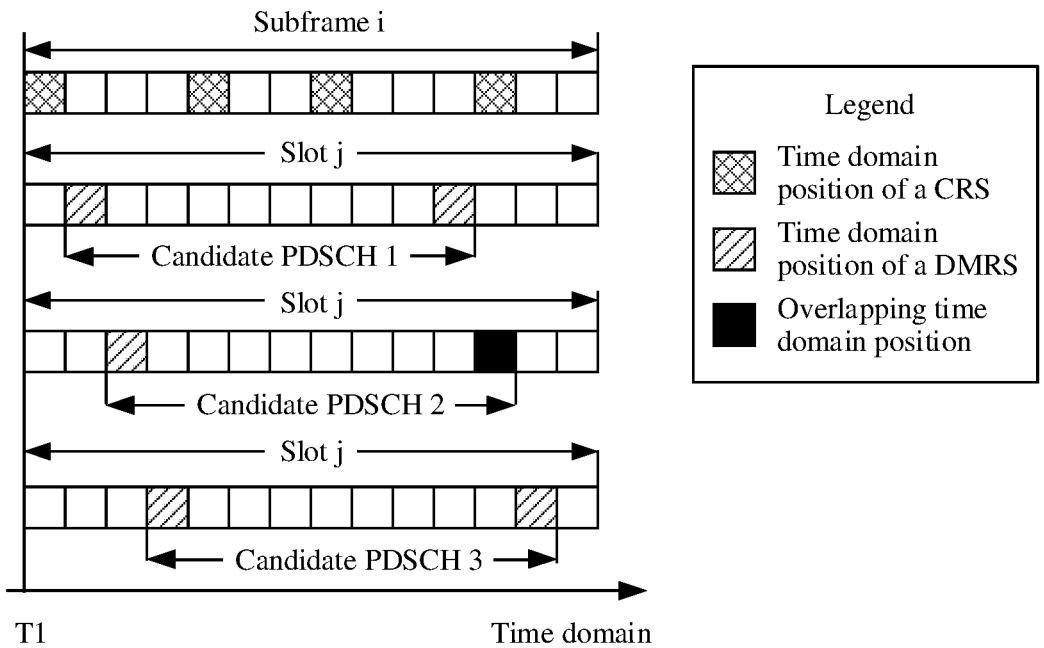

As shown in FIG. 10H, when a 10-symbol PDSCH is scheduled in a slot j, $\Delta l=9$, and a start symbol of a PDSCH does not overlap a time domain position of a CRS set, candidate PDSCHs of the 10-symbol PDSCH are respectively a candidate PDSCH 1, a candidate PDSCH 2, and a candidate PDSCH 3. It can be learned from FIG. 10H that, for the 10-symbol PDSCH, when $\Delta l=9$, the quantity of candidate PDSCHs that meet the first condition is 2, and the candidate PDSCHs are respectively the candidate PDSCH 1 and the candidate PDSCH 3. When the start symbol of the PDSCH does not overlap the time domain position of the CRS set, the quantity of PDSCHs that meet the second condition is 1, and the PDSCH is the candidate PDSCH 2.

Scenario 2:

For example, a frame structure parameter corresponding to the DMRS set is a 15 kHz subcarrier spacing, and a frame structure parameter corresponding to the CRS set is a 15 kHz subcarrier spacing.

A subframe i shown in FIG. 2A in LTE is used as an example. A time domain position, on the subframe i, of each CRS in the CRS set may be shown in A in FIG. 9. It may be understood that, when the time domain position, on the subframe i, of each CRS in the CRS set may be shown in A in FIG. 9, a CRS pattern is a CRS pattern shown in c in FIG. 6 when a quantity of antenna ports is 4. Referring to FIG. 2A, the subframe i includes 14 symbols: a symbol $l_0$ to a symbol 13, and a start moment of the subframe i is T1. For example, in NR, a PDSCH is scheduled based on a type B in a slot j. As shown in FIG. 3, the slot j includes 14 symbols: a symbol $l_0$ to a symbol 13, and a start moment of the slot j is T2. T1 and T2 are a same moment.

In an implementation, when a value of N is 2, the DMRS set includes a first DMRS and a second DMRS. The first DMRS and the second DMRS are one-symbol DMRSs. A time domain position of the first DMRS on the PDSCH is a start symbol $l_0$ of the PDSCH. In this case, a time domain position of the second DMRS on the PDSCH is a symbol $l_0+\Delta l$ of the PDSCH. $\Delta l$ may be understood as a symbol interval between a start symbol of the first DMRS and a start symbol of the second DMRS. The start symbol of the first DMRS may be understood as the time domain position of the first DMRS on the PDSCH, and the start symbol of the second DMRS may be understood as the time domain position of the second DMRS on the PDSCH.

Figure 11A:
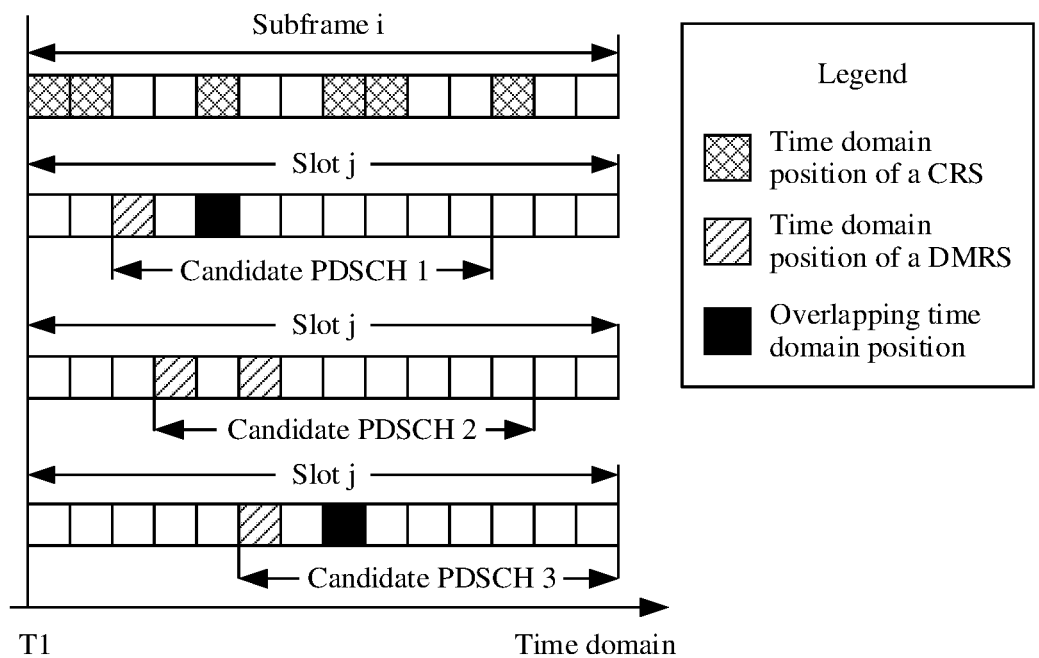
FIG. 11A to FIG. 11H are schematic diagrams of candidate PDSCHs in other different scenarios according to an embodiment of this application.

As shown in FIG. 11A, when a nine-symbol PDSCH is scheduled in a slot j, $\Delta l=2$, and a start symbol of a PDSCH does not overlap a time domain position of a CRS set, candidate PDSCHs of the nine-symbol PDSCH are respectively a candidate PDSCH 1, a candidate PDSCH 2, and a candidate PDSCH 3. It can be learned from FIG. 11A that, for the nine-symbol PDSCH, when $\Delta l=2$, the quantity of candidate PDSCHs that meet the first condition is 1, and the candidate PDSCH is the candidate PDSCH 2. When the start symbol of the PDSCH does not overlap the time domain position of the CRS set, the quantity of PDSCHs that meet the second condition is also 2, and the PDSCHs are respectively the candidate PDSCH 1 and the candidate PDSCH 3.

Figure 11B:
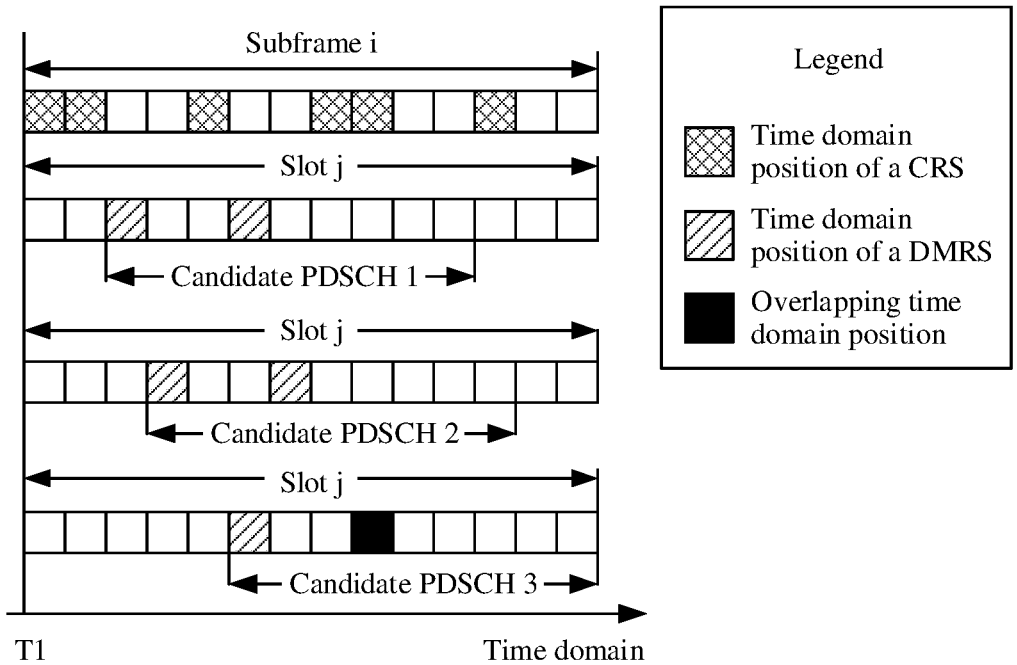

As shown in FIG. 1B, when a nine-symbol PDSCH is scheduled in a slot j, $\Delta l=3$, and a start symbol of a PDSCH does not overlap a time domain position of a CRS set, candidate PDSCHs of the nine-symbol PDSCH are respectively a candidate PDSCH 1, a candidate PDSCH 2, and a candidate PDSCH 3. It can be learned from FIG. 11B that, for the nine-symbol PDSCH, when $\Delta l=3$, the quantity of candidate PDSCHs that meet the first condition is 2, and the candidate PDSCHs are respectively the candidate PDSCH 1 and the candidate PDSCH 2. When the start symbol of the PDSCH does not overlap the time domain position of the CRS set, the quantity of PDSCHs that meet the second condition is 1, and the PDSCH is the candidate PDSCH 3.

Figure 11C:
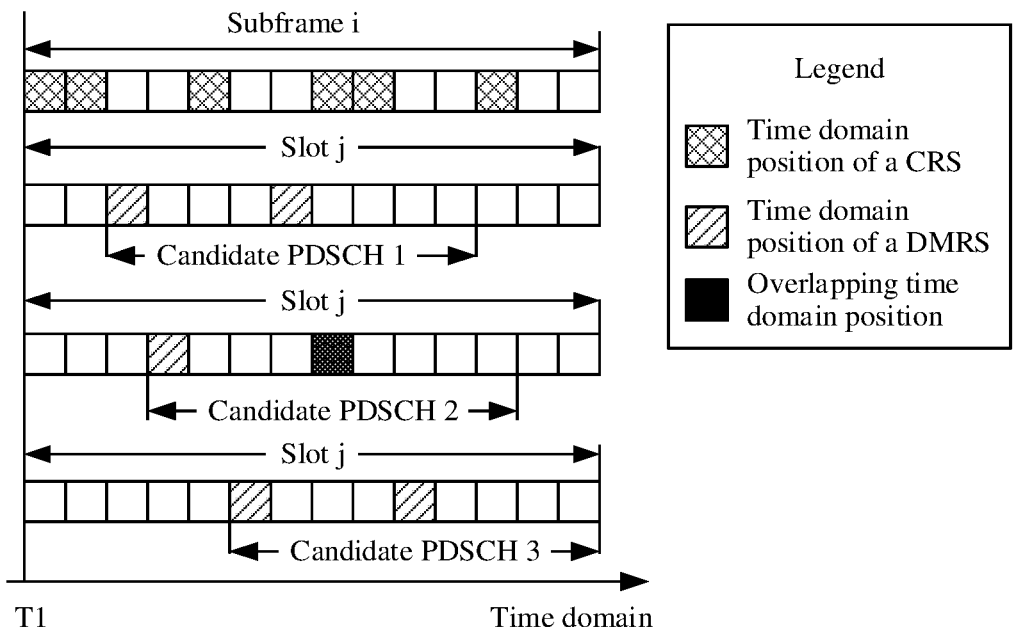

As shown in FIG. 11C, when a nine-symbol PDSCH is scheduled in a slot j, $\Delta l=4$, and a start symbol of a PDSCH does not overlap a time domain position of a CRS set, candidate PDSCHs of the nine-symbol PDSCH are respectively a candidate PDSCH 1, a candidate PDSCH 2, and a candidate PDSCH 3. It can be learned from FIG. 11C that, for the nine-symbol PDSCH, when $\Delta l=4$, the quantity of candidate PDSCHs that meet the first condition is 2, and the candidate PDSCHs are respectively the candidate PDSCH 1 and the candidate PDSCH 3. When the start symbol of the PDSCH does not overlap the time domain position of the CRS set, the quantity of PDSCHs that meet the second condition is 1, and the PDSCH is the candidate PDSCH 2.

Figure 11D:
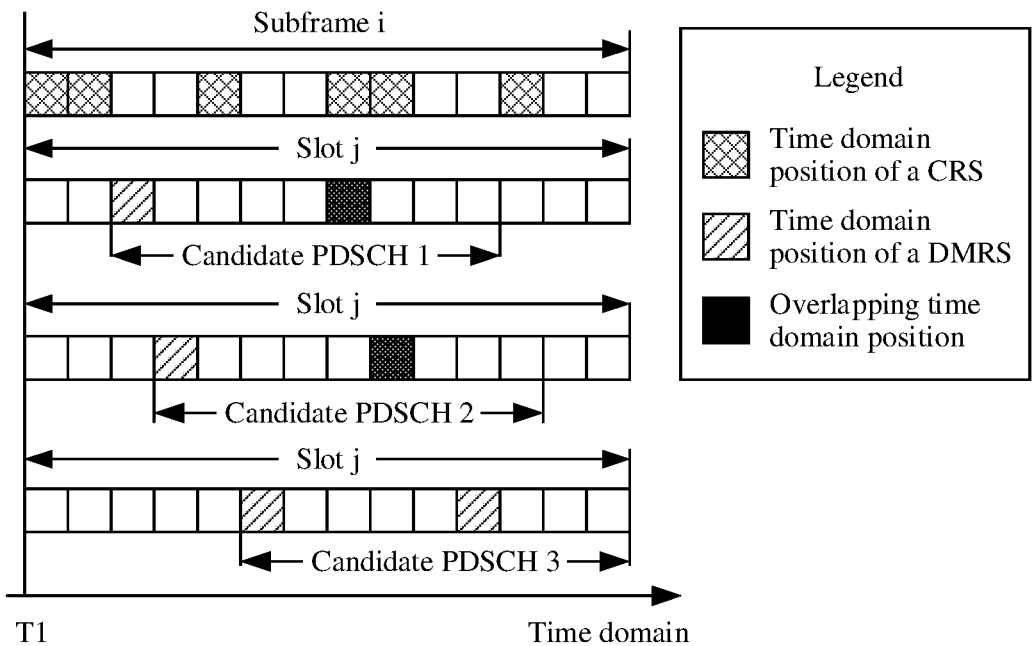

As shown in FIG. 11D, when a nine-symbol PDSCH is scheduled in a slot j, $\Delta l=5$, and a start symbol of a PDSCH does not overlap a time domain position of a CRS set, candidate PDSCHs of the nine-symbol PDSCH are respectively a candidate PDSCH 1, a candidate PDSCH 2, and a candidate PDSCH 3. It can be learned from FIG. 11D that, for the nine-symbol PDSCH, when $\Delta l=5$, the quantity of candidate PDSCHs that meet the first condition is 1, and the candidate PDSCH is the candidate PDSCH 3. When the start symbol of the PDSCH does not overlap the time domain position of the CRS set, the quantity of PDSCHs that meet the second condition is 2, and the PDSCHs are the candidate PDSCH 1 and the candidate PDSCH 2.

Figure 11E:
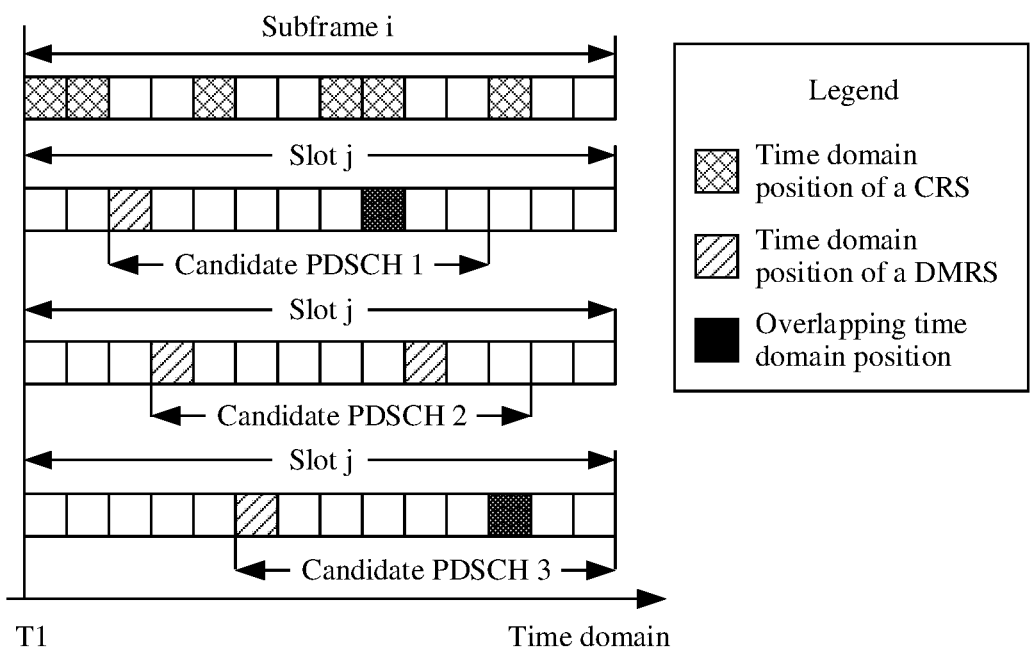

As shown in FIG. 11E, when a nine-symbol PDSCH is scheduled in a slot j, $\Delta l=6$, and a start symbol of a PDSCH does not overlap a time domain position of a CRS set, candidate PDSCHs of the nine-symbol PDSCH are respectively a candidate PDSCH 1, a candidate PDSCH 2, and a candidate PDSCH 3. It can be learned from FIG. 11E that, for the nine-symbol PDSCH, when $\Delta l=6$, the quantity of candidate PDSCHs that meet the first condition is 1, and the candidate PDSCH is the candidate PDSCH 2. When the start symbol of the PDSCH does not overlap the time domain position of the CRS set, the quantity of PDSCHs that meet the second condition is 2, and the PDSCHs are respectively the candidate PDSCH 1 and the candidate PDSCH 3.

Figure 11F:
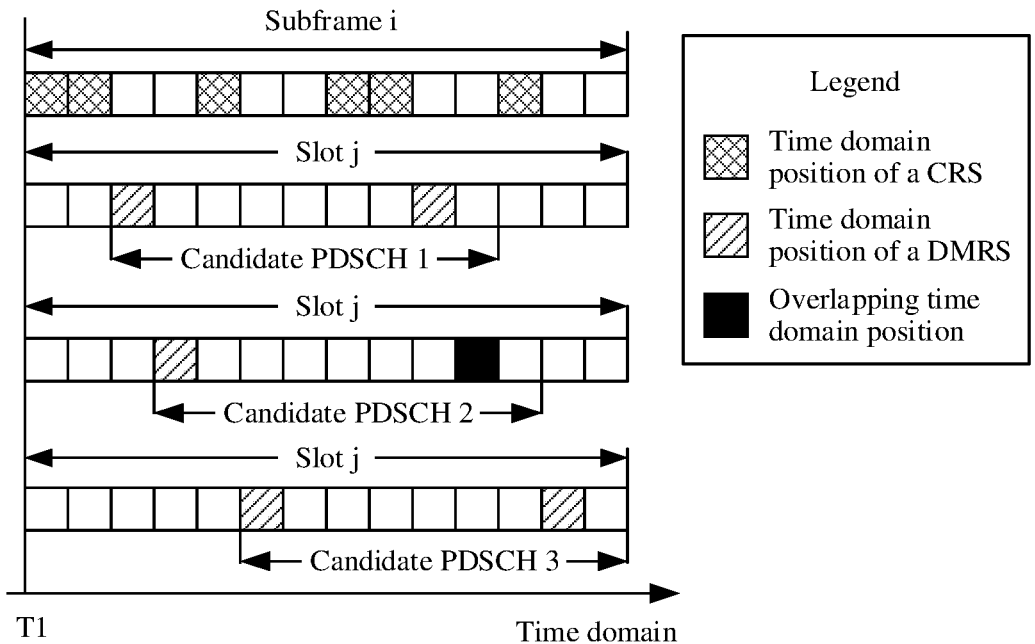

As shown in FIG. 11F, when a nine-symbol PDSCH is scheduled in a slot j, $\Delta l=7$, and a start symbol of a PDSCH does not overlap a time domain position of a CRS set, candidate PDSCHs of the nine-symbol PDSCH are respectively a candidate PDSCH 1, a candidate PDSCH 2, and a candidate PDSCH 3. It can be learned from FIG. 1F that, for the nine-symbol PDSCH, when $\Delta l=7$, the quantity of candidate PDSCHs that meet the first condition is 2, and the candidate PDSCHs are respectively the candidate PDSCH 1 and the candidate PDSCH 3. When the start symbol of the PDSCH does not overlap the time domain position of the CRS set, the quantity of PDSCHs that meet the second condition is 1, and the PDSCH is the candidate PDSCH 2.

Figure 11G:
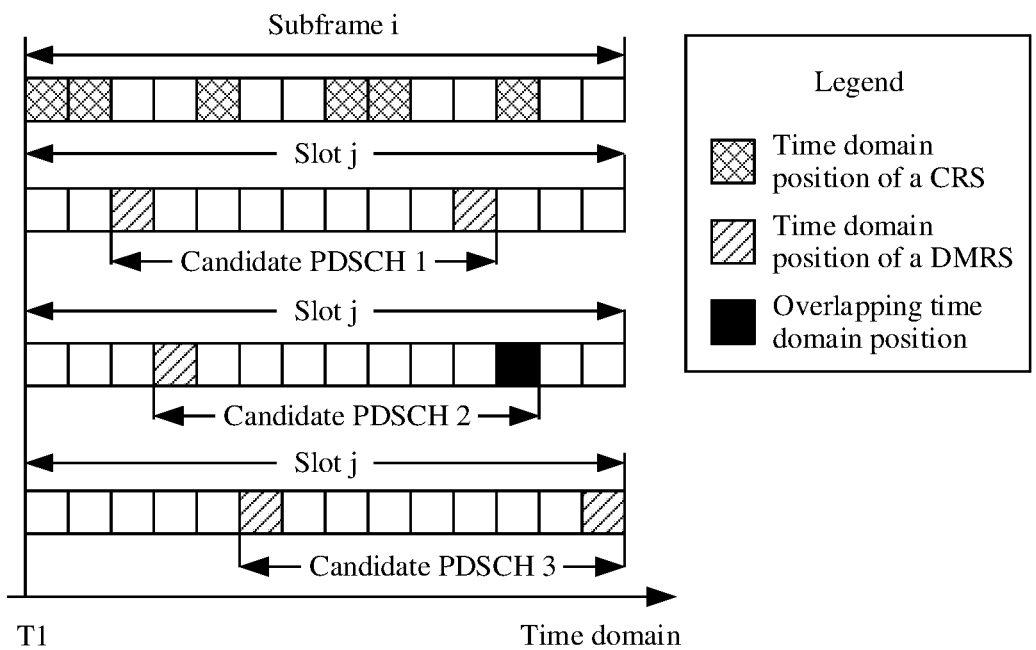

As shown in FIG. 11G, when a nine-symbol PDSCH is scheduled in a slot j, $\Delta l=8$, and a start symbol of a PDSCH does not overlap a time domain position of a CRS set, candidate PDSCHs of the nine-symbol PDSCH are respectively a candidate PDSCH 1, a candidate PDSCH 2, and a candidate PDSCH 3. It can be learned from FIG. 11G that, for the nine-symbol PDSCH, when $\Delta l=8$, the quantity of candidate PDSCHs that meet the first condition is 2, and the candidate PDSCHs are respectively the candidate PDSCH 1 and the candidate PDSCH 3. When the start symbol of the PDSCH does not overlap the time domain position of the CRS set, the quantity of PDSCHs that meet the second condition is 1, and the PDSCH is the candidate PDSCH 2.

Figure 11H:
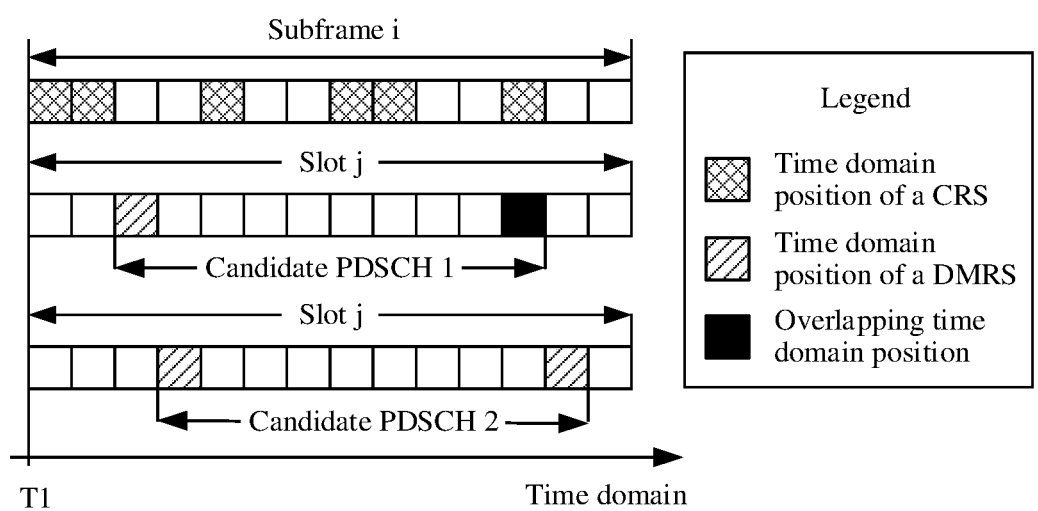

As shown in FIG. 11H, when a 10-symbol PDSCH is scheduled in a slot j, $\Delta l=9$, and a start symbol of a PDSCH does not overlap a time domain position of a CRS set, candidate PDSCHs of the 10-symbol PDSCH are respectively a candidate PDSCH 1 and a candidate PDSCH 2. It can be learned from FIG. 11H that, for the 10-symbol PDSCH, when $\Delta l=9$, the quantity of candidate PDSCHs that meet the first condition is 1, and the candidate PDSCH is the candidate PDSCH 1. When the start symbol of the PDSCH does not overlap the time domain position of the CRS set, the quantity of PDSCHs that meet the second condition is 1, and the PDSCH is the candidate PDSCH 2.

With reference to FIG. 10A to FIG. 10H and FIG. 11A to FIG. 11H, when the value of N is 2, the frame structure parameter corresponding to the DMRS set is the 15 kHz subcarrier spacing, duration L of the PDSCH is 9 and 10, and $\Delta l$ has different values, statistics about the quantity of candidate PDSCHs that meet the first condition are shown in Table 1.

TABLE 1

| | A DMRS corresponds to a 15 kHz subcarrier spacing | | | |
|---|---|---|---|---|
| | A quantity of antenna ports corresponding to a CRS is 2 | | A quantity of antenna ports corresponding to a CRS is 4 | |
| $\Delta l$ | L = 9 | L = 10 | L = 9 | L = 10 |
| 2 | 2 | 2 | 1 | 1 |
| 3 | 3 | 2 | 2 | 2 |
| 4 | 3 | 2 | 2 | 1 |
| 5 | 3 | 2 | 1 | 0 |
| 6 | 2 | 2 | 1 | 1 |
| 7 | 4 | 3 | 3 | 2 |
| 8 | 3 | 2 | 2 | 1 |
| 9 | — | 2 | — | 1 |

According to Table 1, a value of the first threshold may be set based on an actual situation. For example, the value of the first threshold is 2. For the 15 kHz subcarrier spacing, when $\Delta l=7$, the duration L of the PDSCH is nine or 10 symbols, and the quantity of antenna ports of the CRS is 2 or 4, the quantity of candidate PDSCHs that meet the first condition is greater than or equal to the first threshold. Therefore, the time domain position of the DMRS set on the PDSCH may be defined as the start symbol $l_0$ of the PDSCH and a symbol $l_0+7$ of the PDSCH in a communications protocol. For example, the time domain position of the DMRS set on the PDSCH may be defined as the start symbol $l_0$ of the PDSCH and the symbol $l_0+7$ of the PDSCH in the communications protocol in the following manner, including a PDSCH mapping type being a type B, L being 9, $l_0$ being 0, $l_0+\Delta l$, and $\Delta l$ being 7, or a PDSCH mapping type being a type B, L being 10, $l_0$ being 0, $l_0+\Delta l$, and $\Delta l$ being 7.

In this case, for the 15 kHz subcarrier spacing, the time domain position, indicated by the first indication information, of the DMRS set on the PDSCH is the start symbol $l_0$ of the PDSCH and the symbol $l_0+7$ of the PDSCH. In this case, a start symbol $l_0$ and a symbol $l_0+7$ of the first PDSCH indicated by the second indication information are respectively time domain positions of the DMRSs on the PDSCH.

For another example, the value of the first threshold is 1. For the 15 kHz subcarrier spacing, when $\Delta l=2, 3, 4, 6, 7,$ or 8, the duration L of the PDSCH is 9 or 10, and the quantity of antenna ports of the CRS is 2 or 4, the quantity of candidate PDSCHs that meet the first condition is greater than or equal to the first threshold. For example, when $\Delta l=8$, the time domain position of the DMRS set on the PDSCH may be defined as the start symbol $l_0$ of the PDSCH and a symbol $l_0+8$ of the PDSCH in a communications protocol. For example, when $\Delta l=7$, the time domain position of the DMRS set on the PDSCH is defined as the start symbol $l_0$ of the PDSCH and a symbol $l_0+6$ of the PDSCH in the communications protocol.

The following uses an example in which the time domain position of the DMRS set on the PDSCH is defined as the start symbol $l_0$ of the PDSCH and the symbol $l_0+8$ of the PDSCH in the communications protocol. For example, the time domain position of the DMRS set on the PDSCH may be defined as the start symbol $l_0$ of the PDSCH and the symbol $l_0+8$ of the PDSCH in the communications protocol in the following manner, including a PDSCH mapping type being a type B, L being 9, $l_0$ being 0, $l_0+\Delta l$, and $\Delta l$ being 8, or a PDSCH mapping type being a type B, L being 10, $l_0$ being 0, $1+\Delta l$, and $\Delta l$ being 8.

In addition, in some other embodiments, the duration L of the PDSCH is 10 symbols. If the value of the first threshold is 1, for the 15 kHz subcarrier spacing, when $\Delta l=9$, and the quantity of antenna ports of the CRS is 2 or 4, the quantity of candidate PDSCHs that meet the first condition is greater than or equal to the first threshold. Therefore, the time domain position of the DMRS set on the PDSCH may be defined as the start symbol $l_0$ of the PDSCH and a symbol $l_0+9$ of the PDSCH in a communications protocol.

For example, the time domain position of the DMRS set on the PDSCH may be defined as the start symbol $l_0$ of the PDSCH and the symbol $l_0+9$ of the PDSCH in the communications protocol in the following manner, including a PDSCH mapping type being a type B, L being 10, $l_0$ being 0, $l_0+\Delta l$, and $\Delta l$ being 9.

In some other embodiments, a second threshold may be further set to further limit the candidate PDSCH, and the time domain position of the DMRS set on the PDSCH is defined based on a value of $\Delta l$ when both the first condition and the second condition are met.

When a value of N is 3, the DMRS set includes a first DMRS, a second DMRS, and a third DMRS. When the DMRS set corresponds to the 15 kHz subcarrier spacing, a time domain position of the first DMRS on the PDSCH is a start symbol $l_0$ of the PDSCH, a time domain position of the second DMRS on the PDSCH may be a symbol $l_0+\Delta l_1$ of the PDSCH, and a time domain position of the third DMRS on the PDSCH may be a symbol $l_0+\Delta l_2$ of the PDSCH. $\Delta l_1$ is a quantity of symbols between a start symbol of the first DMRS and a start symbol of the second DMRS, and $\Delta l_2$ is a quantity of symbols between the start symbol of the first DMRS and a start symbol of the third DMRS.

For example, a value of $\Delta l_1$ may be a value of $\Delta l$ that enables the quantity of candidate PDSCHs that meet the first condition to be greater than or equal to the first threshold and that is in 4, 5, and 6 in Table 1. For example, when the first threshold is 1 and $\Delta l$ is 4 or 6, the quantity of candidate PDSCHs that meet the first condition is greater than or equal to 1. Therefore, the time domain position of the second DMRS on the PDSCH may be a symbol $l_0+4$ or a symbol $l_0+6$ of the PDSCH. A value of $\Delta l_2$ may be a value of $\Delta l$ that enables the quantity of candidate PDSCHs that meet the first condition to be greater than or equal to the first threshold and that is in 7, 8, and 9 in Table 1. For example, when the first threshold is 2 and Δl is 7, the quantity of candidate PDSCHs that meet the first condition is greater than or equal to 2. Therefore, the time domain position of the third DMRS on the PDSCH may be a symbol $l_0+7$ of the PDSCH. For another example, when the first threshold is 1 and Δl is 7 or 8, the quantity of candidate PDSCHs that meet the first condition is greater than or equal to 1. Therefore, the time domain position of the third DMRS on the PDSCH may be a symbol $l_0+7$ or a symbol $l_0+8$ of the PDSCH.

For another example, a value of $\Delta l_1$ may be a value of Δl that enables the quantity of candidate PDSCHs that meet the first condition to be greater than or equal to the first threshold and that is in 2 and 3 in Table 1. For example, when the first threshold is 1 and Δl is 2 or 3, the quantity of candidate PDSCHs that meet the first condition is greater than or equal to 1. Therefore, the time domain position of the second DMRS on the PDSCH may be a symbol $l_0+2$ or a symbol $l_0+3$ of the PDSCH. For another example, when the first threshold is 2 and Δl is 3, the quantity of candidate PDSCHs that meet the first condition is greater than or equal to 2. Therefore, the time domain position of the second DMRS on the PDSCH may be a symbol $l_0+3$ of the PDSCH. A value of $\Delta l_2$ may be a value of Δl that enables the quantity of candidate PDSCHs that meet the first condition to be greater than or equal to the first threshold and that is in 7, 8, and 9 in Table 1. For example, when the first threshold is 2 and Δl is 7, the quantity of candidate PDSCHs that meet the first condition is greater than or equal to 2. Therefore, the time domain position of the third DMRS on the PDSCH may be a symbol $l_0+7$ of the PDSCH. For another example, when the first threshold is 1 and Δl is 7 or 8, the quantity of candidate PDSCHs that meet the first condition is greater than or equal to 1. Therefore, the time domain position of the third DMRS on the PDSCH may be a symbol $l_0+7$ or a symbol $l_0+8$ of the PDSCH. Alternatively, a value of $\Delta l_2$ may be a value of Δl that enables the quantity of candidate PDSCHs that meet the first condition to be greater than or equal to the first threshold and that is in 4, 5, and 6 in Table 1. For example, when the first threshold is 1 and Δl is 4 or 6, the quantity of candidate PDSCHs that meet the first condition is greater than or equal to 1. Therefore, the time domain position of the third DMRS on the PDSCH may be a symbol $l_0+4$ or a symbol $l_0+6$ of the PDSCH.

Further, considering that there is a relatively small symbol interval between time domain positions of different DMRSs on the PDSCH, reliability of channel estimation may be affected. In some embodiments, when N is 4, it may be defined in a communications protocol that the time domain position of the first DMRS on the PDSCH is a start symbol $l_0$ of the PDSCH, the time domain position of the second DMRS on the PDSCH is a symbol $l_0+2$ or a symbol $l_0+3$ of the PDSCH, and the time domain position of the third DMRS on the PDSCH is a symbol $l_0+7$ or a symbol $l_0+8$ of the PDSCH.

For example, the time domain position of the first DMRS on the PDSCH is the start symbol $l_0$ of the PDSCH, the time domain position of the second DMRS on the PDSCH is a symbol $l_0+\Delta l_1$ of the PDSCH, and the time domain position of the third DMRS on the PDSCH is a symbol $l_0+\Delta l_2$ of the PDSCH, where $\Delta l_1=2$ or 3, and $\Delta l_2=7$ or 8. For example, the time domain position of the DMRS set on the PDSCH may be defined in the communications protocol in the following manner a PDSCH mapping type being a type B, L being 9, $l_0$ being 0, $l_0+\Delta l_1$, $l_0+\Delta l_2$, $\Delta l_1$ being 2, and $\Delta l_2$ being 7, or a PDSCH mapping type being a type B, L being 9, $l_0$ being 0, $l_0+\Delta l_1$, $l_0+\Delta l_2$, $\Delta l_1$ being 3, and $\Delta l_2$ being 7, or a PDSCH mapping type being a type B, L being 9, $l_0$ being 0, $l_0+\Delta l_1$, $1+\Delta l_2$, $\Delta l_1$ being 2, and $\Delta l_2$ being 8, or a PDSCH mapping type being a type B, L being 9, $l_0$ being 0, $l_0+\Delta l_1$, $l_0+\Delta l_2$, $\Delta l_1$ being 3, and $\Delta l_2$ being 8, or a PDSCH mapping type being a type B, L being 10, $l_0$ being 0, $l_0+\Delta l_1$, $l_0+\Delta l_2$, $\Delta l_1$ being 2, and $\Delta l_2$ being 7, or a PDSCH mapping type being a type B, L being 10, $l_0$ being 0, $l_0+\Delta l_1$, $l_0+\Delta l_2$, $\Delta l_1$ being 3, and $\Delta l_2$ being 7, or a PDSCH mapping type being a type B, L being 10, $l_0$ being 0, $l_0+\Delta l_1$, $l_0+\Delta l_2$, $\Delta l_1$ being 2, and $\Delta l_2$ being 8, or a PDSCH mapping type being a type B, L being 10, $l_0$ being 0, $l_0+\Delta l_1$, $l_0+\Delta l_2$, $\Delta l_1$ being 3, and $\Delta l_2$ being 8.

When a value of N is 4, the DMRS set includes a first DMRS, a second DMRS, a third DMRS, and a fourth DMRS. When the DMRS set corresponds to the 15 kHz subcarrier spacing, a time domain position of the first DMRS on the PDSCH is a start symbol $l_0$ of the PDSCH, a time domain position of the second DMRS on the PDSCH may be a symbol $l_0+\Delta l_1$ of the PDSCH, a time domain position of the third DMRS on the PDSCH may be a symbol $l_0+\Delta l_2$ of the PDSCH, and a time domain position of the fourth DMRS on the PDSCH may be a symbol $l_0+\Delta l_3$ of the PDSCH. $\Delta l_1$ is a quantity of symbols between a start symbol of the first DMRS and a start symbol of the second DMRS, $\Delta l_2$ is a quantity of symbols between the start symbol of the first DMRS and a start symbol of the third DMRS, and $\Delta l_3$ is a quantity of symbols between the start symbol of the first DMRS and a start symbol of the fourth DMRS.

For example, a value of $\Delta l_1$ may be a value of Δl that enables the quantity of candidate PDSCHs that meet the first condition to be greater than or equal to the first threshold and that is in 2 and 3 in Table 1. For example, when the first threshold is 1 and Δl is 2 or 3, the quantity of candidate PDSCHs that meet the first condition is greater than or equal to 1. Therefore, the time domain position of the second DMRS on the PDSCH may be a symbol $l_0+2$ or a symbol $l_0+3$ of the PDSCH. For another example, when the first threshold is 2 and Δl is 3, the quantity of candidate PDSCHs that meet the first condition is greater than or equal to 2. Therefore, the time domain position of the second DMRS on the PDSCH may be a symbol $l_0+3$ of the PDSCH. A value of $\Delta l_2$ may be a value of Δl that enables the quantity of candidate PDSCHs that meet the first condition to be greater than or equal to the first threshold and that is in 4, 5, and 6 in Table 1. For example, when the first threshold is 1 and Δl is 4 or 6, the quantity of candidate PDSCHs that meet the first condition is greater than or equal to 1. Therefore, the time domain position of the third DMRS on the PDSCH may be a symbol $l_0+4$ or a symbol $l_0+6$ of the PDSCH. A value of $\Delta l_3$ may be a value of Δl that enables the quantity of candidate PDSCHs that meet the first condition to be greater than or equal to the first threshold and that is in 7, 8, and 9 in Table 1. For example, when the first threshold is 2 and Δl is 7, the quantity of candidate PDSCHs that meet the first condition is greater than or equal to 2. Therefore, the time domain position of the fourth DMRS on the PDSCH may be a symbol $l_0+7$ of the PDSCH. For another example, when the first threshold is 1 and Δl is 7 or 8, the quantity of candidate PDSCHs that meet the first condition is greater than or equal to 1. Therefore, the time domain position of the fourth DMRS on the PDSCH may be a symbol $l_0+7$ or a symbol $l_0+8$ of the PDSCH.

Further, considering that there is a relatively small symbol interval between time domain positions of different DMRSs on the PDSCH, reliability of channel estimation may be affected. In some embodiments, when N is 3, it may be defined in a communications protocol that the time domain position of the first DMRS on the PDSCH is a start symbol $l_0$ of the PDSCH, the time domain position of the second DMRS on the PDSCH is a symbol $l_0+3$ of the PDSCH, the time domain position of the third DMRS on the PDSCH is a symbol $l_0+6$ of the PDSCH, and the time domain position of the fourth DMRS on the PDSCH is a symbol $l_0+8$ of the PDSCH, or that the time domain position of the first DMRS on the PDSCH is a start symbol $l_0$ of the PDSCH, the time domain position of the second DMRS on the PDSCH is a symbol $l_0+2$ of the PDSCH, the time domain position of the third DMRS on the PDSCH is a symbol $l_0+4$ of the PDSCH, and the time domain position of the fourth DMRS on the PDSCH is a symbol $l_0+7$ of the PDSCH.

For example, the time domain position of the first DMRS on the PDSCH is the start symbol $l_0$ of the PDSCH, the time domain position of the second DMRS on the PDSCH is a symbol $l_0+\Delta l_1$ of the PDSCH, the time domain position of the third DMRS on the PDSCH is a symbol $l_0+\Delta l_2$ of the PDSCH, and the time domain position of the fourth DMRS on the PDSCH is a symbol $l_0+\Delta l_3$ of the PDSCH, where $\Delta l_1=2$, $\Delta l_2=4$, and $\Delta l_3=7$, or $\Delta l_1=3$, $\Delta l_2=6$, and $\Delta l_3=8$. For example, the time domain position of the DMRS set on the PDSCH may be defined in the communications protocol in the following manner a PDSCH mapping type being a type B, L being 9, $l_0$ being 0, $l_0+\Delta l_1$, $l_0+\Delta l_2$, $l_0+\Delta l_3$, $\Delta l_1$ being 3, $\Delta l_2$ being 6, and $\Delta l_3$ being 8, or a PDSCH mapping type being a type B, L being 10, $l_0$ being 0, $l_0+\Delta l_1$, $l_0+\Delta l_2$, $l_0+\Delta l_3$, $\Delta l_1$ being 3, $\Delta l_2$ being 6, and $\Delta l_3$ being 8, or a PDSCH mapping type being a type B, L being 9, $l_0$ being 0, $l_0+\Delta l_1$, $l_0+\Delta l_2$, $l_0+\Delta l_3$, $\Delta l_1$ being 2, $\Delta l_2$ being 4, and $\Delta l_3$ being 7, or a PDSCH mapping type being a type B, L being 10, $l_0$ being 0, $l_0+\Delta l_1$, $l_0+\Delta l_2$, $l_0+\Delta l_3$, $\Delta l_1$ being 2, $\Delta l_2$ being 4, and $\Delta l_3$ being 7, Scenario 3:

For example, a frame structure parameter corresponding to the DMRS set is a 30 kHz subcarrier spacing, and a frame structure parameter corresponding to the CRS set is a 15 kHz subcarrier spacing. It should be noted that, that a frame structure parameter corresponding to the DMRS set is a 30 kHz subcarrier spacing may be understood as that the 30 kHz subcarrier spacing is used in NR, and that a frame structure parameter corresponding to the CRS set is a 15 kHz subcarrier spacing may be understood as that the 15 kHz subcarrier spacing is used in LTE.

A subframe i shown in FIG. 2A in LTE is used as an example. A time domain position, on the subframe i, of each CRS in the CRS set may be shown in A in FIG. 9. It may be understood that, when the time domain position, on the subframe i, of each CRS in the CRS set may be shown in A in FIG. 9, a CRS pattern is a CRS pattern shown in a in FIG. 6 when a quantity of antenna ports is 1, or a CRS pattern is a CRS pattern shown in b in FIG. 6 when a quantity of antenna ports is 2. Referring to FIG. 2A, the subframe i includes 14 symbols: a symbol $l_0$ to a symbol 13, and a start moment of the subframe i is T1. For example, in NR, a PDSCH is scheduled based on a type B in a slot j. As shown in FIG. 3, the slot j includes 14 symbols: a symbol $l_0$ to a symbol 13, and a start moment of the slot j is T2. T1 and T2 are a same moment.

It should be noted that, that the 30 kHz subcarrier spacing is used in NR, the 15 kHz subcarrier spacing is used in LTE, and NR and LTE are time-aligned may be understood as that in NR, a start position of the slot j is aligned with a start position of a slot in the subframe i, For example, the subframe i shown in FIG. 2A is used as an example. A symbol $l_0$ to a symbol 6 in the subframe i are a slot 0, and a symbol 7 to a symbol 13 in the subframe i are a slot 1. As shown in FIG. 3, the slot j in NR is used as an example. In this case, the start position of the slot j is aligned with a start position of the slot 0, or the start position of the slot j is aligned with a start position of the slot 1. Both the cases may be understood as that NR and LTE are time-aligned. For example, the start position of the slot j is the moment T2 shown in FIG. 3, and the start position of the slot 0 is the moment T1 shown in FIG. 2A. The following uses an example in which T1 and T2 are a same moment for description.

In an implementation, when a value of N is 2, the DMRS set includes a first DMRS and a second DMRS. The first DMRS and the second DMRS are one-symbol DMRSs. A time domain position of the first DMRS on the PDSCH is a start symbol $l_0$ of the PDSCH. In this case, a time domain position of the second DMRS on the PDSCH is a symbol $l_0+\Delta l$ of the PDSCH. $\Delta l$ may be understood as a symbol interval between a start symbol of the first DMRS and a start symbol of the second DMRS. The start symbol of the first DMRS may be understood as the time domain position of the first DMRS on the PDSCH, and the start symbol of the second DMRS may be understood as the time domain position of the second DMRS on the PDSCH.

Figure 12A:
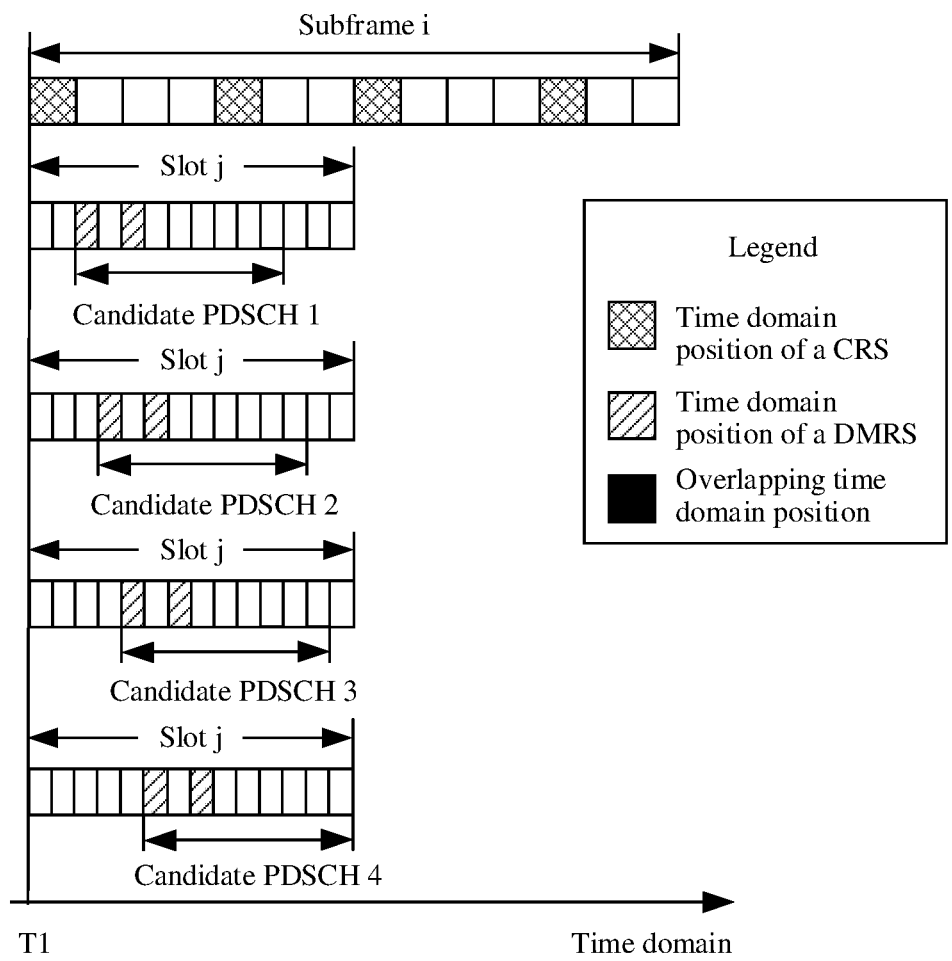
FIG. 12A to FIG. 12H are schematic diagrams of candidate PDSCHs in other different scenarios according to an embodiment of this application.

As shown in FIG. 12A, when a nine-symbol PDSCH is scheduled in a slot j, $\Delta l=2$, and a start symbol of a PDSCH does not overlap a time domain position of a CRS set, candidate PDSCHs of the nine-symbol PDSCH are respectively a candidate PDSCH 1, a candidate PDSCH 2, a candidate PDSCH 3, and a candidate PDSCH 4. It can be learned from FIG. 12A that, for the nine-symbol PDSCH, when $\Delta l=2$, the quantity of candidate PDSCHs that meet the first condition is 4, and the candidate PDSCHs are respectively the candidate PDSCH 1, the candidate PDSCH 2, the candidate PDSCH 3, and the candidate PDSCH 4. When the start symbol of the PDSCH does not overlap the time domain position of the CRS set, the quantity of PDSCHs that meet the second condition is 0.

Figure 12B:
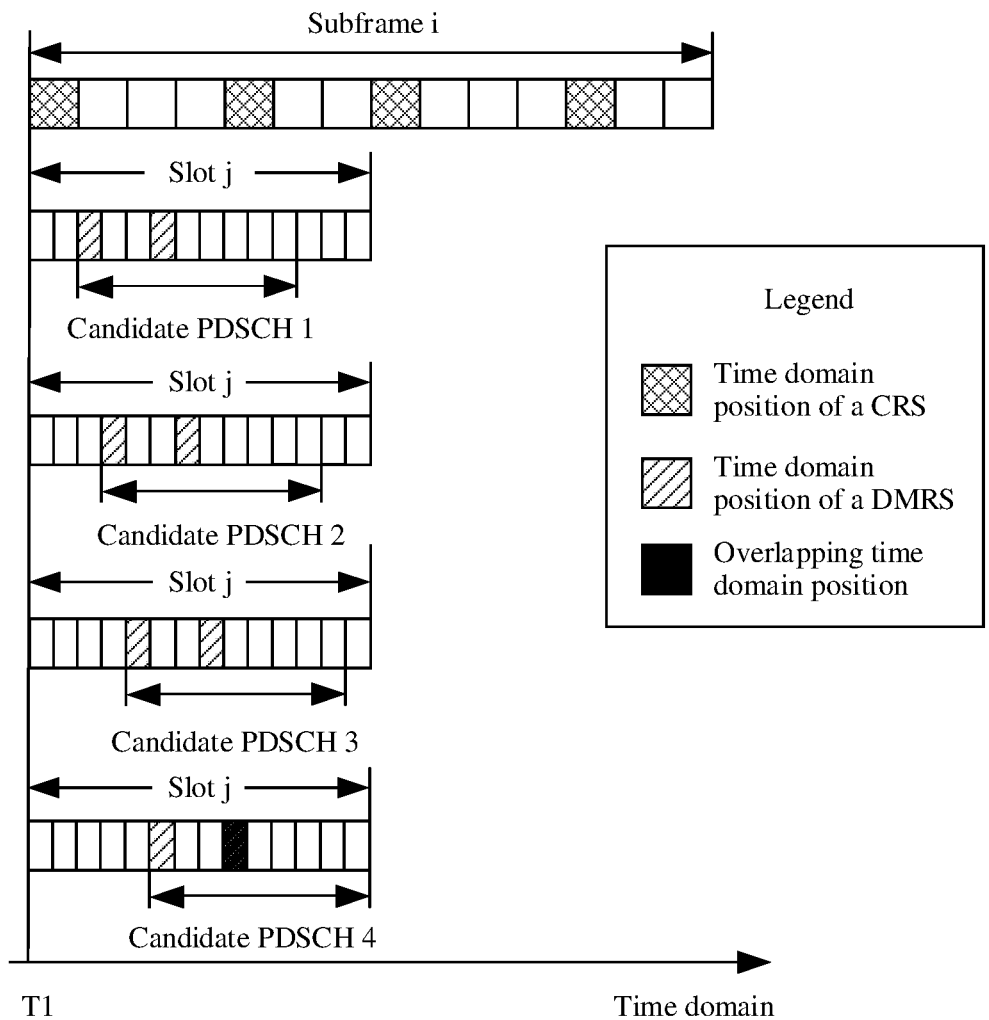

As shown in FIG. 12B, when a nine-symbol PDSCH is scheduled in a slot j, $\Delta l=3$, and a start symbol of a PDSCH does not overlap a time domain position of a CRS set, candidate PDSCHs of the nine-symbol PDSCH are respectively a candidate PDSCH 1, a candidate PDSCH 2, a candidate PDSCH 3, and a candidate PDSCH 4. It can be learned from FIG. 12B that, for the nine-symbol PDSCH, when $\Delta l=3$, the quantity of candidate PDSCHs that meet the first condition is 3, and the candidate PDSCHs are respectively the candidate PDSCH 1, the candidate PDSCH 2, and the candidate PDSCH 3. When the start symbol of the PDSCH does not overlap the time domain position of the CRS set, the quantity of PDSCHs that meet the second condition is 1, and the PDSCH is the candidate PDSCH 4.

Figure 12C:
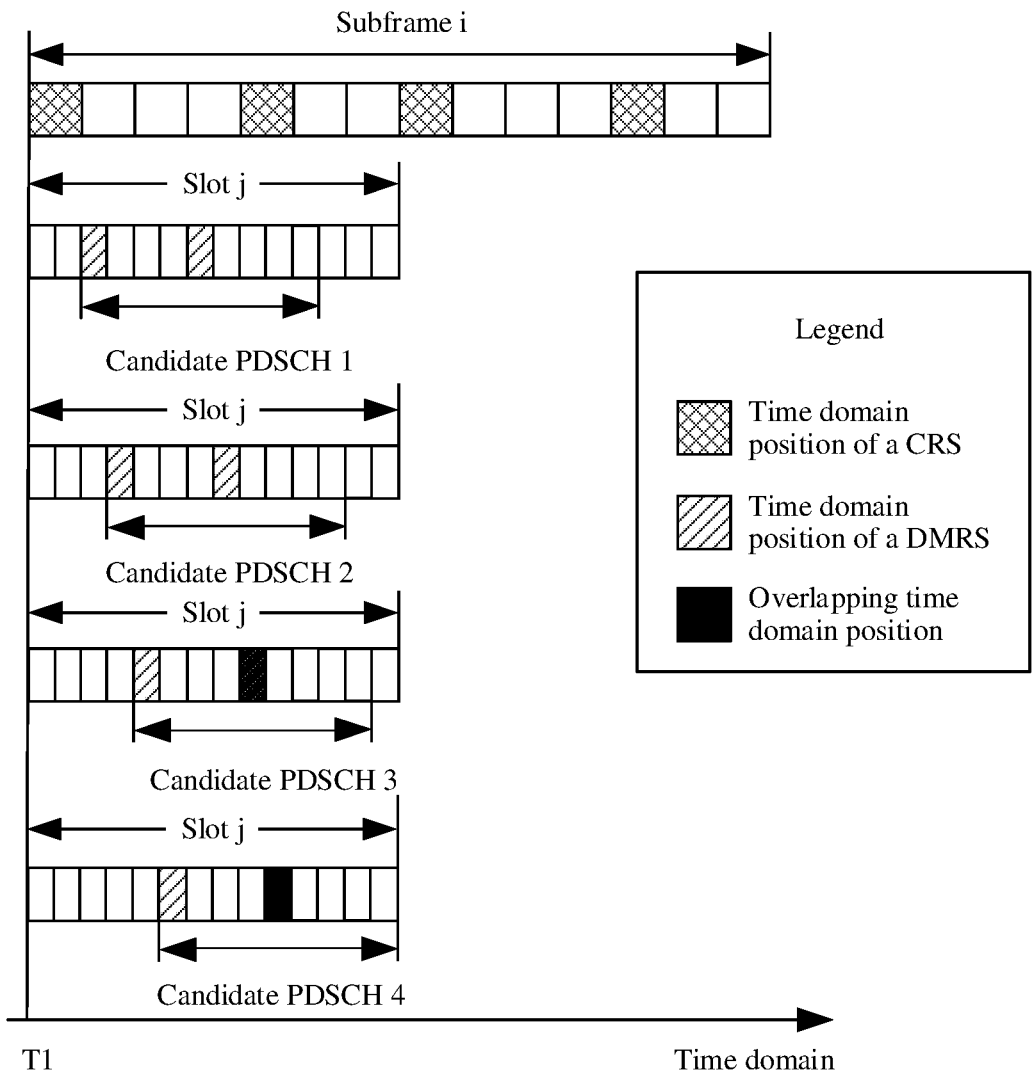

As shown in FIG. 12C, when a nine-symbol PDSCH is scheduled in a slot j, $\Delta l=4$, and a start symbol of a PDSCH does not overlap a time domain position of a CRS set, candidate PDSCHs of the nine-symbol PDSCH are respectively a candidate PDSCH 1, a candidate PDSCH 2, a candidate PDSCH 3, and a candidate PDSCH 4. It can be learned from FIG. 12C that, for the nine-symbol PDSCH, when $\Delta l=4$, the quantity of candidate PDSCHs that meet the first condition is 2, and the candidate PDSCHs are respectively the candidate PDSCH 1 and the candidate PDSCH 2. When the start symbol of the PDSCH does not overlap the time domain position of the CRS set, the quantity of PDSCHs that meet the second condition is 2, and the PDSCHs are respectively the candidate PDSCH 3 and the candidate PDSCH 4.

Figure 12D:
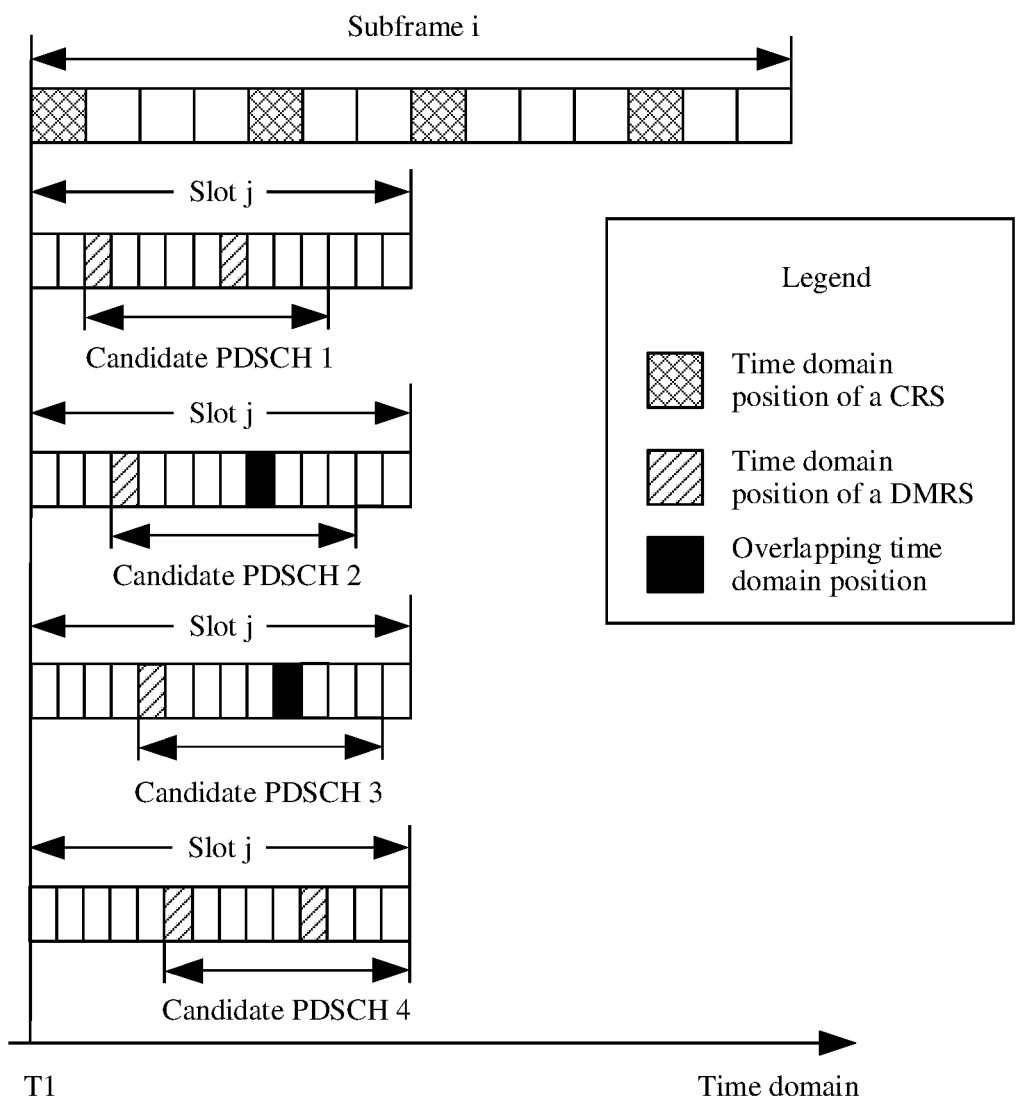

As shown in FIG. 12D, when a nine-symbol PDSCH is scheduled in a slot j, $\Delta l=5$, and a start symbol of a PDSCH does not overlap a time domain position of a CRS set, candidate PDSCHs of the nine-symbol PDSCH are respectively a candidate PDSCH 1, a candidate PDSCH 2, a candidate PDSCH 3, and a candidate PDSCH 4. It can be learned from FIG. 12D that, for the nine-symbol PDSCH, when Δl=5, the quantity of candidate PDSCHs that meet the first condition is 2, and the candidate PDSCHs are respectively the candidate PDSCH 1 and the candidate PDSCH 4. When the start symbol of the PDSCH does not overlap the time domain position of the CRS set, the quantity of PDSCHs that meet the second condition is 2, and the PDSCHs are respectively the candidate PDSCH 2 and the candidate PDSCH 3.

Figure 12E:
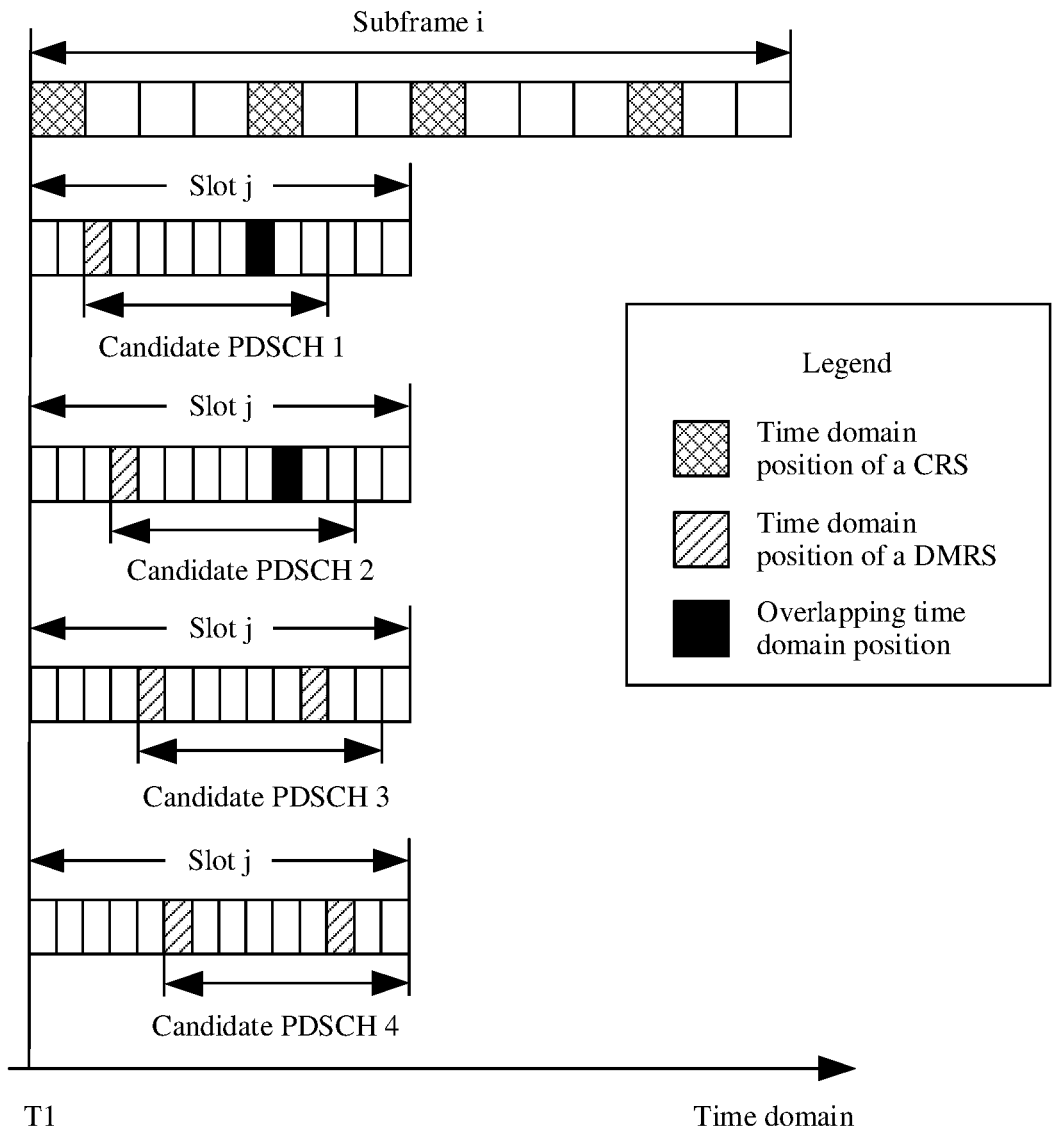

As shown in FIG. 12E, when a nine-symbol PDSCH is scheduled in a slot j, Δl=6, and a start symbol of a PDSCH does not overlap a time domain position of a CRS set, candidate PDSCHs of the nine-symbol PDSCH are respectively a candidate PDSCH 1, a candidate PDSCH 2, a candidate PDSCH 3, and a candidate PDSCH 4. It can be learned from FIG. 12E that, for the nine-symbol PDSCH, when Δl=6, the quantity of candidate PDSCHs that meet the first condition is 2, and the candidate PDSCHs are respectively the candidate PDSCH 1 and the candidate PDSCH 2. When the start symbol of the PDSCH does not overlap the time domain position of the CRS set, the quantity of PDSCHs that meet the second condition is 2, and the PDSCHs are respectively the candidate PDSCH 3 and the candidate PDSCH 4.

Figure 12F:
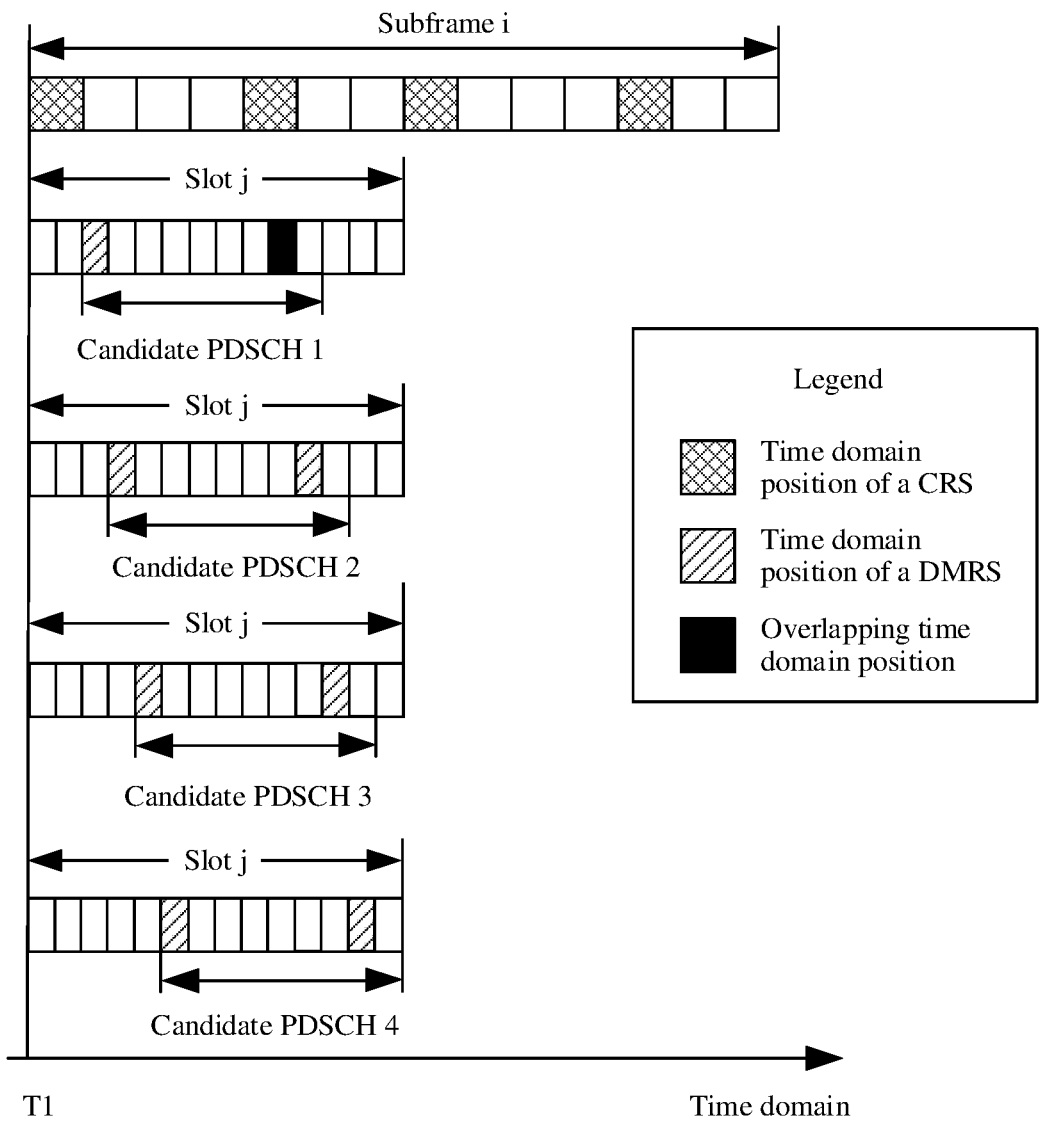

As shown in FIG. 12F, when a nine-symbol PDSCH is scheduled in a slot j, Δl=7, and a start symbol of a PDSCH does not overlap a time domain position of a CRS set, candidate PDSCHs of the nine-symbol PDSCH are respectively a candidate PDSCH 1, a candidate PDSCH 2, a candidate PDSCH 3, and a candidate PDSCH 4. It can be learned from FIG. 12F that, for the nine-symbol PDSCH, when Δl=7, the quantity of candidate PDSCHs that meet the first condition is 3, and the candidate PDSCHs are respectively the candidate PDSCH 2, the candidate PDSCH 3, and the candidate PDSCH 4. When the start symbol of the PDSCH does not overlap the time domain position of the CRS set, the quantity of PDSCHs that meet the second condition is 1, and the PDSCH is the candidate PDSCH 1.

Figure 12G:
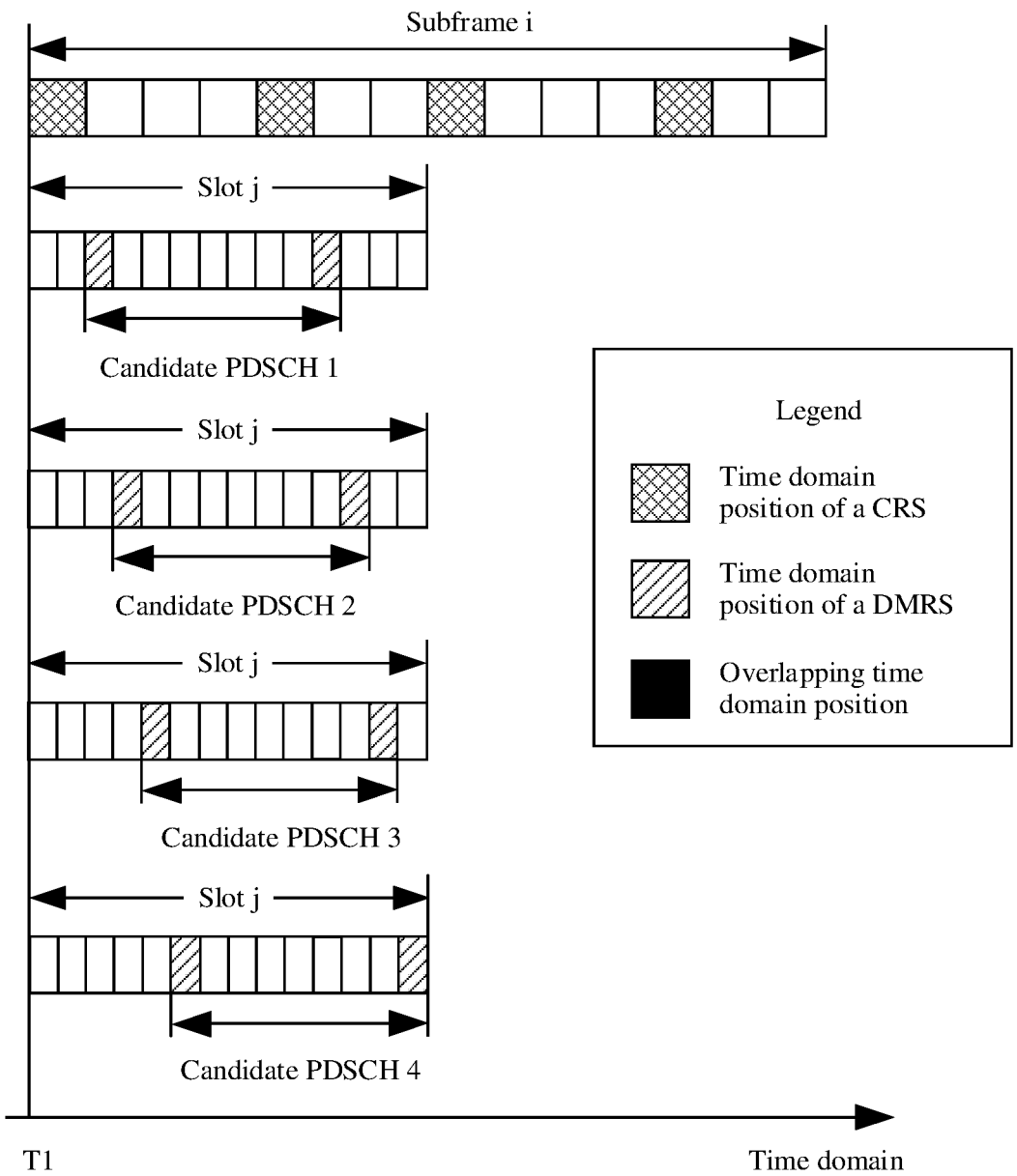

As shown in FIG. 12G, when a nine-symbol PDSCH is scheduled in a slot j, Δl=8, and a start symbol of a PDSCH does not overlap a time domain position of a CRS set, candidate PDSCHs of the nine-symbol PDSCH are respectively a candidate PDSCH 1, a candidate PDSCH 2, a candidate PDSCH 3, and a candidate PDSCH 4. It can be learned from FIG. 12G that, for the nine-symbol PDSCH, when Δl=8, the quantity of candidate PDSCHs that meet the first condition is 4, and the candidate PDSCHs are respectively the candidate PDSCH 1, the candidate PDSCH 2, the candidate PDSCH 3, and the candidate PDSCH 4. When the start symbol of the PDSCH does not overlap the time domain position of the CRS set, the quantity of PDSCHs that meet the second condition is 0.

Figure 12H:
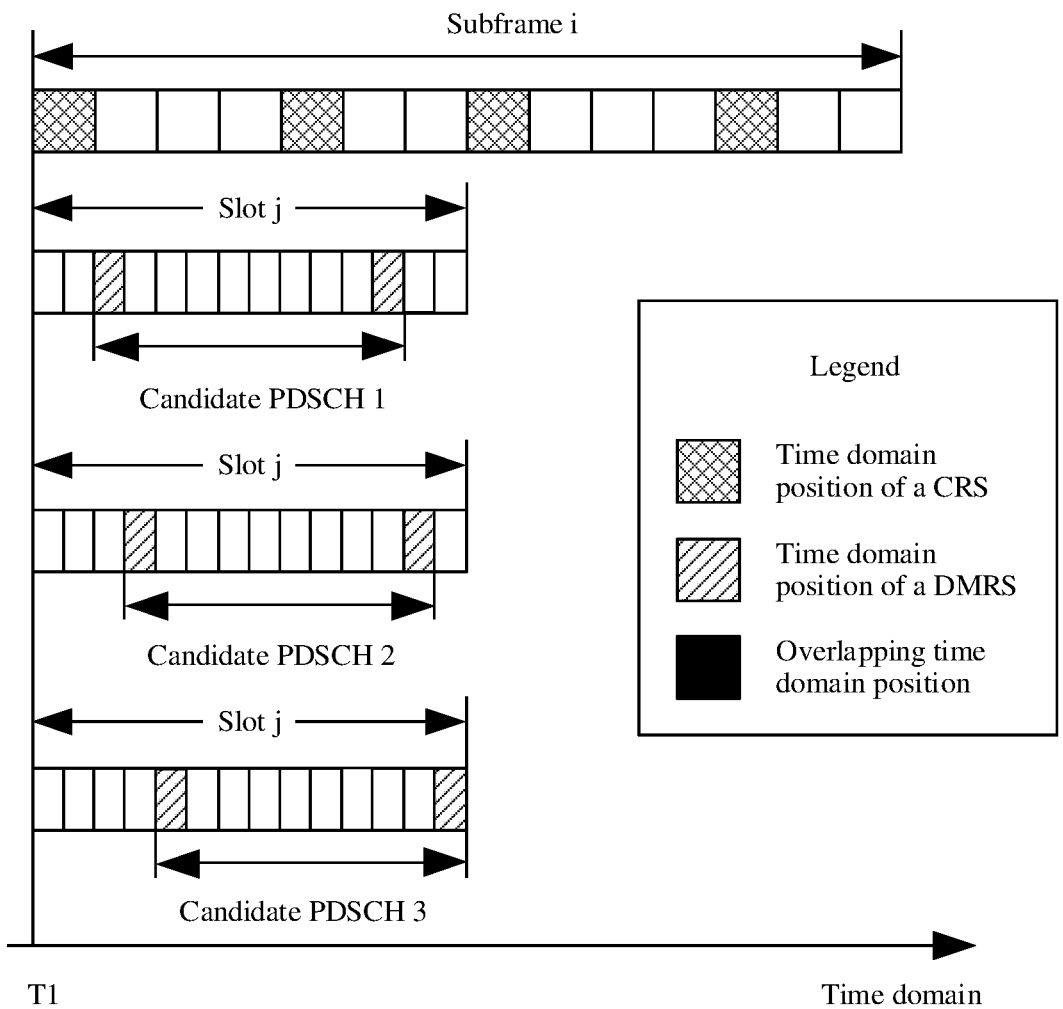

As shown in FIG. 12H, when a 10-symbol PDSCH is scheduled in a slot j, Δl=9, and a start symbol of a PDSCH does not overlap a time domain position of a CRS set, candidate PDSCHs of the 10-symbol PDSCH are respectively a candidate PDSCH 1, a candidate PDSCH 2, and a candidate PDSCH 3. It can be learned from FIG. 10H that, for the 10-symbol PDSCH, when Δl=9, the quantity of candidate PDSCHs that meet the first condition is 3, and the candidate PDSCHs are respectively the candidate PDSCH 1, the candidate PDSCH 2, and the candidate PDSCH 3. When the start symbol of the PDSCH does not overlap the time domain position of the CRS set, the quantity of PDSCHs that meet the second condition is 0.

Scenario 4:

For example, a frame structure parameter corresponding to the DMRS set is a 30 kHz subcarrier spacing, and a frame structure parameter corresponding to the CRS set is a 15 kHz subcarrier spacing.

A subframe i shown in FIG. 2A in LTE is used as an example. A time domain position, on the subframe i, of each CRS in the CRS set may be shown in A in FIG. 9. It may be understood that, when the time domain position, on the subframe i, of each CRS in the CRS set may be shown in A in FIG. 9, a CRS pattern is a CRS pattern shown in c in FIG. 6 when a quantity of antenna ports is 4. Referring to FIG. 2A, the subframe i includes 14 symbols: a symbol $l_0$ to a symbol 13, and a start moment of the subframe i is T1. For example, in NR, a PDSCH is scheduled based on a type B in a slot j. As shown in FIG. 3, the slot j includes 14 symbols: a symbol $l_0$ to a symbol 13, and a start moment of the slot j is T2. T1 and T2 are a same moment.

In an implementation, when a value of N is 2, the DMRS set includes a first DMRS and a second DMRS. The first DMRS and the second DMRS are one-symbol DMRSs. A time domain position of the first DMRS on the PDSCH is a start symbol $l_0$ of the PDSCH. In this case, a time domain position of the second DMRS on the PDSCH is a symbol $l_0+\Delta l$ of the PDSCH. Δl may be understood as a symbol interval between a start symbol of the first DMRS and a start symbol of the second DMRS. The start symbol of the first DMRS may be understood as the time domain position of the first DMRS on the PDSCH, and the start symbol of the second DMRS may be understood as the time domain position of the second DMRS on the PDSCH.

Figure 13A:
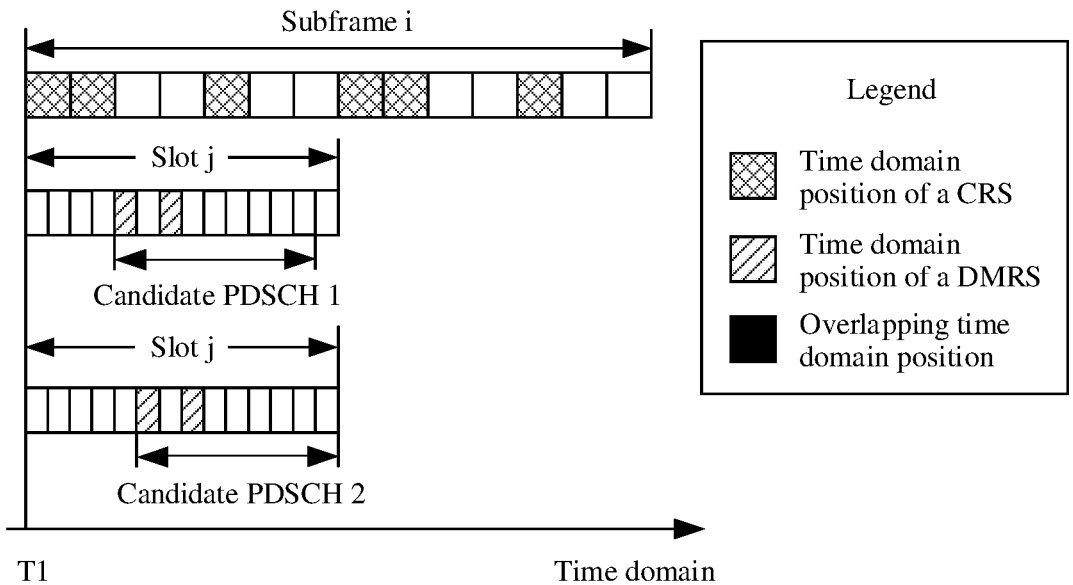
FIG. 13A to FIG. 13H are schematic diagrams of candidate PDSCHs in other different scenarios according to an embodiment of this application.

As shown in FIG. 13A, when a nine-symbol PDSCH is scheduled in a slot j, Δl=2, and a start symbol of a PDSCH does not overlap a time domain position of a CRS set, candidate PDSCHs of the nine-symbol PDSCH are respectively a candidate PDSCH 1 and a candidate PDSCH 2. It can be learned from FIG. 13A that, for the nine-symbol PDSCH, when Δl=2, the quantity of candidate PDSCHs that meet the first condition is 2, and the candidate PDSCHs are respectively the candidate PDSCH 1 and the candidate PDSCH 2. When the start symbol of the PDSCH does not overlap the time domain position of the CRS set, the quantity of PDSCHs that meet the second condition is 0.

Figure 13B:
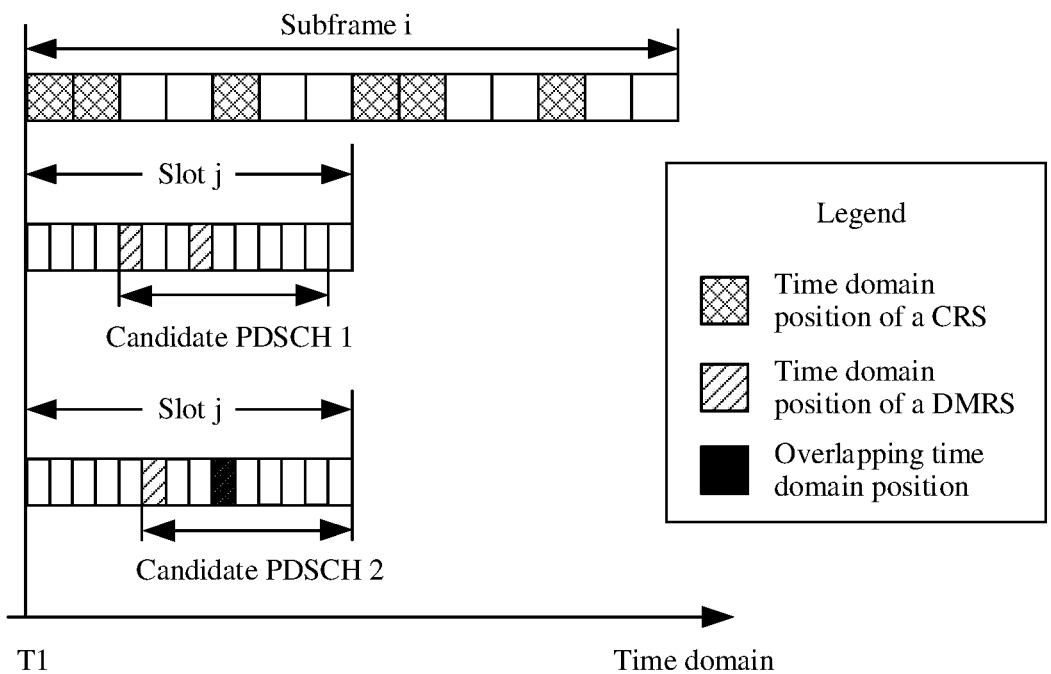

As shown in FIG. 13B, when a nine-symbol PDSCH is scheduled in a slot j, Δl=3, and a start symbol of a PDSCH does not overlap a time domain position of a CRS set, candidate PDSCHs of the nine-symbol PDSCH are respectively a candidate PDSCH 1 and a candidate PDSCH 2. It can be learned from FIG. 13B that, for the nine-symbol PDSCH, when Δl=3, the quantity of candidate PDSCHs that meet the first condition is 1, and the candidate PDSCH is the candidate PDSCH 1. When the start symbol of the PDSCH does not overlap the time domain position of the CRS set, the quantity of PDSCHs that meet the second condition is 1, and the PDSCH is the candidate PDSCH 2.

Figure 13C:
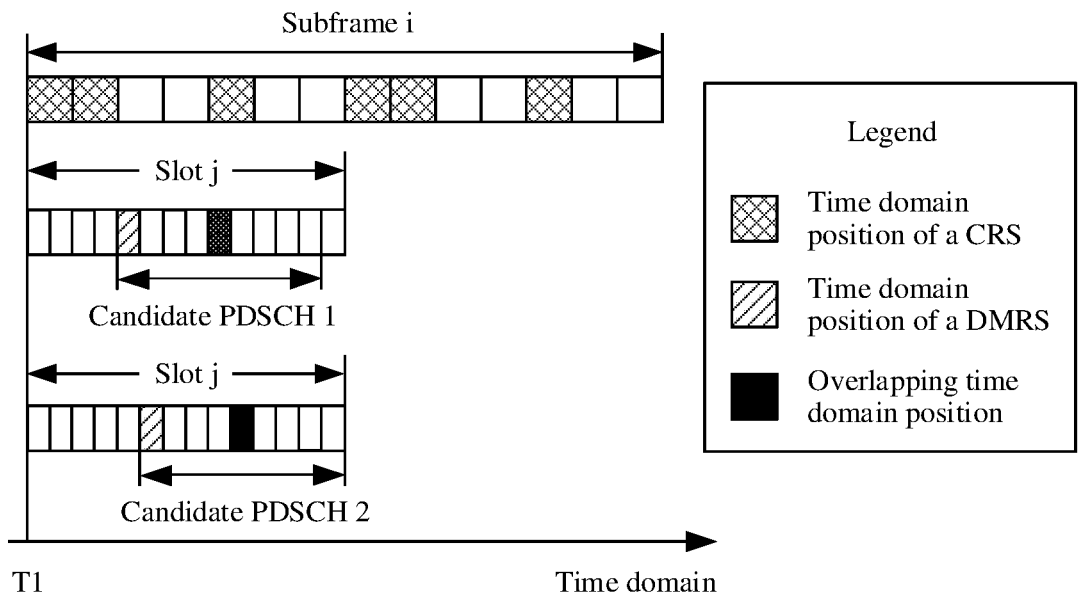

As shown in FIG. 13C, when a nine-symbol PDSCH is scheduled in a slot j, Δl=4, and a start symbol of a PDSCH does not overlap a time domain position of a CRS set, candidate PDSCHs of the nine-symbol PDSCH are respectively a candidate PDSCH 1 and a candidate PDSCH 2. It can be learned from FIG. 13C that, for the nine-symbol PDSCH, when Δl=4, the quantity of candidate PDSCHs that meet the first condition is 0. When the start symbol of the PDSCH does not overlap the time domain position of the CRS set, the quantity of PDSCHs that meet the second condition is 2, and the PDSCHs are respectively the candidate PDSCH 1 and the candidate PDSCH 2.

Figure 13D:
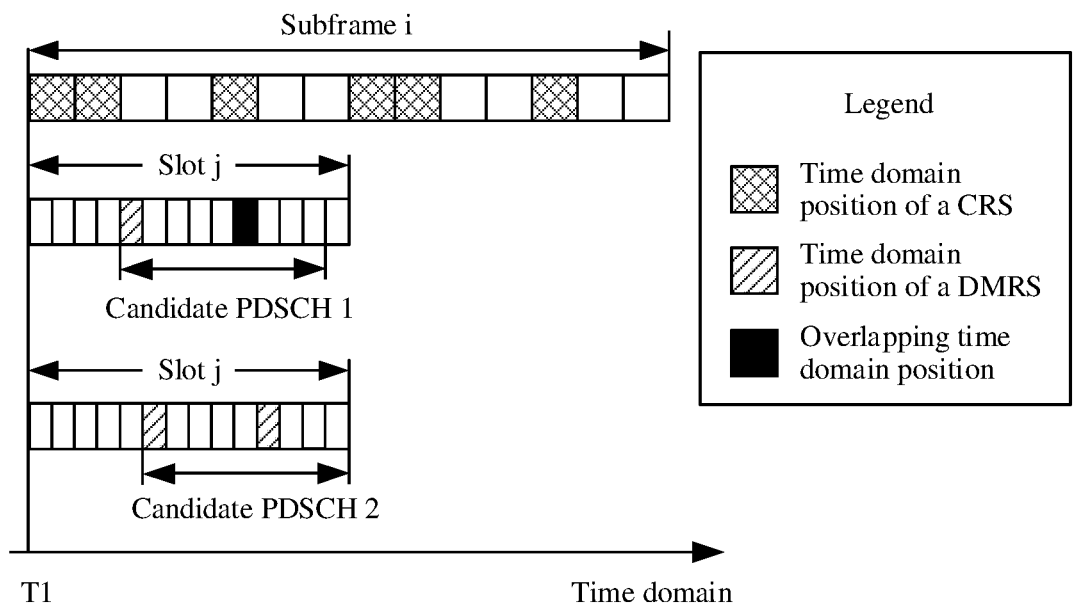

As shown in FIG. 13D, when a nine-symbol PDSCH is scheduled in a slot j, Δl=5, and a start symbol of a PDSCH does not overlap a time domain position of a CRS set, candidate PDSCHs of the nine-symbol PDSCH are respectively a candidate PDSCH 1 and a candidate PDSCH 2. It can be learned from FIG. 13D that, for the nine-symbol PDSCH, when Δl=5, the quantity of candidate PDSCHs that meet the first condition is 1, and the candidate PDSCH is the candidate PDSCH 2. When the start symbol of the PDSCH does not overlap the time domain position of the CRS set, the quantity of PDSCHs that meet the second condition is 1, and the PDSCH is the candidate PDSCH 1.

Figure 13E:
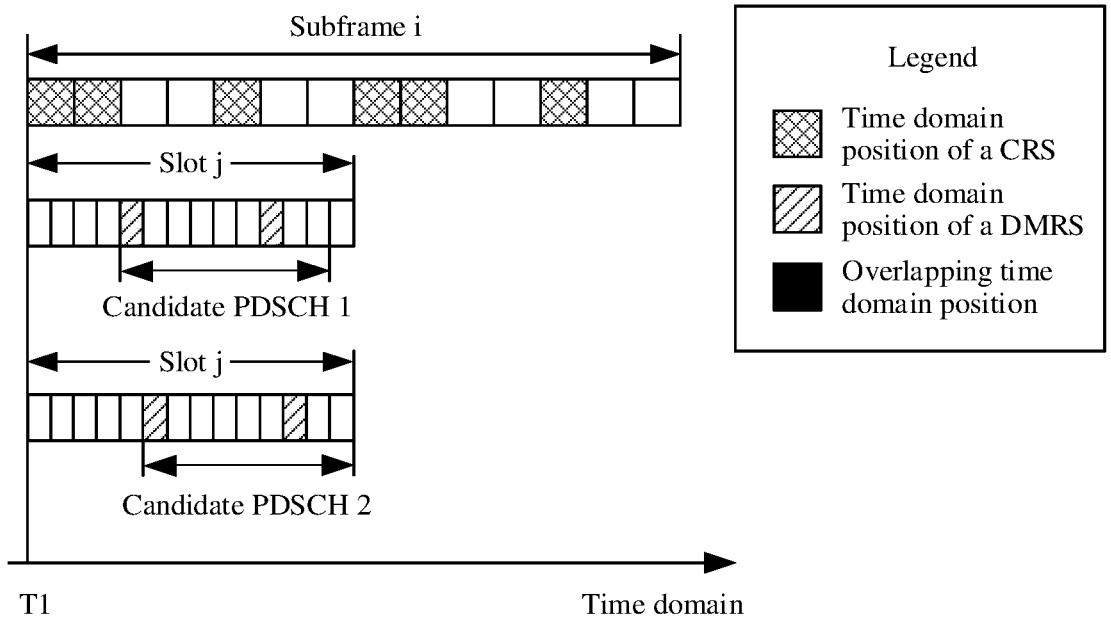

As shown in FIG. 13E, when a nine-symbol PDSCH is scheduled in a slot j, Δl=6, and a start symbol of a PDSCH does not overlap a time domain position of a CRS set, candidate PDSCHs of the nine-symbol PDSCH are respectively a candidate PDSCH 1 and a candidate PDSCH 2. It can be learned from FIG. 13E that, for the nine-symbol PDSCH, when Δl=6, the quantity of candidate PDSCHs that meet the first condition is 2, and the candidate PDSCHs are respectively the candidate PDSCH 1 and the candidate PDSCH 2. When the start symbol of the PDSCH does not overlap the time domain position of the CRS set, the quantity of PDSCHs that meet the second condition is 0.

Figure 13F:
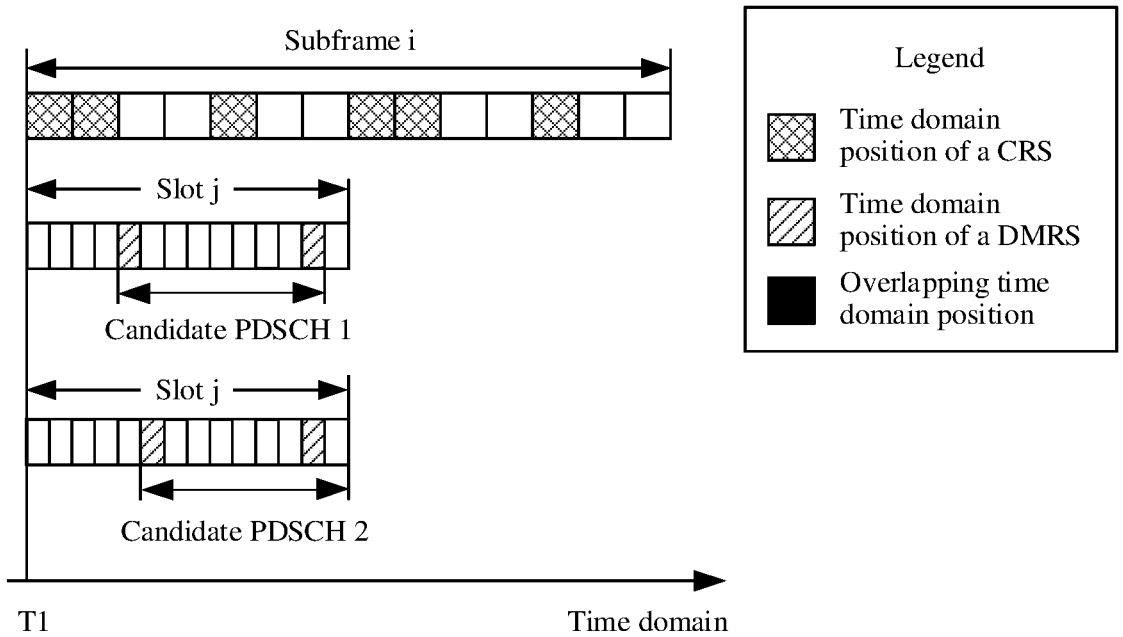

As shown in FIG. 13F, when a nine-symbol PDSCH is scheduled in a slot j, Δl=7, and a start symbol of a PDSCH does not overlap a time domain position of a CRS set, candidate PDSCHs of the nine-symbol PDSCH are respectively a candidate PDSCH 1 and a candidate PDSCH 2. It can be learned from FIG. 13F that, for the nine-symbol PDSCH, when Δl=7, the quantity of candidate PDSCHs that meet the first condition is 2, and the candidate PDSCHs are respectively the candidate PDSCH 1 and the candidate PDSCH 2. When the start symbol of the PDSCH does not overlap the time domain position of the CRS set, the quantity of PDSCHs that meet the second condition is 0.

Figure 13G:
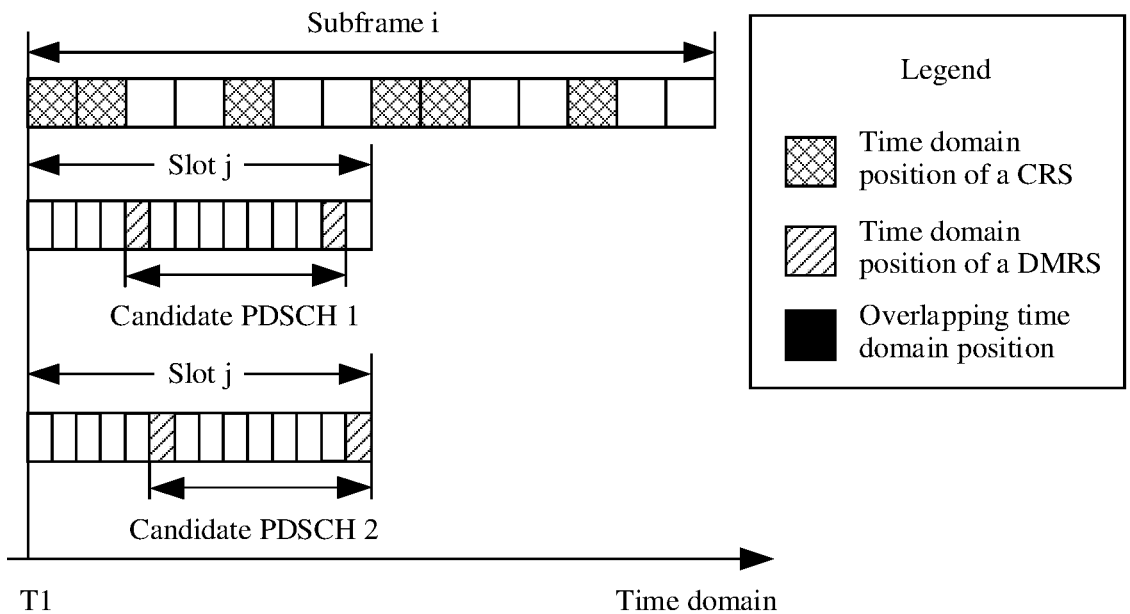

As shown in FIG. 13G, when a nine-symbol PDSCH is scheduled in a slot j, Δl=8, and a start symbol of a PDSCH does not overlap a time domain position of a CRS set, candidate PDSCHs of the nine-symbol PDSCH are respectively a candidate PDSCH 1 and a candidate PDSCH 2. It can be learned from FIG. 13G that, for the nine-symbol PDSCH, when Δl=8, the quantity of candidate PDSCHs that meet the first condition is 2, and the candidate PDSCHs are respectively the candidate PDSCH 1 and the candidate PDSCH 2. When the start symbol of the PDSCH does not overlap the time domain position of the CRS set, the quantity of PDSCHs that meet the second condition is 0.

Figure 13H:
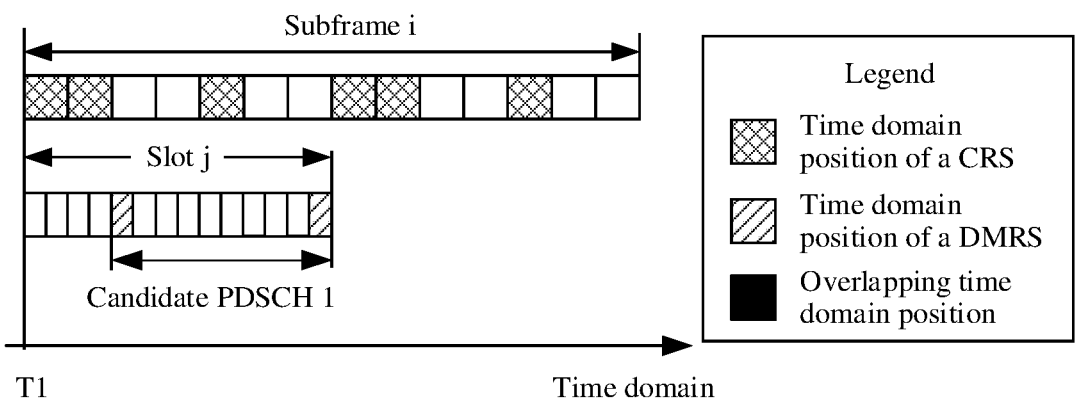

As shown in FIG. 13H, when a 10-symbol PDSCH is scheduled in a slot j, Δl=9, and a start symbol of a PDSCH does not overlap a time domain position of a CRS set, a candidate PDSCH of the 10-symbol PDSCH is a candidate PDSCH 1. It can be learned from FIG. 13H that, for the 10-symbol PDSCH, when Δl=9, the quantity of candidate PDSCHs that meet the first condition is 1, and the candidate PDSCH is the candidate PDSCH 1. When the start symbol of the PDSCH does not overlap the time domain position of the CRS set, the quantity of PDSCHs that meet the second condition is 0.

With reference to FIG. 12A to FIG. 12H and FIG. 13A to FIG. 13H, when the value of N is 2, the frame structure parameter corresponding to the DMRS set is the 15 kHz subcarrier spacing, duration L of the PDSCH is 9 and 10, and Δl has different values, statistics about the quantity of candidate PDSCHs that meet the first condition are shown in Table 2.

TABLE 2

| | A DMRS corresponds to a 30 kHz subcarrier spacing | | | |
| --- | --- | --- | --- | --- |
| | A quantity of antenna ports corresponding to a CRS is 2 | | A quantity of antenna ports corresponding to a CRS is 4 | |
| Δl | L = 9 | L = 10 | L = 9 | L = 10 |
| 2 | 4 | 3 | 2 | 2 |
| 3 | 3 | 3 | 2 | 1 |
| 4 | 2 | 2 | 0 | 0 |
| 5 | 2 | 1 | 1 | 0 |
| 6 | 2 | 1 | 2 | 1 |
| 7 | 3 | 2 | 2 | 1 |
| 8 | 4 | 3 | 2 | 1 |
| 9 | — | 3 | — | 1 |

According to Table 2, a value of the first threshold may be set based on an actual situation. For example, the value of the first threshold is 1. For the 30 kHz subcarrier spacing, when Δl=3, 7, or 8, the duration L of the PDSCH is nine or 10 symbols, and the quantity of antenna ports of the CRS is 2 or 4, the quantity of candidate PDSCHs that meet the first condition is greater than or equal to the first threshold. Therefore, the time domain position of the DMRS set on the PDSCH may be defined as the start symbol $l_0$ of the PDSCH and a symbol $l_0+3$, a symbol $l_0+7$, or a symbol $l_0+8$ of the PDSCH in a communications protocol. For example, the time domain position of the DMRS set on the PDSCH may be defined as the start symbol $l_0$ of the PDSCH and the symbol $l_0+8$ of the PDSCH in the communications protocol in the following manner a PDSCH mapping type being a type B, L being 9, $l_0$ being 0, $l_0+\Delta l$, and Δl being 8, or a PDSCH mapping type being a type B, L being 10, $l_0$ being 0, $l_0+\Delta l$, and Δl being 8.

In this case, for the 30 kHz subcarrier spacing, the time domain position, indicated by the first indication information, of the DMRS set on the PDSCH is the start symbol $l_0$ of the PDSCH and the symbol $l_0+8$ of the PDSCH.

In addition, in some other embodiments, the duration L of the PDSCH is 10 symbols. If the value of the first threshold is 1, for the 30 kHz subcarrier spacing, when Δl=9, and the quantity of antenna ports of the CRS is 2 or 4, the quantity of candidate PDSCHs that meet the first condition is greater than or equal to the first threshold. Therefore, the time domain position of the DMRS set on the PDSCH may be defined as the start symbol $l_0$ of the PDSCH and a symbol $l_0+9$ of the PDSCH in a communications protocol.

For example, the time domain position of the DMRS set on the PDSCH may be defined as the start symbol $l_0$ of the PDSCH and the symbol $l_0+9$ of the PDSCH in the communications protocol in the following manner of a PDSCH mapping type being a type B, L being 10, $l_0$ being 0, $l_0+\Delta l$, and Δl being 9.

In some other embodiments, a second threshold may be further set to further limit the candidate PDSCH, and the time domain position of the DMRS set on the PDSCH is defined based on a value of Δl when both the first condition and the second condition are met.

When a value of N is 3, the DMRS set includes a first DMRS, a second DMRS, and a third DMRS. When the DMRS set corresponds to the 30 kHz subcarrier spacing, a time domain position of the first DMRS on the PDSCH is a start symbol $l_0$ of the PDSCH, a time domain position of the second DMRS on the PDSCH may be a symbol $l_0+\Delta l_1$ of the PDSCH, and a time domain position of the third DMRS on the PDSCH may be a symbol $l_0+\Delta l_2$ of the PDSCH. $\Delta l_1$ is a quantity of symbols between a start symbol of the first DMRS and a start symbol of the second DMRS, and $\Delta l_2$ is a quantity of symbols between the start symbol of the first DMRS and a start symbol of the third DMRS.

For example, a value of $\Delta l_1$ may be a value of $\Delta l$ that enables the quantity of candidate PDSCHs that meet the first condition to be greater than or equal to the first threshold and that is in 4, 5, and 6 in Table 2. For example, when the first threshold is 1 and $\Delta l$ is 6, the quantity of candidate PDSCHs that meet the first condition is greater than or equal to 1. Therefore, the time domain position of the second DMRS on the PDSCH may be a symbol $l_0+6$ of the PDSCH. A value of $\Delta l_2$ may be a value of $\Delta l$ that enables the quantity of candidate PDSCHs that meet the first condition to be greater than or equal to the first threshold and that is in 7, 8, and 9 in Table 2. For example, when the first threshold is 1 and $\Delta l$ is 7 or 8, the quantity of candidate PDSCHs that meet the first condition is greater than or equal to 1. Therefore, the time domain position of the third DMRS on the PDSCH may be a symbol $l_0+7$ or a symbol $l_0+8$ of the PDSCH.

For another example, a value of $\Delta l_1$ may be a value of $\Delta l$ that enables the quantity of candidate PDSCHs that meet the first condition to be greater than or equal to the first threshold and that is in 2 and 3 in Table 1. For example, when the first threshold is 1 and $\Delta l$ is 2 or 3, the quantity of candidate PDSCHs that meet the first condition is greater than or equal to 1. Therefore, the time domain position of the second DMRS on the PDSCH may be a symbol $l_0+2$ or a symbol $l_0+3$ of the PDSCH. For another example, when the first threshold is 2 and $\Delta l$ is 2, the quantity of candidate PDSCHs that meet the first condition is greater than or equal to 2. Therefore, the time domain position of the second DMRS on the PDSCH may be a symbol $l_0+2$ of the PDSCH. A value of $\Delta l_2$ may be a value of $\Delta l$ that enables the quantity of candidate PDSCHs that meet the first condition to be greater than or equal to the first threshold and that is in 7, 8, and 9 in Table 1. For example, when the first threshold is 1 and $\Delta l$ is 7 or 8, the quantity of candidate PDSCHs that meet the first condition is greater than or equal to 1. Therefore, the time domain position of the third DMRS on the PDSCH may be a symbol $l_0+7$ or a symbol $l_0+8$ of the PDSCH. Alternatively, a value of $\Delta l_2$ may be a value of $\Delta l$ that enables the quantity of candidate PDSCHs that meet the first condition to be greater than or equal to the first threshold and that is in 4, 5, and 6 in Table 1. For example, when the first threshold is 1 and $\Delta l$ is 6, the quantity of candidate PDSCHs that meet the first condition is greater than or equal to 1. Therefore, the time domain position of the third DMRS on the PDSCH may be a symbol $l_0+6$ of the PDSCH.

Further, considering that there is a relatively small symbol interval between time domain positions of different DMRSs on the PDSCH, reliability of channel estimation may be affected. In some embodiments, when N is 3, it may be defined in a communications protocol that the time domain position of the first DMRS on the PDSCH is a start symbol $l_0$ of the PDSCH, the time domain position of the second DMRS on the PDSCH is a symbol $l_0+2$ or a symbol $l_0+3$ of the PDSCH, and the time domain position of the third DMRS on the PDSCH is a symbol $l_0+7$ or a symbol $l_0+8$ of the PDSCH.

For example, the time domain position of the first DMRS on the PDSCH is the start symbol $l_0$ of the PDSCH, the time domain position of the second DMRS on the PDSCH is a symbol $l_0+\Delta l_1$ of the PDSCH, and the time domain position of the third DMRS on the PDSCH is a symbol $l_0+\Delta l_2$ of the PDSCH, where $\Delta l_1=2$ or 3, and $\Delta l_2=7$ or 8. For example, the time domain position of the DMRS set on the PDSCH may be defined in the communications protocol in the following manner, including a PDSCH mapping type being a type B, L being 9, $l_0$ being 0, $l_0+\Delta l_1$, $l_0+\Delta l_2$, $\Delta l_1$ being 2, and $\Delta l_2$ being 7, or a PDSCH mapping type being a type B, L being 9, $l_0$ being 0, $l_0+\Delta l_1$, $l_0+\Delta l_2$, $\Delta l_1$ being 3, and $\Delta l_2$ being 7, or a PDSCH mapping type being a type B, L being 9, $l_0$ being 0, $l_0+\Delta l_1$, $l_0+\Delta l_2$, $\Delta l_1$ being 2, and $\Delta l_2$ being 8, or a PDSCH mapping type being a type B, L being 9, $l_0$ being 0, $l_0+\Delta l_1$, $l_0+\Delta l_2$, $\Delta l_1$ being 3, and $\Delta l_2$ being 8, or a PDSCH mapping type being a type B, L being 10, $l_0$ being 0, $l_0+\Delta l_1$, $l_0+\Delta l_2$, $\Delta l_1$ being 2, and $\Delta l_2$ being 7, or a PDSCH mapping type being a type B, L being 10, $l_0$ being 0, $l_0+\Delta l_1$, $l_0+\Delta l_2$, $\Delta l_1$ being 3, and $\Delta l_2$ being 7, or a PDSCH mapping type being a type B, L being 10, $l_0$ being 0, $l_0+\Delta l_1$, $l_0+\Delta l_2$, $\Delta l_1$ being 2, and $\Delta l_2$ being 8, or a PDSCH mapping type being a type B, L being 10, $l_0$ being 0, $l_0+\Delta l_1$, $l_0+\Delta l_2$, $\Delta l_1$ being 3, and $\Delta l_2$ being 8.

When a value of N is 4, the DMRS set includes a first DMRS, a second DMRS, a third DMRS, and a fourth DMRS. When the DMRS set corresponds to the 30 kHz subcarrier spacing, a time domain position of the first DMRS on the PDSCH is a start symbol $l_0$ of the PDSCH, a time domain position of the second DMRS on the PDSCH may be a symbol $l_0+\Delta l_1$ of the PDSCH, a time domain position of the third DMRS on the PDSCH may be a symbol $l_0+\Delta l_2$ of the PDSCH, and a time domain position of the fourth DMRS on the PDSCH may be a symbol $l_0+\Delta l_3$ of the PDSCH. $\Delta l_1$ is a quantity of symbols between a start symbol of the first DMRS and a start symbol of the second DMRS, $\Delta l_2$ is a quantity of symbols between the start symbol of the first DMRS and a start symbol of the third DMRS, and $\Delta l_3$ is a quantity of symbols between the start symbol of the first DMRS and a start symbol of the fourth DMRS.

For example, a value of $\Delta l_1$ may be a value of $\Delta l$ that enables the quantity of candidate PDSCHs that meet the first condition to be greater than or equal to the first threshold and that is in 2 and 3 in Table 1. For example, when the first threshold is 1 and $\Delta l$ is 2 or 3, the quantity of candidate PDSCHs that meet the first condition is greater than or equal to 1. Therefore, the time domain position of the second DMRS on the PDSCH may be a symbol $l_0+2$ or a symbol $l_0+3$ of the PDSCH. For another example, when the first threshold is 2 and $\Delta l$ is 2, the quantity of candidate PDSCHs that meet the first condition is greater than or equal to 2. Therefore, the time domain position of the second DMRS on the PDSCH may be a symbol $l_0+2$ of the PDSCH. A value of $\Delta l_2$ may be a value of $\Delta l$ that enables the quantity of candidate PDSCHs that meet the first condition to be greater than or equal to the first threshold and that is in 4, 5, and 6 in Table 1. For example, when the first threshold is 1 and $\Delta l$ is 6, the quantity of candidate PDSCHs that meet the first condition is greater than or equal to 1. Therefore, the time domain position of the third DMRS on the PDSCH may be a symbol $l_0+6$ of the PDSCH. A value of $\Delta l_3$ may be a value of $\Delta l$ that enables the quantity of candidate PDSCHs that meet the first condition to be greater than or equal to the first threshold and that is in 7, 8, and 9 in Table 1. For example, when the first threshold is 1 and $\Delta l$ is 7 or 8, the quantity of candidate PDSCHs that meet the first condition is greater than or equal to 2. Therefore, the time domain position of the fourth DMRS on the PDSCH may be a symbol $l_0+7$ or a symbol $l_0+8$ of the PDSCH.

Further, considering that there is a relatively small symbol interval between time domain positions of different DMRSs on the PDSCH, reliability of channel estimation may be affected. In some embodiments, when N is 4, it may be defined in a communications protocol that the time domain position of the first DMRS on the PDSCH is a start symbol $l_0$ of the PDSCH, the time domain position of the second DMRS on the PDSCH is a symbol $l_0+3$ of the PDSCH, the time domain position of the third DMRS on the PDSCH is a symbol $l_0+6$ of the PDSCH, and the time domain position of the fourth DMRS on the PDSCH is a symbol $l_0+8$ of the PDSCH.

For example, the time domain position of the first DMRS on the PDSCH is the start symbol $l_0$ of the PDSCH, the time domain position of the second DMRS on the PDSCH is a symbol $l_0+\Delta l_1$ of the PDSCH, the time domain position of the third DMRS on the PDSCH is a symbol $l_0+\Delta l_2$ of the PDSCH, and the time domain position of the fourth DMRS on the PDSCH is a symbol $l_0+\Delta l_3$ of the PDSCH, where $\Delta l_1=3$, $\Delta l_2=6$, and $\Delta l_3=8$. For example, the time domain position of the DMRS set on the PDSCH may be defined in the communications protocol in the following manner, including a PDSCH mapping type being a type B, L being 9, $l_0$ being 0, $l_0+\Delta l_1$, $l_0+\Delta l_2$, $l_0+\Delta l_3$, $\Delta l_1$ being 3, $\Delta l_2$ being 6, and $\Delta l_3$ being 8, or a PDSCH mapping type being a type B, L being 10, $l_0$ being 0, $l_0+\Delta l_1$, $l_0+\Delta l_2$, $l_0+\Delta l_3$, $\Delta l_1$ being 3, $\Delta l_2$ being 6, and $\Delta l_3$ being 8.

The one-symbol DMRS is used as an example. Based on the foregoing descriptions, a time domain position, designed for each of a 15 kHz subcarrier spacing and a 30 kHz subcarrier spacing, of a DMRS set on a PDSCH may be shown in Table 3.

TABLE 3

| | Time domain position of a DMRS | | | | | |
|---|---|---|---|---|---|---|
| | 15 kHz subcarrier spacing | | | 30 kHz subcarrier spacing | | |
| L | N = 2 | N = 3 | N = 4 | N = 2 | N = 3 | N = 4 |
| 9 | $l_0$ and $l_0+7$ | $l_0, l_0+3$, and $l_0+7$ | $l_0, l_0+2, l_0+4$, and $l_0+7$ | $l_0$ and $l_0+8$ | $l_0, l_0+2$, and $l_0+8$ | $l_0, l_0+3, l_0+6$, and $l_0+8$ |
| 10 | $l_0$ and $l_0+7$ | $l_0, l_0+3$, and $l_0+7$ | $l_0, l_0+2, l_0+4$, and $l_0+7$ | $l_0$ and $l_0+8$, or $l_0$ and $l_0+9$ | $l_0, l_0+2$, and $l_0+8$ | $l_0, l_0+3, l_0+6$, and $l_0+8$ |

Alternatively, in some other embodiments, a time domain position of a DMRS set on a PDSCH may be uniformly designed for different subcarrier spacings. When a time domain position of a DMRS set on a PDSCH is designed for different subcarrier spacings, a 15 kHz subcarrier spacing and a 60 kHz subcarrier spacing are used as an example. A value of Δl is required to enable, at the different subcarrier spacings, a quantity of candidate PDSCHs that meet a first condition to be greater than or equal to a first threshold. Further, in still some other embodiments, a quantity of candidate PDSCHs that meet a second condition at the different subcarrier spacings is less than or equal to a second threshold. For example, a value of the first threshold may be 1, and a value of the second threshold may be 1 or 0. In an example, a manner of uniformly designing a time domain position of a DMRS set on a PDSCH for different subcarrier spacings may be represented by using Table 4.

TABLE 4

| | Time domain position of a DMRS | | |
|---|---|---|---|
| L | N = 2 | N = 3 | N = 4 |
| 9/10 | $l_0$ and $l_0+7$, or $l_0$ and $l_0+8$ | $l_0, l_0+3$, and $l_0+7$, or $l_0, l_0+2$, and $l_0+8$, or $l_0, l_0+3$, and $l_0+8$, or $l_0, l_0+2$, and $l_0+7$ | $l_0, l_0+3, l_0+6$, and $l_0+8$ |

It should be understood that, when the DMRS set corresponds to the 60 kHz subcarrier spacing, a 120 kHz subcarrier spacing, or a 240 kHz subcarrier spacing, a time domain position of a DMRS set on a PDSCH may be predefined with reference to a manner for the 15 kHz subcarrier spacing or the 30 kHz subcarrier spacing, or may be predefined in a scenario of the 15 kHz subcarrier spacing or the 30 kHz subcarrier spacing. For example, when the DMRS set corresponds to the 60 kHz subcarrier spacing, a time domain position of a DMRS set on a PDSCH may be predefined in the scenario of the 15 kHz subcarrier spacing, or may be predefined in the scenario of the 30 kHz subcarrier spacing.

In addition, this application may alternatively be applied to a two-symbol DMRS, a three-symbol DMRS, or the like. A manner of defining a time domain position of a DMRS set on a PDSCH is described by using the two-symbol DMRS as an example.

Scenario 5:

For example, a frame structure parameter corresponding to the DMRS set is a 15 kHz subcarrier spacing, and a frame structure parameter corresponding to the CRS set is a 15 kHz subcarrier spacing. It should be noted that, that a frame structure parameter corresponding to the DMRS set is a 15 kHz subcarrier spacing may be understood as that the 15 kHz subcarrier spacing is used in NR, and that a frame structure parameter corresponding to the CRS set is a 15 kHz subcarrier spacing may be understood as that the 15 kHz subcarrier spacing is used in LTE.

A subframe i shown in FIG. 2A in LTE is used as an example. A time domain position, on the subframe i, of each CRS in the CRS set may be shown in A in FIG. 9. It may be understood that, when the time domain position, on the subframe i, of each CRS in the CRS set may be shown in A in FIG. 9, a CRS pattern is a CRS pattern shown in c in FIG. 6 when a quantity of antenna ports is 4. Referring to FIG. 2A, the subframe i includes 14 symbols: a symbol $l_0$ to a symbol 13, and a start moment of the subframe i is T1. For example, in NR, a PDSCH is scheduled based on a type B in a slot j. As shown in FIG. 3, the slot j includes 14 symbols: a symbol $l_0$ to a symbol 13, and a start moment of the slot j is T2. T1 and T2 are a same moment.

When a value of N is 2, the DMRS set includes a first DMRS and a second DMRS. The first DMRS and the second DMRS are two-symbol DMRSs. Time domain positions of the first DMRS on the PDSCH are a start symbol $l_0$ and a symbol $l_0+1$ of the PDSCH. In this case, time domain positions of the second DMRS on the PDSCH are a symbol $l_0+\Delta l$ and a symbol $l_0+\Delta l+1$ of the PDSCH. $\Delta l$ may be understood as a quantity of symbols between a start symbol of the first DMRS and a start symbol of the second DMRS. The start symbol of the first DMRS may be understood as the start symbol of the PDSCH, and the start symbol of the second DMRS may be understood as the symbol $l_0+\Delta l$ of the PDSCH.

Figure 14A:
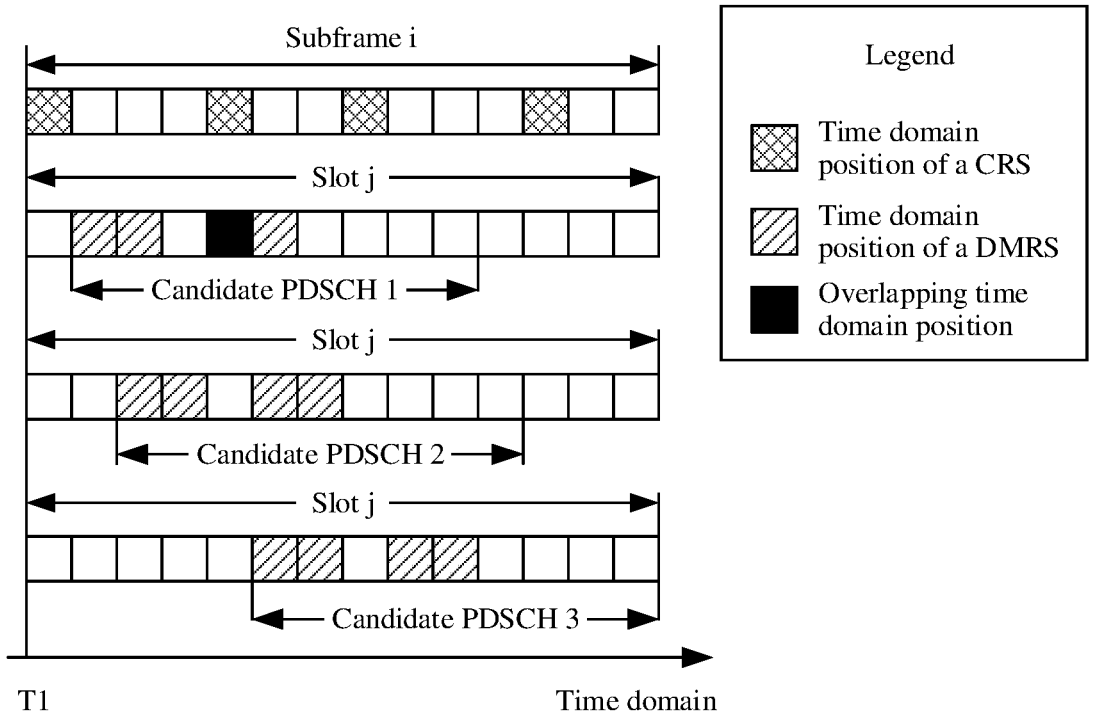
FIG. 14A to FIG. 14F are schematic diagrams of candidate PDSCHs in other different scenarios according to an embodiment of this application.
Figure 14B:
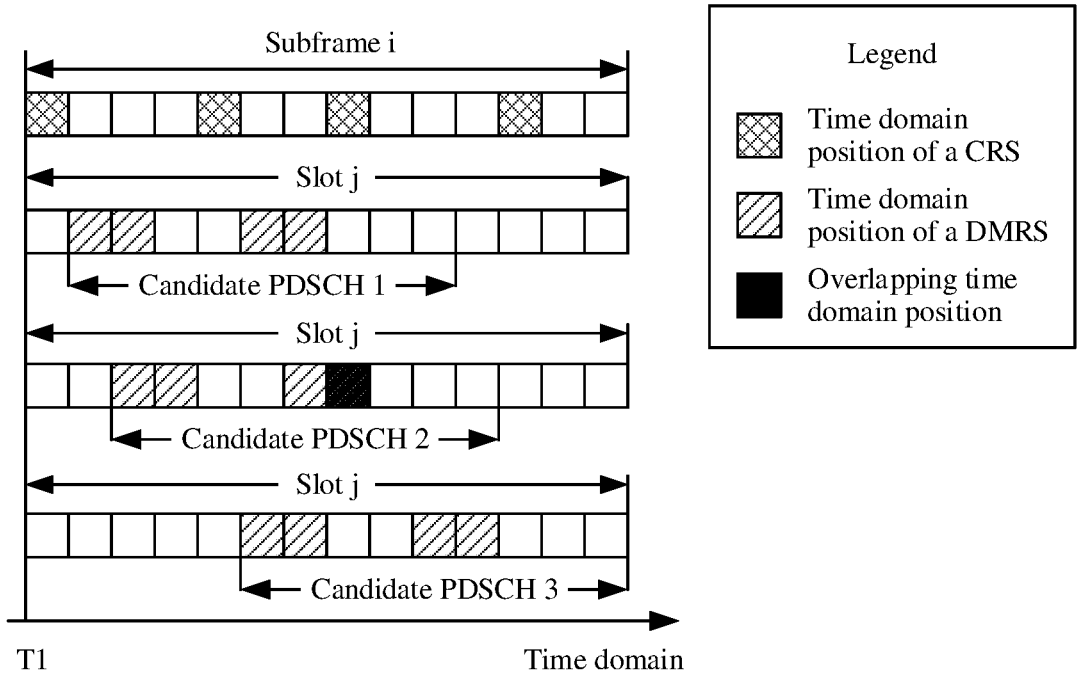
Figure 14C:
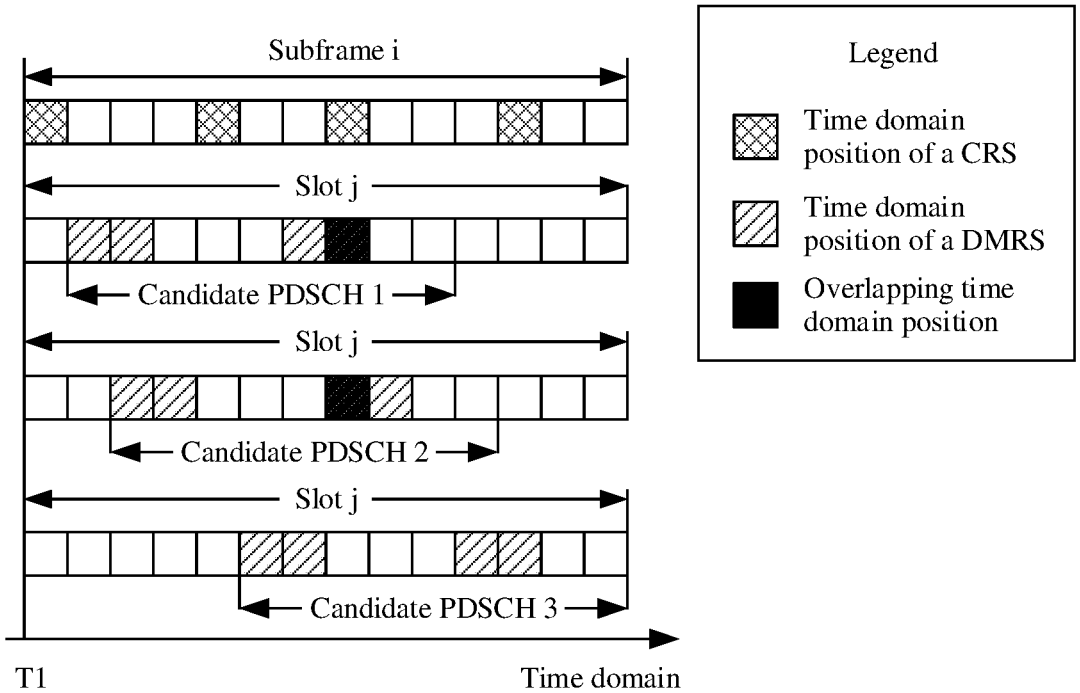
Figure 14D:
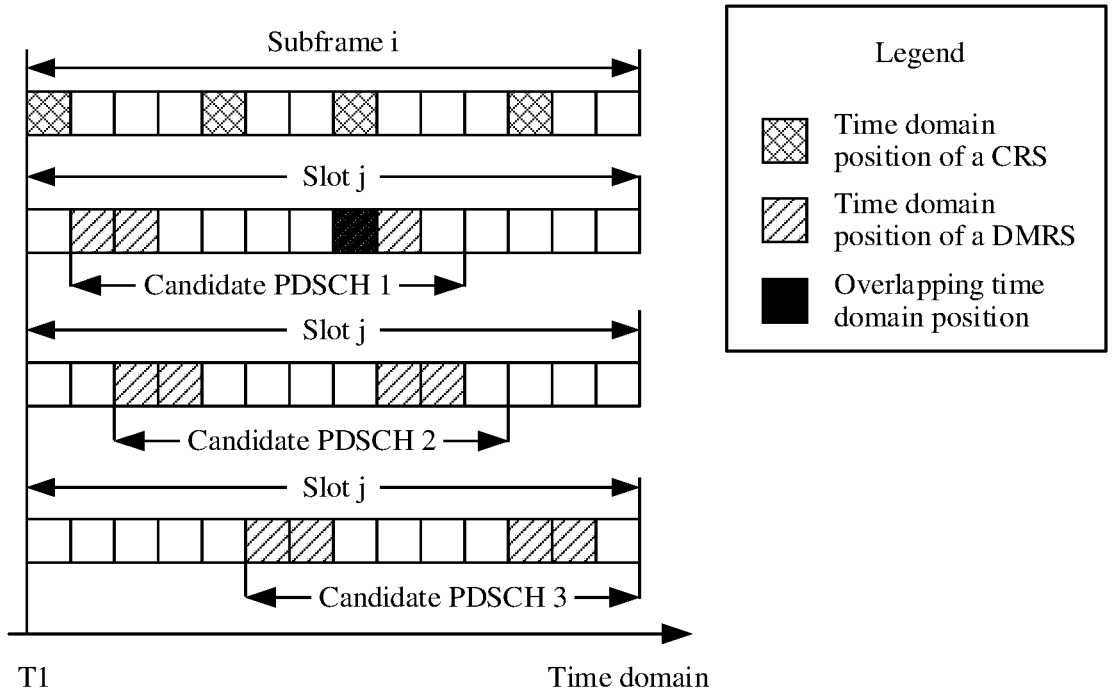
Figure 14E:
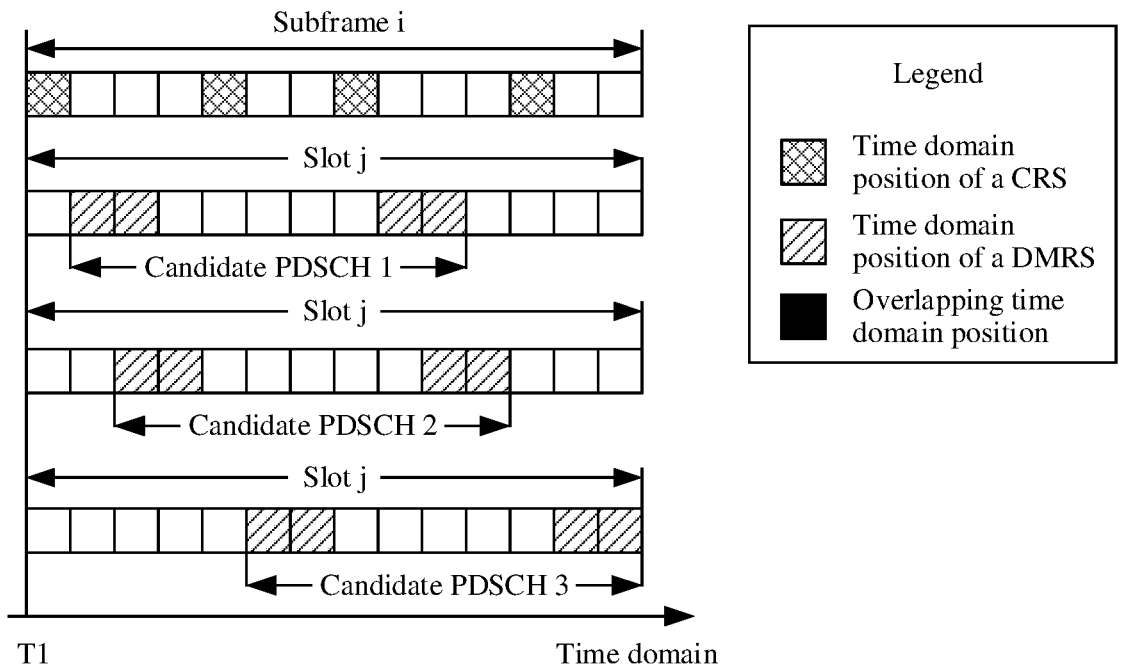

As shown in FIG. 14A, when a nine-symbol PDSCH is scheduled in a slot j, $\Delta l=3$, and a start symbol of a PDSCH does not overlap a time domain position of a CRS set, candidate PDSCHs of the nine-symbol PDSCH are respectively a candidate PDSCH 1, a candidate PDSCH 2, and a candidate PDSCH 3. For example, the candidate PDSCH 1 is used as an example. If time domain positions of a first DMRS on the candidate PDSCH 1 are a symbol 1 and a symbol 2 in the slot j, a start symbol of the first DMRS is the symbol 1 in the slot j. If time domain positions of a second DMRS on the candidate PDSCH 2 are a symbol 4 and a symbol 5 in the slot j, a start symbol of the second DMRS is the symbol 4 in the slot j. It can be learned from FIG. 14A that, for the nine-symbol PDSCH, when $\Delta l=2$, the quantity of candidate PDSCHs that meet the first condition is 2, and the candidate PDSCHs are respectively the candidate PDSCH 2 and the candidate PDSCH 3. When the start symbol of the PDSCH does not overlap the time domain position of the CRS set, the quantity of PDSCHs that meet the second condition is also 1, and the PDSCH is the candidate PDSCH 1.

Figure 14F:
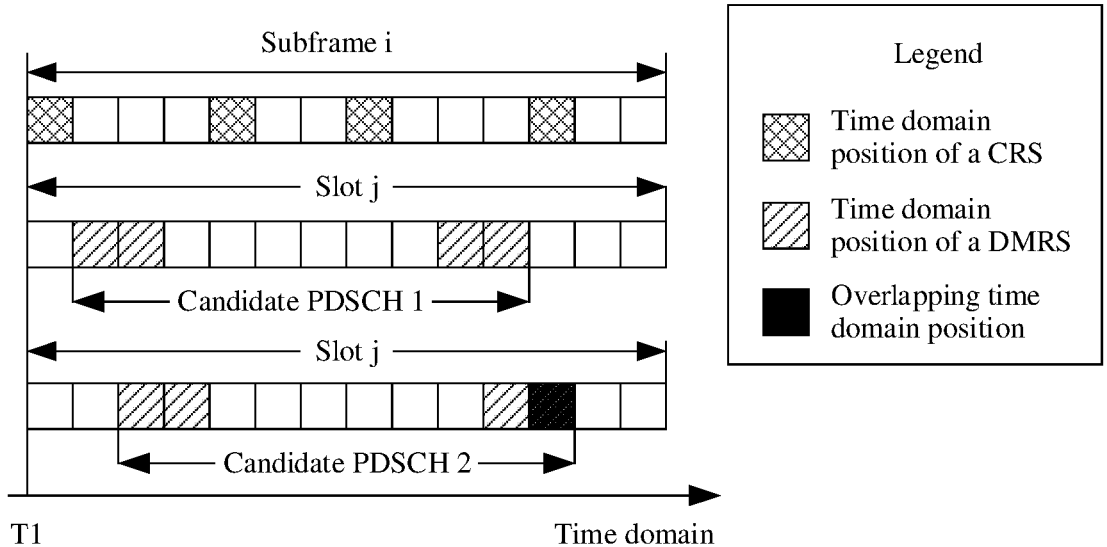

Similarly, FIG. 14B to FIG. 14E are schematic diagrams of a time domain position of a DMRS set on a candidate PDSCH when a nine-symbol PDSCH is scheduled in a slot j, $\Delta l=4$ to 7, and a start symbol of a PDSCH does not overlap a time domain position of a CRS set. FIG. 14F is a schematic diagram of a time domain position of a DMRS set on a candidate PDSCH when a 10-symbol PDSCH is scheduled in a slot j, $\Delta l=8$, and a start symbol of a PDSCH does not overlap a time domain position of a CRS set.

Figure 15A:
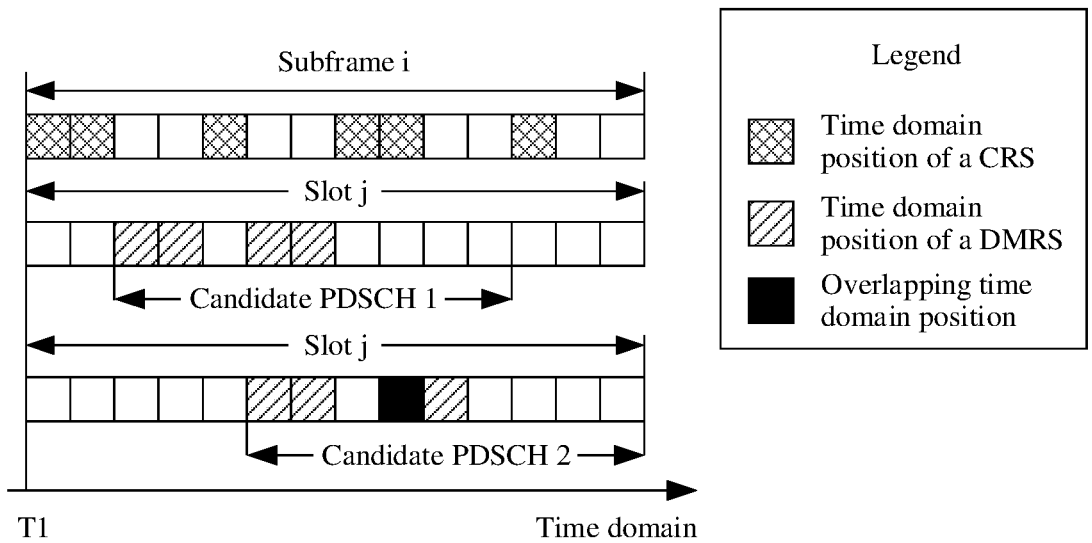
FIG. 15A to FIG. 15F are schematic diagrams of candidate PDSCHs in other different scenarios according to an embodiment of this application.
Figure 15B:
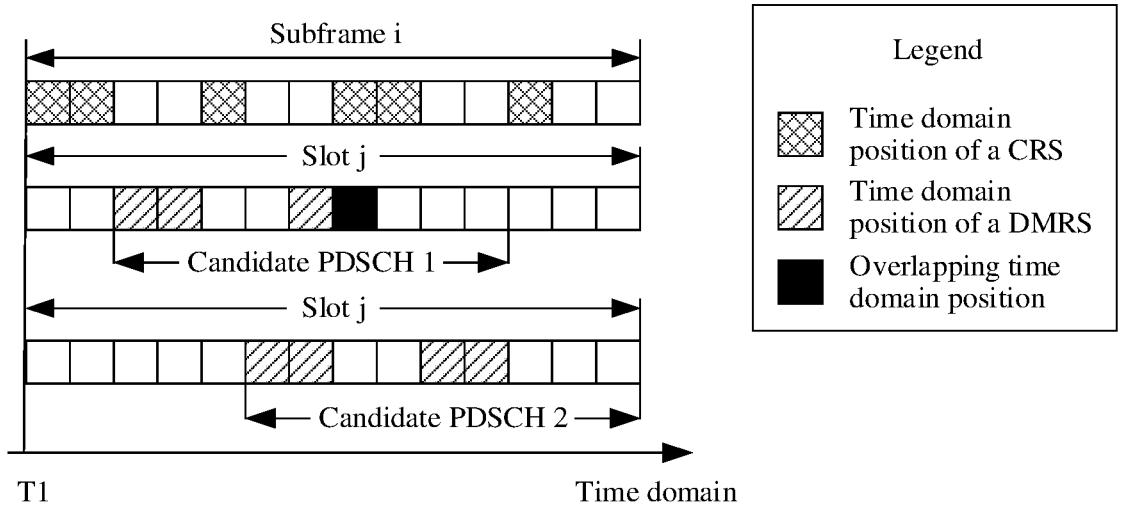
Figure 15C:
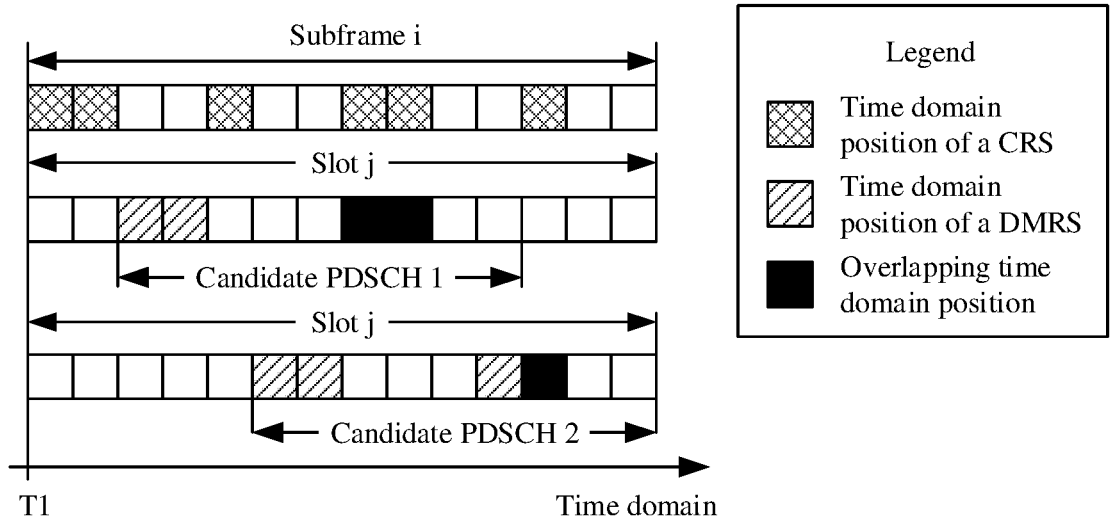
Figure 15D:
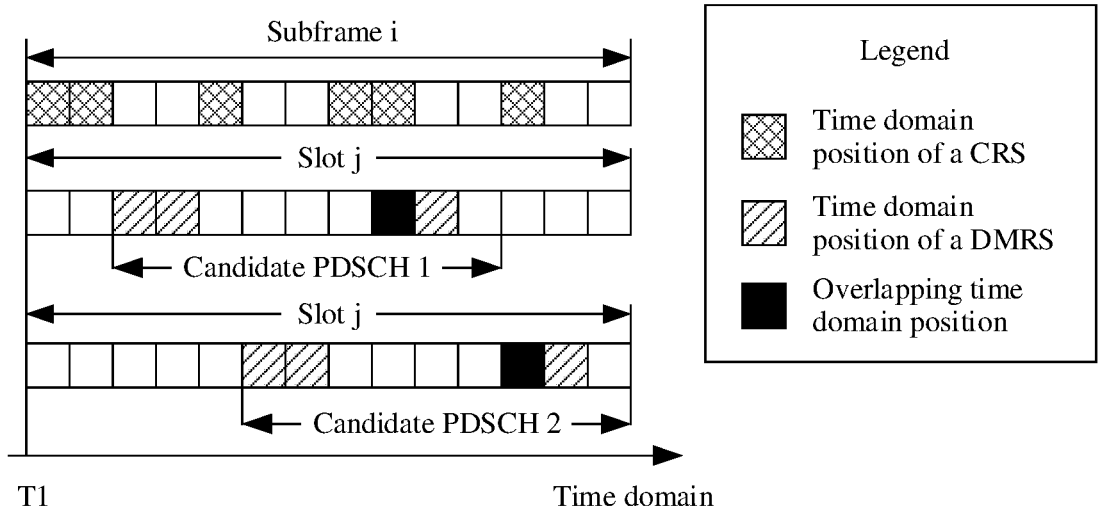
Figure 15E:
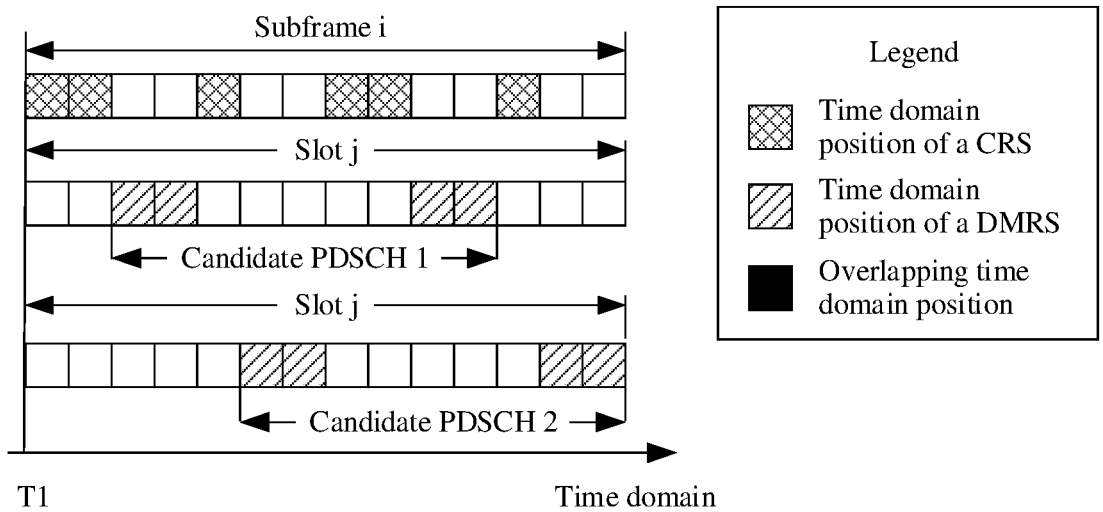
Figure 15F:
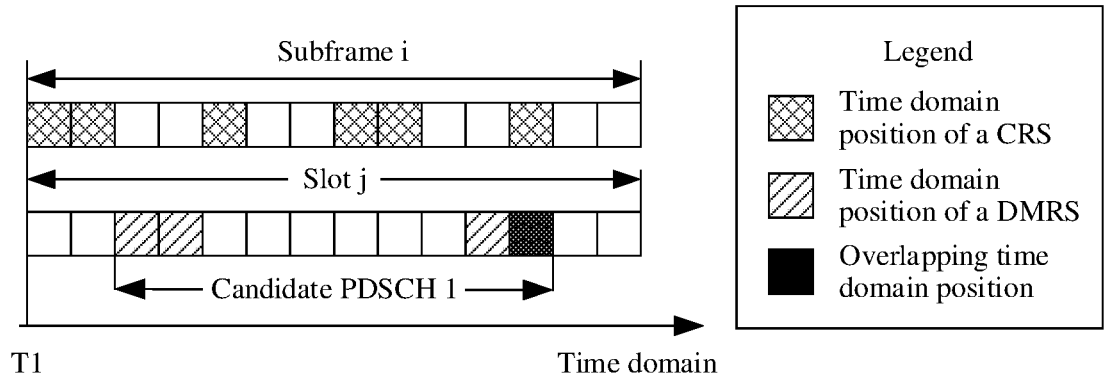

A two-symbol DMRS is used as an example. FIG. 15A to FIG. 15E are schematic diagrams of a time domain position of a DMRS set on a candidate PDSCH when a frame structure parameter corresponding to the DMRS set is a 15 kHz subcarrier spacing, a frame structure parameter corresponding to a CRS set is a 15 kHz subcarrier spacing, a time domain position, on a subframe i, of each CRS in the CRS set may be shown in B in FIG. 9, a value of N is 2, a nine-symbol PDSCH is scheduled in a slot j, $\Delta l=3$ to 7, and a start symbol of a PDSCH does not overlap a time domain position of the CRS set. FIG. 15F is a schematic diagram of a time domain position of a DMRS set on a candidate PDSCH when a 10-symbol PDSCH is scheduled in a slot j, $\Delta l=8$, and a start symbol of a PDSCH does not overlap a time domain position of a CRS set.

Figure 16A:
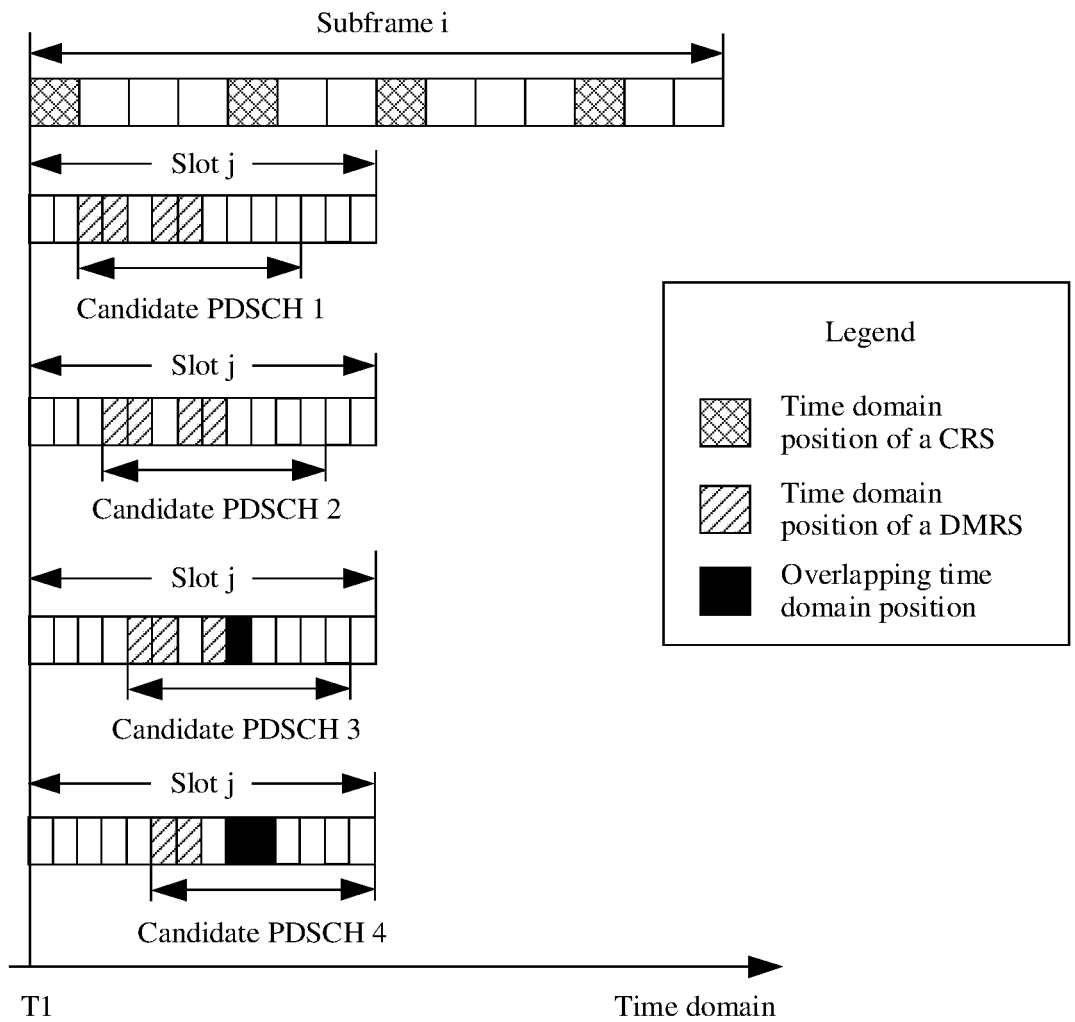
FIG. 16A to FIG. 16F are schematic diagrams of candidate PDSCHs in other different scenarios according to an embodiment of this application.
Figure 16B:
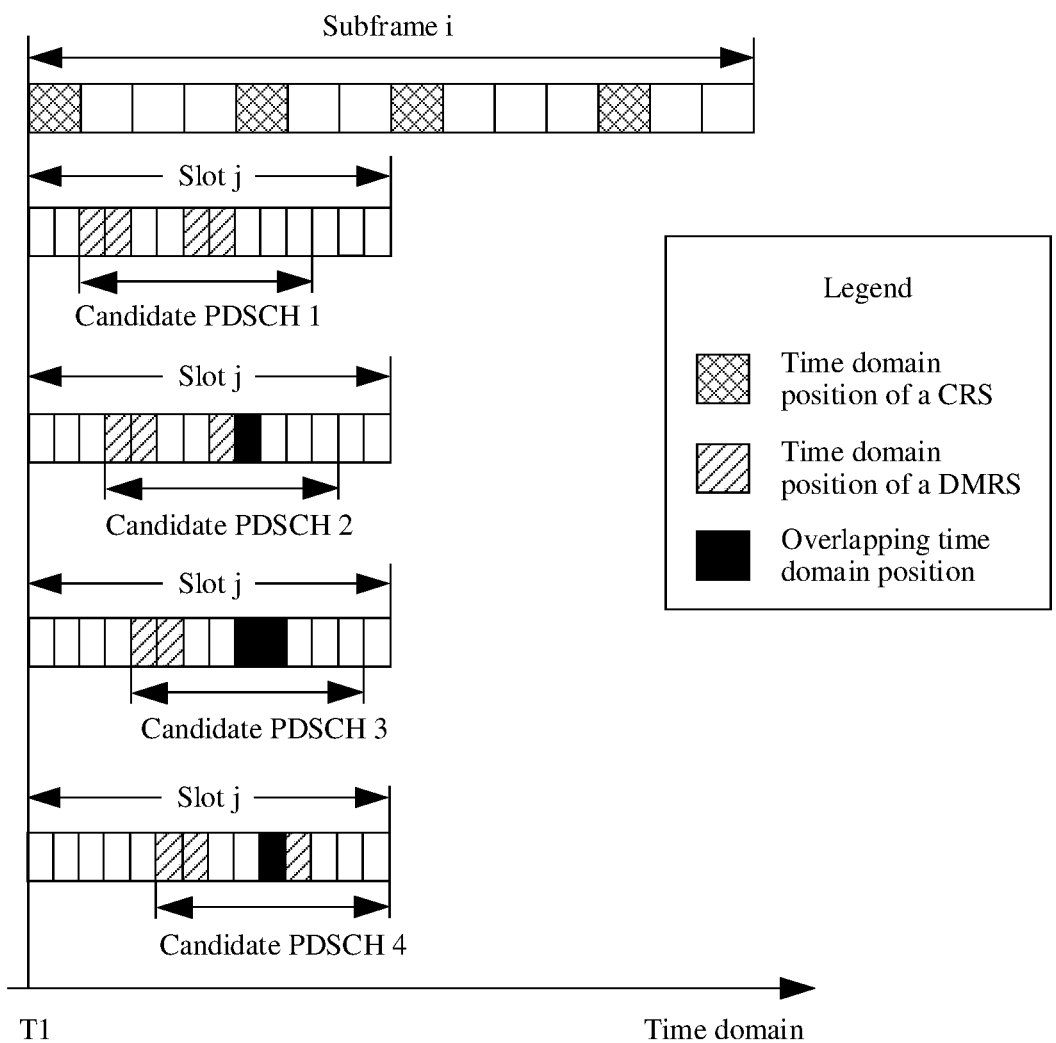
Figure 16C:
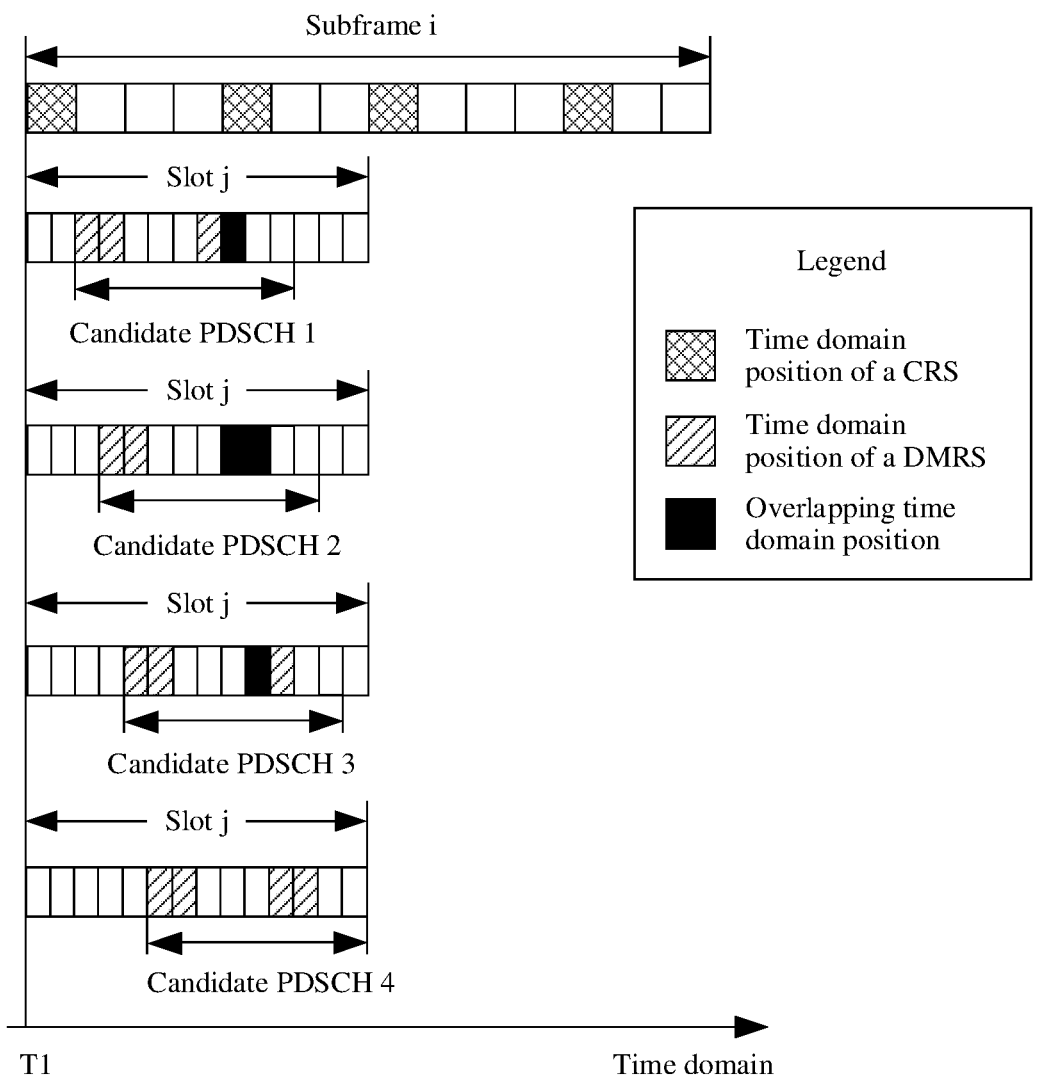
Figure 16D:
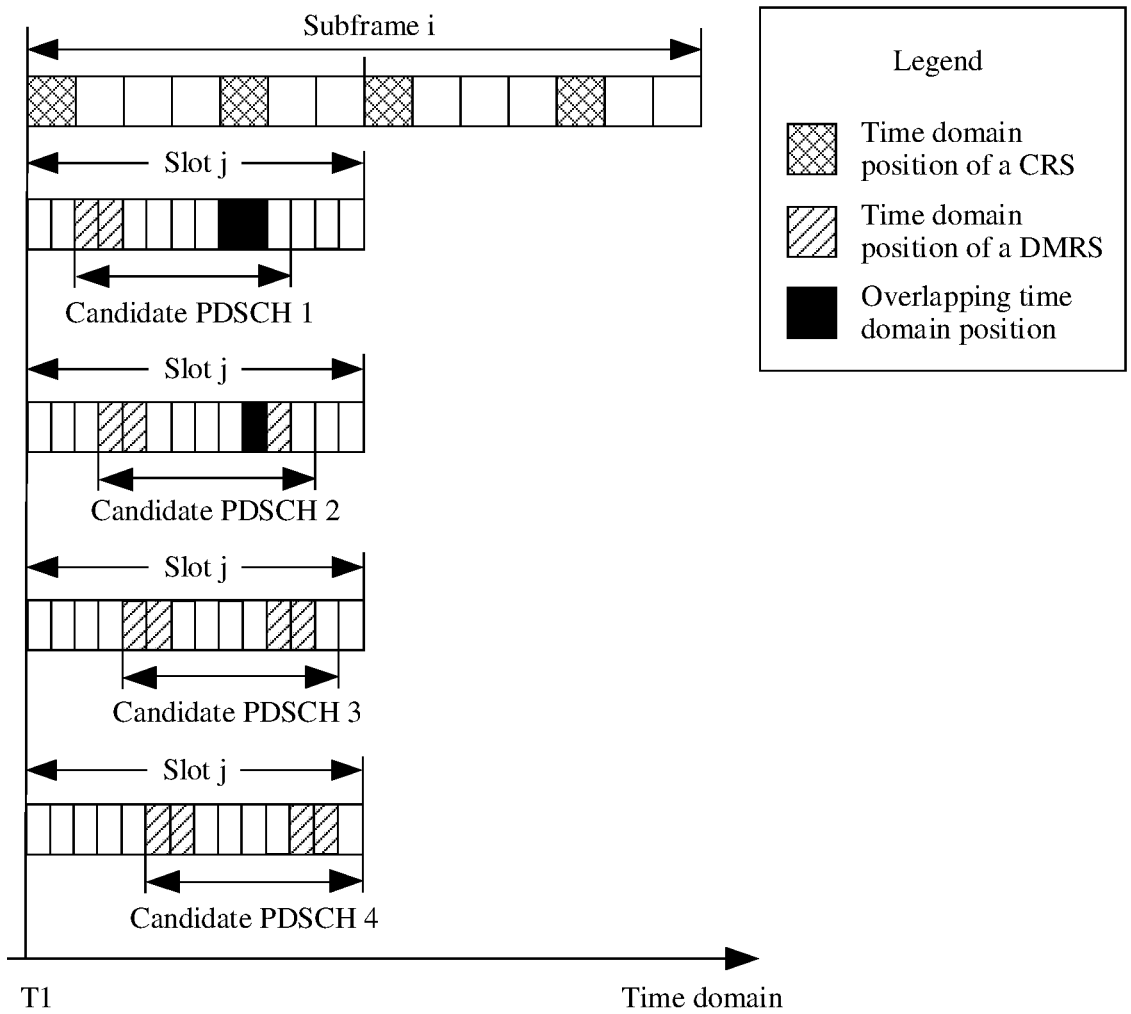
Figure 16E:
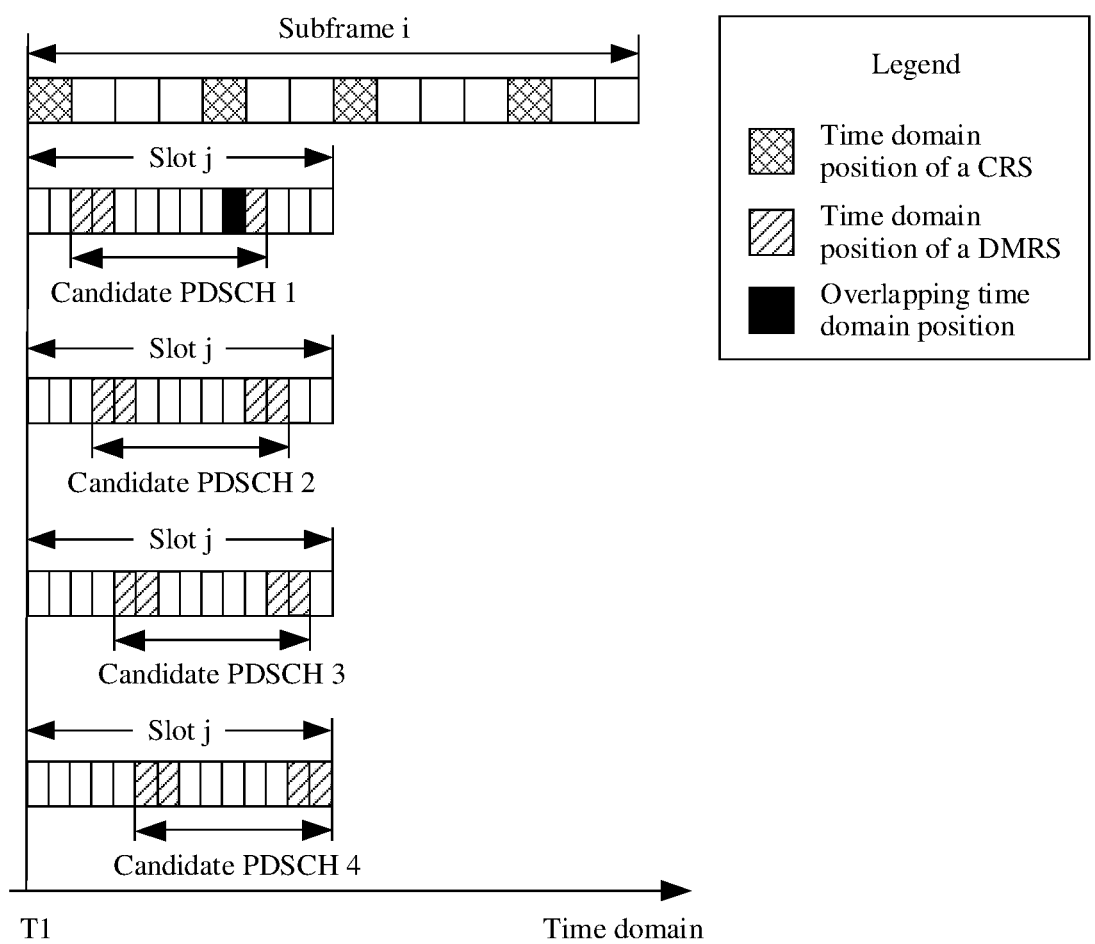
Figure 16F:
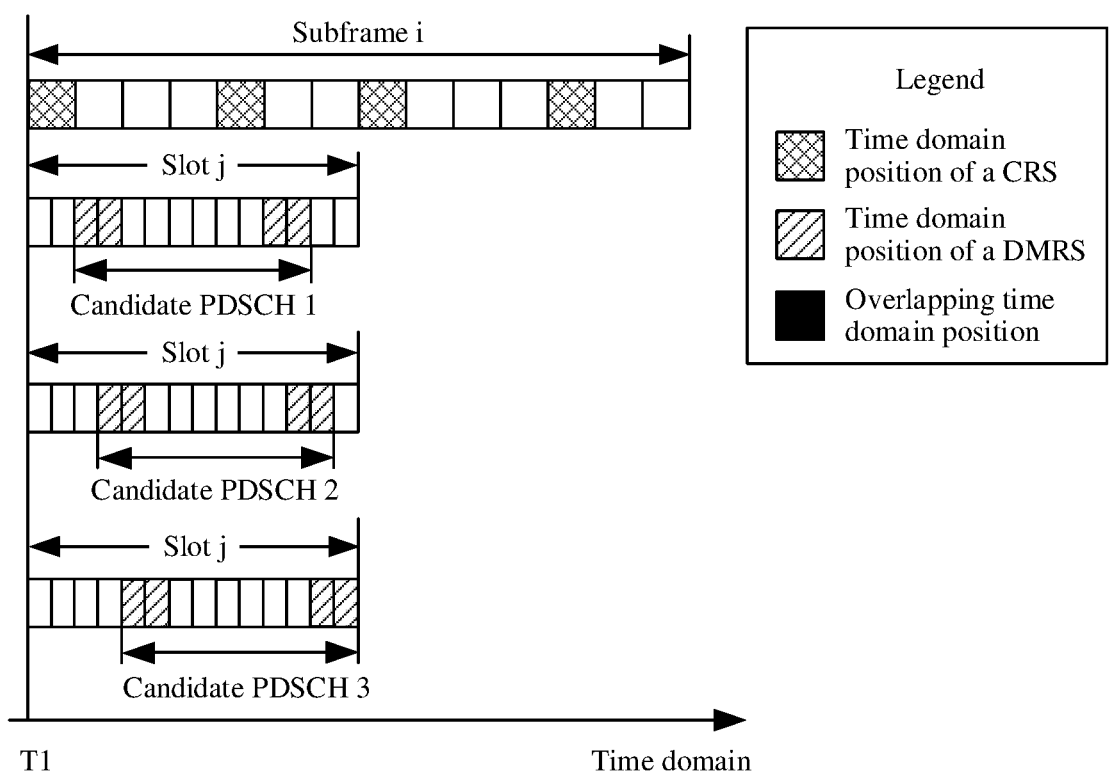

A two-symbol DMRS is used as an example. FIG. 16A to FIG. 16E are schematic diagrams of a time domain position of a DMRS set on a candidate PDSCH when a frame structure parameter corresponding to the DMRS set is a 30 kHz subcarrier spacing, a frame structure parameter corresponding to a CRS set is a 15 kHz subcarrier spacing, a time domain position, on a subframe i, of each CRS in the CRS set may be shown in A in FIG. 9, a value of N is 2, a nine-symbol PDSCH is scheduled in a slot j, $\Delta l=3$ to 7, and a start symbol of a PDSCH does not overlap a time domain position of the CRS set. FIG. 16F is a schematic diagram of a time domain position of a DMRS set on a candidate PDSCH when a 10-symbol PDSCH is scheduled in a slot j, $\Delta l=8$, and a start symbol of a PDSCH does not overlap a time domain position of a CRS set.

Figure 17A:
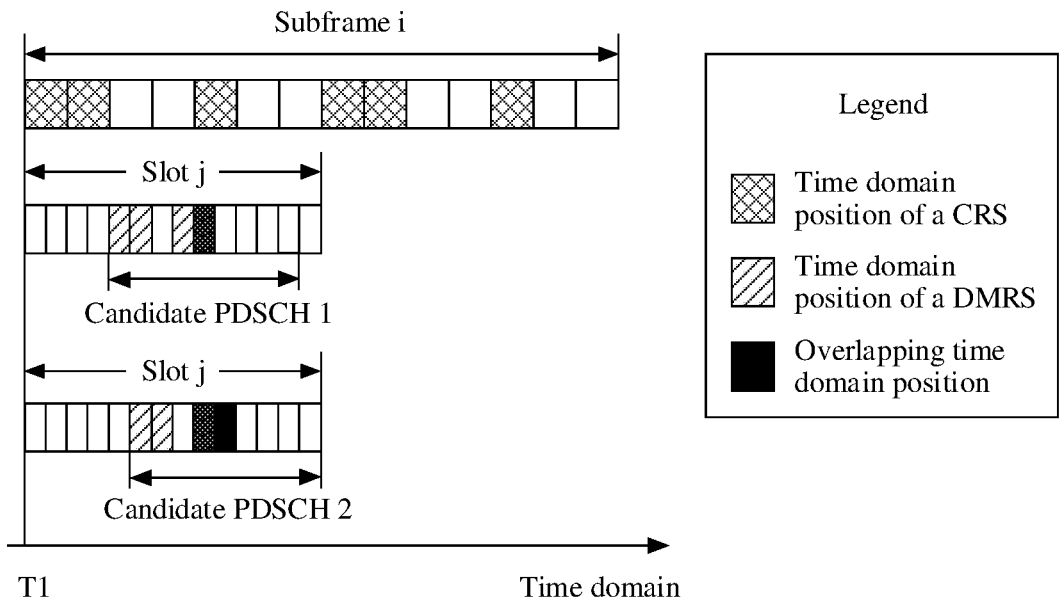
FIG. 17A to FIG. 17F are schematic diagrams of candidate PDSCHs in other different scenarios according to an embodiment of this application.
Figure 17B:
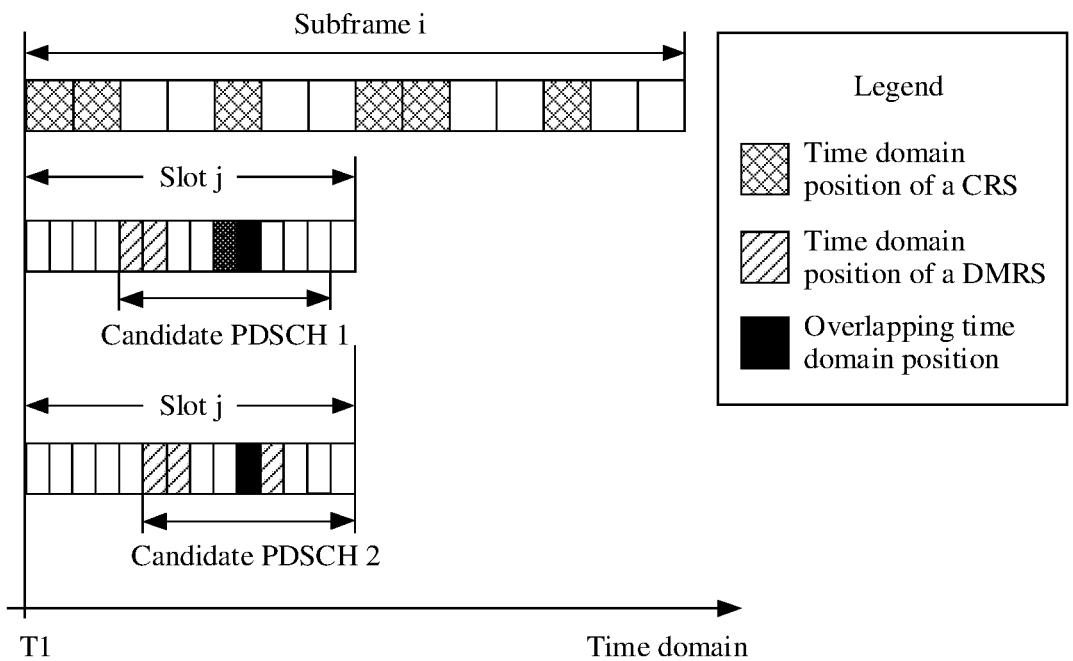
Figure 17C:
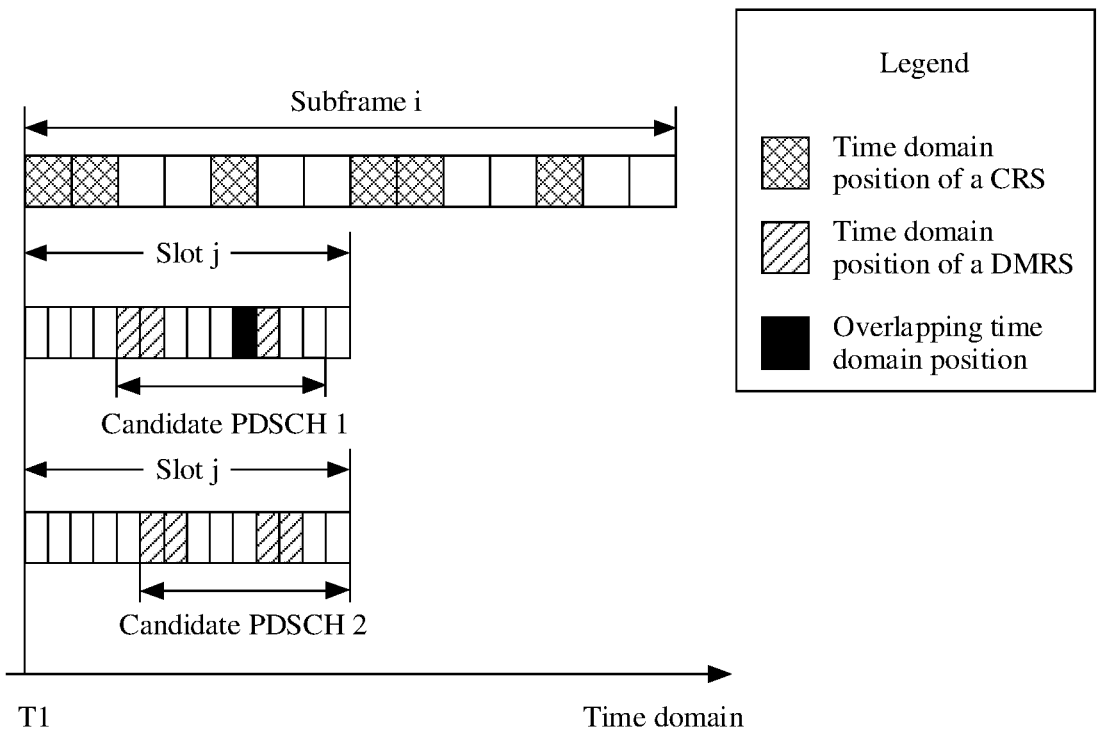
Figure 17D:
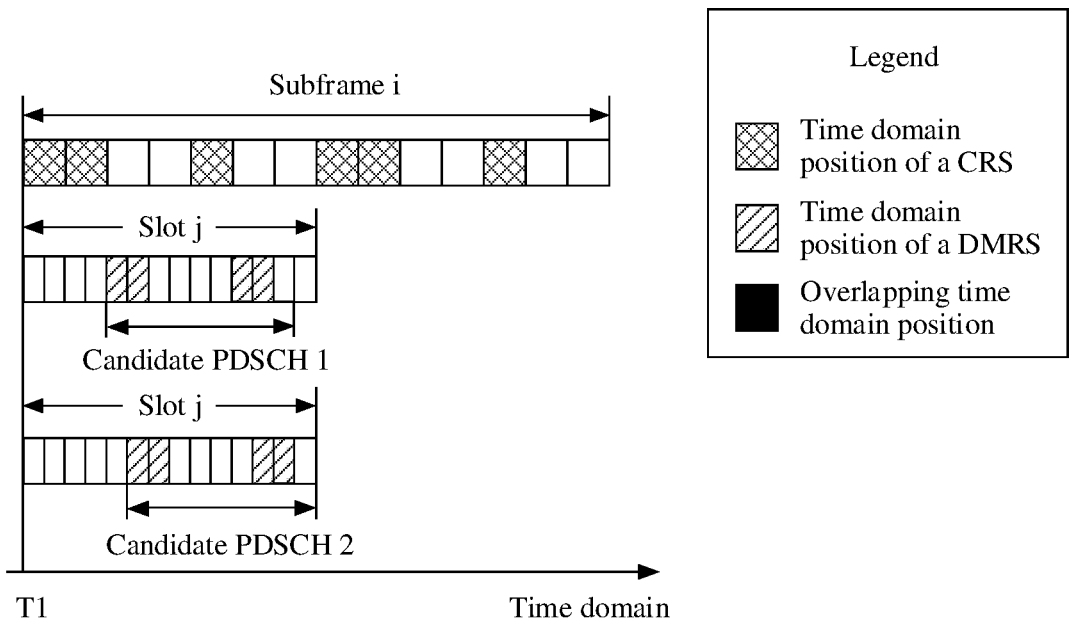
Figure 17E:
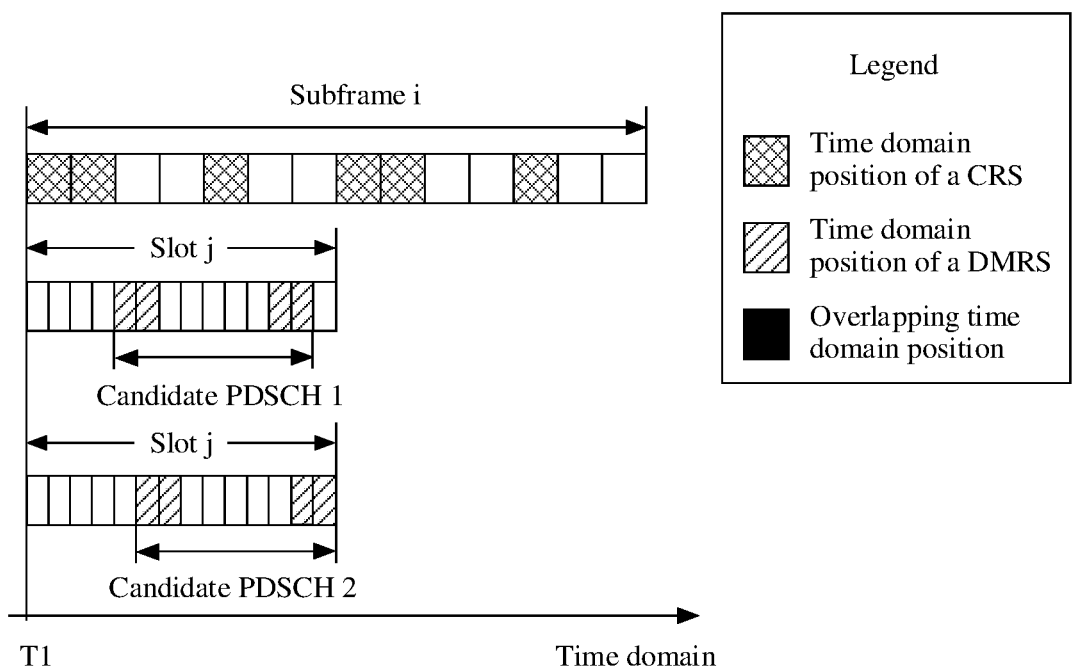
Figure 17F:
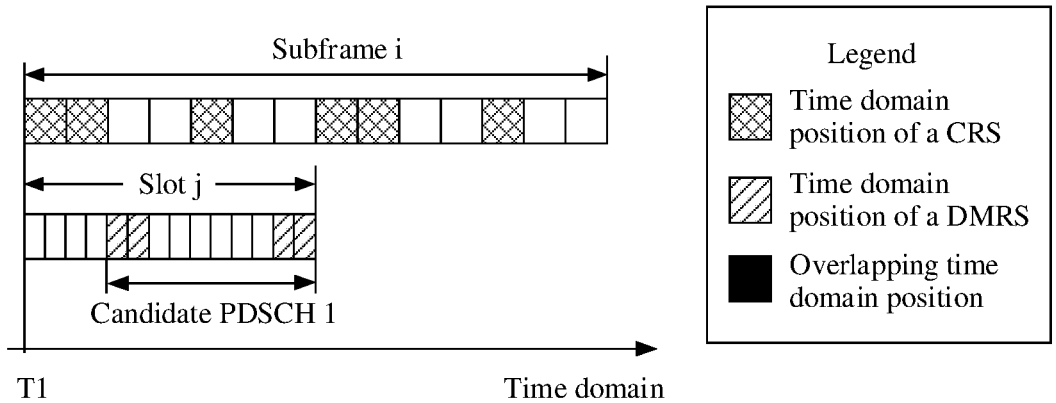

A two-symbol DMRS is used as an example. FIG. 17A to FIG. 17E are schematic diagrams of a time domain position of a DMRS set on a candidate PDSCH when a frame structure parameter corresponding to the DMRS set is a 30 kHz subcarrier spacing, a frame structure parameter corresponding to a CRS set is a 15 kHz subcarrier spacing, a time domain position, on a subframe i, of each CRS in the CRS set may be shown in B in FIG. 9, a value of N is 2, a nine-symbol PDSCH is scheduled in a slot j, $\Delta l=3$ to 7, and a start symbol of a PDSCH does not overlap a time domain position of the CRS set. FIG. 17F is a schematic diagram of a time domain position of a DMRS set on a candidate PDSCH when a 10-symbol PDSCH is scheduled in a slot j, $\Delta l=8$, and a start symbol of a PDSCH does not overlap a time domain position of a CRS set.

With reference to FIG. 14A to FIG. 14F, FIG. 15A to FIG. 15F, FIG. 16A to FIG. 16F, and FIG. 17A to FIG. 17F, when a value of N is 2, the frame structure parameters corresponding to the DMRS set are the 15 kHz subcarrier spacing and the 30 kHz subcarrier spacing, the duration L of the PDSCH is 9 or 10, and $\Delta l$ has different values, statistics about the quantity of candidate PDSCHs that meet the first condition are shown in Table 5.

TABLE 5

| | 15 kHz subcarrier spacing | | | | 30 kHz subcarrier spacing | | | |
| --- | --- | --- | --- | --- | --- | --- | --- | --- |
| | A quantity of antenna ports is 2 | | A quantity of antenna ports is 4 | | A quantity of antenna ports is 2 | | A quantity of antenna ports is 4 | |
| $\Delta l$ | L = 9 | L = 10 | L = 9 | L = 10 | L = 9 | L = 10 | L = 9 | L = 10 |
| 3 | 2 | 1 | 1 | 1 | 2 | 2 | 0 | 0 |
| 4 | 2 | 1 | 1 | 0 | 1 | 1 | 0 | 0 |
| 5 | 0 | 0 | 0 | 0 | 1 | 0 | 0 | 0 |
| 6 | 1 | 1 | 0 | 0 | 2 | 1 | 2 | 1 |
| 7 | 3 | 2 | 2 | 1 | 3 | 2 | 2 | 1 |
| 8 | — | 1 | — | 0 | — | 3 | — | 1 |

According to Table 5, a value of the first threshold may be set based on an actual situation. For example, the value of the first threshold is 1. For the 1.5 kHz subcarrier spacing, when $\Delta l=7$, the duration L of the PDSCH is nine or 10 symbols, and the quantity of antenna ports of the CRS is 2 or 4, the quantity of candidate PDSCHs that meet the first condition is greater than or equal to the first threshold. Therefore, the time domain position of the DMRS set on the PDSCH may be defined as the start symbol $l_0$ of the PDSCH and a symbol $l_0+7$ of the PDSCH in a communications protocol. For example, the time domain position of the DMRS set on the PDSCH may be defined as the start symbol $l_0$ of the PDSCH and the symbol $l_0+7$ of the PDSCH in the communications protocol in the following manner, including a PDSCH mapping type being a type B, L being 9, $l_0$ being 0, $l_0+\Delta l$, and $\Delta l$ being 7, or a PDSCH mapping type being a type B, L being 10, $l_0$ being 0, $l_0+\Delta l$, and $\Delta l$ being 7.

In this case, for the 15 kHz subcarrier spacing, the time domain position, indicated by the first indication information, of the DMRS set on the PDSCH is the start symbol $l_0$ of the PDSCH and the symbol $l_0+7$ of the PDSCH.

For example, the value of the first threshold is 1. For the 30 kHz subcarrier spacing, when $\Delta l=6$ or 7, the duration L of the PDSCH is nine or 10 symbols, and the quantity of antenna ports of the CRS is 2 or 4, the quantity of candidate PDSCHs that meet the first condition is greater than or equal to the first threshold. Therefore, the time domain position of the DMRS set on the PDSCH may be defined as the start symbol $l_0$ and a symbol $l_0+1$ of the PDSCH and the symbol $l_0+7$ and a symbol $l_0+8$ of the PDSCH in a communications protocol.

The duration L of the PDSCH is 10, and the value of the first threshold is 1. In this case, for the 30 kHz subcarrier spacing, when $\Delta l=8$, and the quantity of antenna ports of the CRS is 2 or 4, the quantity of candidate PDSCHs that meet the first condition is greater than or equal to the first threshold. Therefore, the time domain position of the DMRS set on the PDSCH may be defined as the start symbol $l_0$ and a symbol $l_0+1$ of the PDSCH and a symbol $l_0+8$ and a symbol $l_0+9$ of the PDSCH in a communications protocol.

In addition, alternatively, a time domain position of a DMRS set on a PDSCH may be unified for different subcarrier spacings. For example, a value of the first threshold is 1. For a 15 kHz subcarrier spacing and a 30 kHz subcarrier spacing, when $\Delta l=7$, a quantity of candidate PDSCHs that meet a first condition is greater than or equal to the first threshold. Therefore, the time domain position of the DMRS set on the PDSCH may be defined as the start symbol $l_0$ and the $(l_0+1)^{th}$ symbol of the PDSCH and a symbol $l_0+7$ and a symbol $l_0+8$ of the PDSCH in a communications protocol. In this case, regardless of whether the 15 kHz subcarrier spacing or the 30 kHz subcarrier spacing is used, when a nine-symbol PDSCH or a 10-symbol PDSCH is scheduled in the slot j, the time domain position of the DMRS set on the PDSCH is the start symbol $l_0$ and the symbol $l_0+1$ of the PDSCH and the symbol $l_0+7$ and the symbol $l_0+8$ of the PDSCH.

For related implementation when a value of N is 3 or 4, refer to related descriptions in the one-symbol DMRS. Details are not described herein again.

Figure 18:
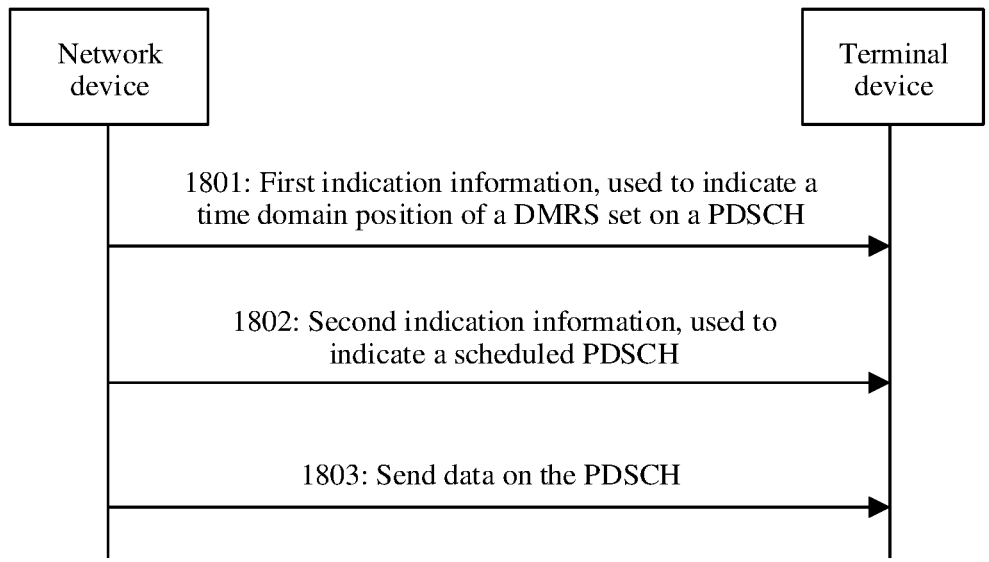
FIG. 18 is a schematic flowchart of another communication method according to an embodiment of this application.

Based on the foregoing embodiments, as shown in FIG. 18, an embodiment of this application further provides a communication method. The communication method specifically includes the following steps.

1801: A network device sends first indication information to a terminal device. The first indication information is used to indicate a time domain position of a DMRS set on a PDSCH. The DMRS set includes N DMRSs.

1082: The network device sends second indication information to the terminal device. The second indication information is used to indicate a scheduled PDSCH.

1803: The terminal device receives the first indication information and the second indication information, and receives, on the scheduled PDSCH based on the first indication information and the second indication information, data sent by the network device.

When N is 2, and the DMRS set includes a first DMRS and a second DMRS, the first indication information is specifically used to indicate a PDSCH mapping type being a type B, L being 9, $l_0$ being 0, $l_0+\Delta l$, and $\Delta l$ being 7, or a PDSCH mapping type being a type B, L being 9, $l_0$ being 0, $l_0+\Delta l$, and $\Delta l$ being 8, or a PDSCH mapping type being a type B, L being 10, $l_0$ being 0, $l_0+\Delta l$, and $\Delta l$ being 7, or a PDSCH mapping type being a type B, L being 10, $l_0$ being 0, $l_0+\Delta l$, and $\Delta l$ being 8, or a PDSCH mapping type being a type B, L being 10, $l_0$ being 0, $1+\Delta l$, and $\Delta l$ being 9, where L is used to indicate a total quantity of symbols of the PDSCH, $l_0$ is used to indicate a start symbol of the PDSCH, and $l_0$ is used to indicate a start symbol of the first DMRS on the PDSCH, $\Delta l$ is used to indicate a quantity of symbols between the start symbol of the first DMRS and a start symbol of the second DMRS, and $l_0+\Delta l$ is used to indicate the start symbol of the second DMRS on the PDSCH.

When N is 3, the first indication information is specifically used to indicate a PDSCH mapping type being a type B, L being 9, $l_0$ being 0, $l_0+\Delta l_1$, $l_0+\Delta l_2$, $\Delta l_1$ being 2, and $\Delta l_2$ being 7, or a PDSCH mapping type being a type B, L being 9, $l_0$ being 0, $l_0+\Delta l_1$, $l_0+\Delta l_2$, $\Delta l_1$ being 3, and $\Delta l_2$ being 7, or a PDSCH mapping type being a type B, L being 9, $l_0$ being 0, $l_0+\Delta l_1$, $l_0+\Delta l_2$, $\Delta l_1$ being 2, and $\Delta l_2$ being 8, or a PDSCH mapping type being a type B, L being 9, $l_0$ being 0, $l_0+\Delta l_1$, $l_0+\Delta l_2$, $\Delta l_1$ being 3, and $\Delta l_2$ being 8, or a PDSCH mapping type being a type B, L being 10, $l_0$ being 0, $l_0+\Delta l_1$, $l_0+\Delta l_2$, $\Delta l_1$ being 2, and $\Delta l_2$ being 7, or a PDSCH mapping type being a type B, L being 10, $l_0$ being 0, $l_0+\Delta l_1$, $l_0+\Delta l_2$, $\Delta l_1$ being 3, and $\Delta l_2$ being 7, or a PDSCH mapping type being a type B, L being 10, $l_0$ being 0, $l_0+\Delta l_1$, $l_0+\Delta l_2$, $\Delta l_1$ being 2, and $\Delta l_2$ being 8, or a PDSCH mapping type being a type B, L being 10, $l_0$ being 0, $l_0+\Delta l_1$, $l_0+\Delta l_2$, $\Delta l_1$ being 3, and $\Delta l_2$ being 8, where L is used to indicate a total quantity of symbols of the PDSCH, $l_0$ is used to indicate a start symbol of the PDSCH, and $l_0$ is used to indicate a start symbol of the first DMRS on the PDSCH, $\Delta l_1$ is used to indicate a quantity of symbols between the start symbol of the first DMRS and a start symbol of the second DMRS, $\Delta l_2$ is used to indicate a quantity of symbols between the start symbol of the first DMRS and a start symbol of the third DMRS, $l_0+\Delta l_1$ is used to indicate the start symbol of the second DMRS on the PDSCH, and $l_0+\Delta l_2$ is used to indicate the start symbol of the third DMRS on the PDSCH.

When N is 4, the first indication information is specifically used to indicate a PDSCH mapping type being a type B, L being 9, $l_0$ being 0, $l_0+\Delta l_1$, $l_0+\Delta l_2$, $l_0+\Delta l_3$, $\Delta l_1$ being 3, $\Delta l_2$ being 6, and $\Delta l_3$ being 8, or a PDSCH mapping type being a type B, L being 10, $l_0$ being 0, $l_0+\Delta l_1$, $l_0+\Delta l_2$, $l_0+\Delta l_3$, $\Delta l_1$ being 3, $\Delta l_2$ being 6, and $\Delta l_3$ being 8, or a PDSCH mapping type being a type B, L being 9, $l_0$ being 0, $l_0+\Delta l_1$, $l_0+\Delta l_2$, $l_0+\Delta l_3$, $\Delta l_1$ being 2, $\Delta l_2$ being 4, and $\Delta l_3$ being 7, or a PDSCH mapping type being a type B, L being 10, $l_0$ being 0, $l_0+\Delta l_1$, $l_0+\Delta l_2$, $l_0+\Delta l_3$, $\Delta l_1$ being 2, $\Delta l_2$ being 4, and $\Delta l_3$ being 7, where L is used to indicate a total quantity of symbols of the PDSCH, $l_0$ is used to indicate a start symbol of the PDSCH, and $l_0$ is used to indicate a start symbol of the first DMRS on the PDSCH, $\Delta l_1$ is used to indicate a quantity of symbols between the start symbol of the first DMRS and a start symbol of the second DMRS, $\Delta l_2$ is used to indicate a quantity of symbols between the start symbol of the first DMRS and a start symbol of the third DMRS, $\Delta l_3$ is used to indicate a quantity of symbols between the start symbol of the first DMRS and a start symbol of the fourth DMRS, $l_0+\Delta l_1$ is used to indicate the start symbol of the second DMRS on the PDSCH, $l_0+\Delta l_2$ is used to indicate the start symbol of the third DMRS on the PDSCH, and $l_0+\Delta l_3$ is used to indicate the start symbol of the fourth DMRS on the PDSCH.

In FIG. 18, the time domain position of the DMRS set on the PDSCH is predefined in a protocol. For a related predefinition manner, refer to the foregoing related descriptions. Details are not described herein again.

The embodiments of this application may be used separately, or may be used in combination, to achieve different technical effects.

In the embodiments provided in this application, the communication method provided in the embodiments of this application is described from a perspective in which the terminal device is used as an execution body. To implement functions in the communication method provided in the embodiments of this application, the terminal device may include a hardware structure and/or a software module, and implement the functions in a form of the hardware structure, the software module, or a combination of the hardware structure and the software module. Whether a function in the foregoing functions is performed by the hardware structure, the software module, or the combination of the hardware structure and the software module depends on particular applications and design constraints of the technical solutions.

Figure 19:
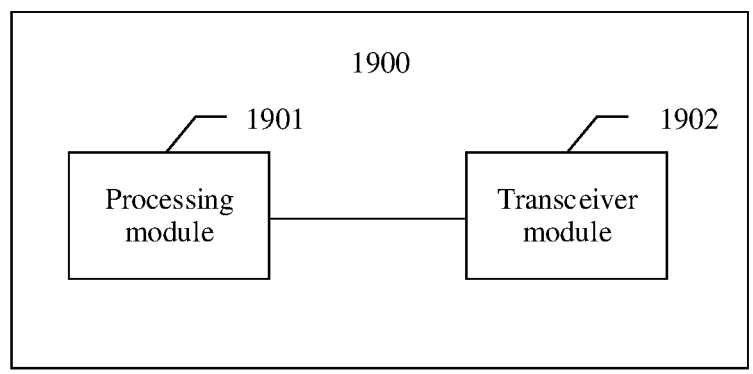
FIG. 19 is a schematic structural diagram of a communications apparatus according to an embodiment of this application.

Same as the foregoing concept, as shown in FIG. 19, an embodiment of this application further provides an apparatus 1900. The apparatus 1900 includes a transceiver module 1902 and a processing module 1901.

In an example, the apparatus 1900 is configured to implement a function of the terminal device in the foregoing methods. The apparatus 1900 may be a terminal device or an apparatus in a terminal device. The apparatus may be a chip system. In this embodiment of this application, the chip system may include a chip, or may include a chip and another discrete component.

The processing module 1901 is configured to receive data from a network device through the transceiver module 1902 based on first indication information and second indication information. The transceiver module 1902 is configured to: receive the first indication information from the network device, or receive the second indication information from the network device.

In an example, the apparatus 1900 is configured to implement a function of the network device in the foregoing methods. The apparatus 1900 may be a network device or an apparatus in a second terminal device. The apparatus may be a chip system. In this embodiment of this application, the chip system may include a chip, or may include a chip and another discrete component.

The transceiver module 1902 is configured to: send first indication information to a terminal device, send second indication information to a terminal device, or send data to a terminal device. The processing module 1901 is configured to: schedule the data to a PDSCH indicated by the second indication information, and send the data to the terminal device through the transceiver module 1902.

For a specific execution process of the processing module 1901 and the transceiver module 1902, refer to the descriptions in the foregoing method embodiments. Division into modules in the embodiments of this application is an example, is merely logical function division, and may be other division during actual implementation. In addition, function modules in the embodiments of this application may be integrated into one processor, or each of the modules may exist alone physically, or two or more modules may be integrated into one module. The integrated module may be implemented in a form of hardware, or may be implemented in a form of a software function module.

Figure 20:
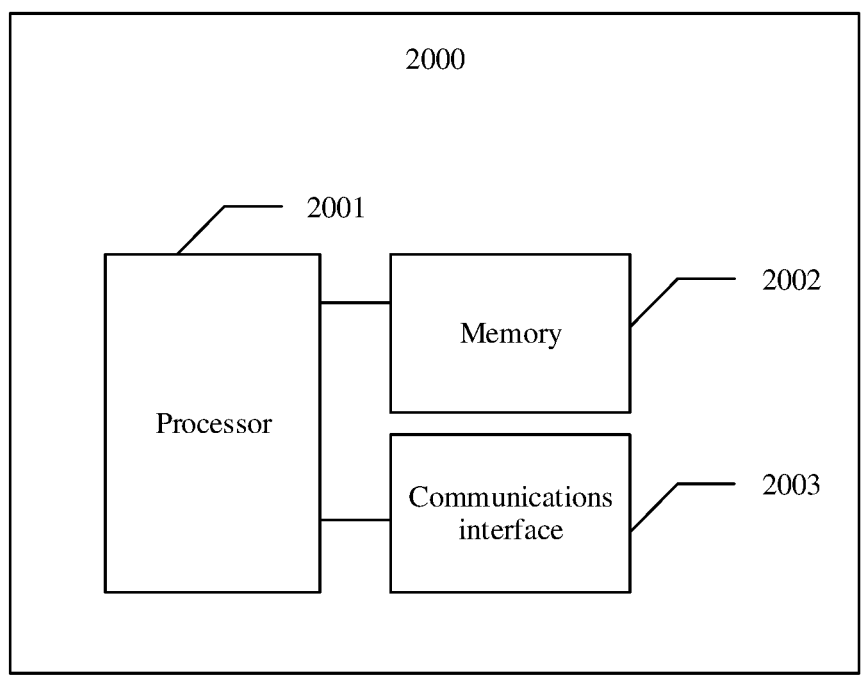
FIG. 20 is a schematic structural diagram of another communications apparatus according to an embodiment of this application.

Same as the foregoing concept, as shown in FIG. 20, an embodiment of this application further provides an apparatus 2000.

In an example, the apparatus 2000 is configured to implement a function of the terminal device in the foregoing methods. The apparatus 2000 may be a terminal device or an apparatus in a terminal device. The apparatus 2000 includes at least one processor 2001, configured to implement a function of the terminal device in the foregoing methods. For example, the processor 2001 may be configured to receive data from a network device based on first indication information and second indication information. For details, refer to detailed descriptions in the methods. Details are not described herein again.

In some embodiments, the apparatus 2000 may further include at least one memory 2002, configured to store a program instruction and/or data. The memory 2002 is coupled to the processor 2001. The coupling in this embodiment of this application may be indirect coupling or a communication connection between apparatuses, units, or modules in an electrical form, a mechanical form, or another form, and is used for information exchange between the apparatuses, the units, or the modules. In another implementation, the memory 2002 may alternatively be located outside the apparatus 2000. The processor 2001 may operate in collaboration with the memory 2002. The processor 2001 may execute the program instruction stored in the memory 2002. At least one of the at least one memory may be included in the processor.

In some embodiments, the apparatus 2000 may further include a communications interface 2003, configured to communicate with another device through a transmission medium, so that an apparatus in the apparatus 2000 can communicate with the another device. For example, the communications interface 2003 may be a transceiver, a circuit, a bus, a module, or another type of communications interface, and the another device may be a second terminal device or a network device. The processor 2001 receives and sends data through the communications interface 2003, and is configured to implement the method in the foregoing embodiments. For example, the communications interface 2003 may be configured to receive the first indication information, the second indication information, the data, or the like sent by the network device.

In an example, the apparatus 2000 is configured to implement a function of the network device in the foregoing methods. The apparatus 2000 may be a network device or an apparatus in a network device. The apparatus 2000 includes at least one processor 2001, configured to implement a function of the network device in the foregoing methods. For example, the processor 2001 may schedule data to a PDSCH indicated by second indication information, and send the data to a terminal device. For details, refer to detailed descriptions in the methods. Details are not described herein again.

In some embodiments, the apparatus 2000 may further include at least one memory 2002, configured to store a program instruction and/or data. The memory 2002 is coupled to the processor 2001. The coupling in this embodiment of this application may be indirect coupling or a communication connection between apparatuses, units, or modules in an electrical form, a mechanical form, or another form, and is used for information exchange between the apparatuses, the units, or the modules. In another implementation, the memory 2002 may alternatively be located outside the apparatus 2000. The processor 2001 may operate in collaboration with the memory 2002. The processor 2001 may execute the program instruction stored in the memory 2002. At least one of the at least one memory may be included in the processor.

In some embodiments, the apparatus 2000 may further include a communications interface 2003, configured to communicate with another device through a transmission medium, so that an apparatus in the apparatus 2000 can communicate with the another device. For example, the communications interface 2003 may be a transceiver, a circuit, a bus, a module, or another type of communications interface, and the another device may be a second terminal device or a network device. The processor 2001 receives and sends data through the communications interface 2003, and is configured to implement the method in the foregoing embodiments. For example, the communications interface 2003 may be configured to send first indication information, second indication information, or data to the terminal device.

In this embodiment of this application, a connection medium between the communications interface 2003, the processor 2001, and the memory 2002 is not limited. For example, in this embodiment of this application, in FIG. 18, the memory 2002, the processor 2001, and the communications interface 2003 may be connected by using a bus. The bus may be classified into an address bus, a data bus, a control bus, and the like.

In this embodiment of this application, the processor may be a general-purpose processor, a digital signal processor, an application-specific integrated circuit, a field programmable gate array or another programmable logic device, a discrete gate or a transistor logic device, or a discrete hardware component, and may implement or perform the methods, the steps, and logical block diagrams disclosed in the embodiments of this application. The general-purpose processor may be a microprocessor, any conventional processor, or the like. The steps in the methods disclosed with reference to the embodiments of this application may be directly performed and completed through a hardware processor, or may be performed and completed through a combination of hardware in the processor and a software module.

In the embodiments of this application, the memory may be a nonvolatile memory, such as a hard disk drive (HDD) or a solid-state drive (SSD), or may be a volatile memory, such as a random access memory (RAM). The memory is any other medium that can be used to carry or store expected program code in a form of an instruction or a data structure and that can be accessed by a computer, but is not limited thereto. The memory in this embodiment of this application may alternatively be a circuit or any other apparatus that can implement a storage function, and is configured to store a program instruction and/or data.

All or some of the methods provided in the embodiments of this application may be implemented by using software, hardware, firmware, or any combination thereof. When software is used for implementation, all or some of the embodiments may be implemented in a form of a computer program product. The computer program product includes one or more computer instructions. When the computer program instructions are loaded and executed on a computer, all or some of the procedures or the functions according to the embodiments of the present invention are generated. The computer may be a general-purpose computer, a dedicated computer, a computer network, a network device, user equipment, or another programmable apparatus. The computer instructions may be stored in a computer-readable storage medium, or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

Clearly, a person skilled in the art can make various modifications and variations to this application without departing from the scope of this application. In this way, if these modifications and variations to this application fall within the scope of the claims of this application and their equivalent technologies, this application is also intended to cover these modifications and variations.

What is claimed is:

1. A method, comprising:
receiving first indication information from a network device, wherein the first indication information indicates a time domain position of a demodulation reference signal (DMRS) set on a physical downlink shared channel (PDSCH), and wherein the DMRS set comprises N DMRSs, and wherein N is a positive integer; and
receiving, on the PDSCH based on the first indication information, data sent by the network device;
wherein:
when N is 2, when the DMRS set comprises a first DMRS and a second DMRS, and when a length of the first DMRS and a length of the second DMRS in time domain each are one symbol, the first indication information indicates:
a PDSCH mapping type being a type B, L being 10, $l_0$ being 0, and $\Delta l_1$ being 7; or
when N is 3, when the DMRS set comprises a first DMRS, a second DMRS, and a third DMRS, and when a length of the first DMRS, a length of the second DMRS, and a length of the third DMRS in time domain each are one symbol, the first indication information indicates
a PDSCH mapping type being a type B, L being 9, $l_0$ being 0, $\Delta l_1$ being 4, and $\Delta l_2$ being 7; or
a PDSCH mapping type being a type B, L being 10, $l_0$ being 0, $\Delta l_1$ being 4, and $\Delta l_2$ being 7; and
wherein L indicates a total quantity of symbols of the PDSCH, wherein $l_0$ indicates a position of a start symbol of the first DMRS on the PDSCH, wherein $\Delta l_1$ indicates a quantity of symbols between a start symbol of the PDSCH and a start symbol of the second DMRS on the PDSCH, and wherein $\Delta l_2$ indicates a quantity of symbols between the start symbol of the PDSCH and a start symbol of the third DMRS on the PDSCH.

2. The method according to claim 1, further comprising:
receiving second indication information sent by the network device, wherein the second indication information is used to schedule the PDSCH.

3. The method according to claim 1, wherein $l_0+\Delta l_1$ indicates the start symbol of the second DMRS on the PDSCH, and wherein $l_0+412$ indicates the start symbol of the third DMRS on the PDSCH.

4. The method according to claim 1, wherein the start symbol of the first DMRS on the PDSCH is the start symbol of the PDSCH.

5. The method according to claim 1, wherein $l_0$ indicates a quantity of symbols between the start symbol of the PDSCH and the start symbol of the first DMRS on the PDSCH.

6. The method according to claim 1, wherein a frame structure parameter corresponding to the DMRS set is at least one of a 15 kHz subcarrier spacing, a 30 kHz subcarrier spacing, a 60 kHz subcarrier spacing, or a 120 kHz subcarrier spacing.

7. The method of claim 1, wherein the first indication information is based on a mapping table, the mapping table comprising:

a first mapping entry mapping N being 2, the length of the first DMRS and the length of the second DMRS in the time domain each being one symbol, and the PDSCH mapping type being the type B, L being 10 to $l_0$ being 0 and $\Delta l_1$ being 7, a second mapping entry mapping N being 3, the length of the first DMRS, the length of the second DMRS, and the length of the third DMRS in the time domain each being one symbol, and the PDSCH mapping type being the type B, L being 9 to $l_0$ being 0, $\Delta l_1$ being 4, and $\Delta l_2$ being 7, and a third mapping entry mapping N being 3, the length of the first DMRS, the length of the second DMRS, and the length of the third DMRS in the time domain each being one symbol, and the PDSCH mapping type being the type B, L being 10 to $l_0$ being 0, $\Delta l_1$ being 4, and 412 being 7.

8. A method, comprising
sending first indication information to a terminal device, wherein the first indication information indicates a time domain position of a demodulation reference signal (DMRS) set on a physical downlink shared channel (PDSCH), and wherein the DMRS set comprises N DMRSs, and wherein N is a positive integer; and
sending data to the terminal device on the PDSCH;
wherein:
when N is 2, when the DMRS set comprises a first DMRS and a second DMRS, and when a length of the first DMRS and a length of the second DMRS in time domain each are one symbol, the first indication information indicates:
a PDSCH mapping type being a type B, L being 10, $l_0$ being 0, and $\Delta l_1$ being 7; or
when N is 3, when the DMRS set comprises a first DMRS, a second DMRS, and a third DMRS, and when a length of the first DMRS, a length of the second DMRS, and a length of the third DMRS in time domain each are one symbol, the first indication information indicates at least one of:
a PDSCH mapping type being a type B, L being 9, $l_0$ being 0, All being 4, and $\Delta l_2$ being 7; or
a PDSCH mapping type being a type B, L being 10, $l_0$ being 0, $\Delta l_1$ being 4, and $\Delta l_2$ being 7; and
wherein L indicates a total quantity of symbols of the PDSCH, $l_0$ indicates a position of a start symbol of the first DMRS on the PDSCH, $\Delta l_1$ indicates a quantity of symbols between a start symbol of the PDSCH and a start symbol of the second DMRS on the PDSCH, and $\Delta l_2$ indicates a quantity of symbols between the start symbol of the PDSCH and a start symbol of the third DMRS on the PDSCH.

9. The method according to claim 8, further comprising:
sending second indication information to the terminal device, wherein the second indication information is used to schedule the PDSCH.

10. The method according to claim 8, wherein $l_0+\Delta l_1$ indicates the start symbol of the second DMRS on the PDSCH, and wherein $l_0+\Delta l_2$ indicates the start symbol of the third DMRS on the PDSCH.

11. The method according to claim 8, wherein the start symbol of the first DMRS on the PDSCH is the start symbol of the PDSCH.

12. The method according to claim 8, wherein $l_0$ indicates a quantity of symbols between the start symbol of the PDSCH and the start symbol of the first DMRS on the PDSCH.

13. The method according to claim 8, wherein a frame structure parameter corresponding to the DMRS set is one of a 15 kHz subcarrier spacing, a 30 kHz subcarrier spacing, a 60 kHz subcarrier spacing, or a 120 kHz subcarrier spacing.

14. A terminal device comprising:
at least one processor; and
at least one non-transitory memory storing a program for execution by the at least one processor, the program including instructions to cause the terminal device to perform operations including:
receiving first indication information from a network device, wherein the first indication information indicates a time domain position of a demodulation reference signal (DMRS) set on a physical downlink shared channel (PDSCH), and wherein the DMRS set comprises N DMRSs, and wherein N is a positive integer; and
receiving, on the PDSCH based on the first indication information, data sent by the network device;
wherein:
when N is 2, when the DMRS set comprises a first DMRS and a second DMRS, and when a length of the first DMRS and a length of the second DMRS in time domain each are one symbol, the first indication information indicates:
a PDSCH mapping type being a type B, L being 10, $l_0$ being 0, and $\Delta l_1$ being 7; or
when N is 3, when the DMRS set comprises a first DMRS, a second DMRS, and a third DMRS, and when a length of the first DMRS, a length of the second DMRS, and a length of the third DMRS in time domain each are one symbol, the first indication information indicates at least one of:
a PDSCH mapping type being a type B, L being 10, $l_0$ being 0, $\Delta l_1$ being 4, and $\Delta l_2$ being 7; and
wherein L indicates a total quantity of symbols of the PDSCH, wherein $l_0$ indicates a position of a start symbol of the first DMRS on the PDSCH, wherein $\Delta l_1$ indicates a quantity of symbols between a start symbol of the PDSCH and a start symbol of the second DMRS on the PDSCH, and wherein $\Delta l_2$ indicates a quantity of symbols between the start symbol of the PDSCH and a start symbol of the third DMRS on the PDSCH.

15. The terminal device according to claim 14, wherein $l_0+\Delta l_1$ indicates the start symbol of the second DMRS on the PDSCH, and wherein $l_0+\Delta l_2$ indicates the start symbol of the third DMRS on the PDSCH.

16. The terminal device according to claim 14, wherein the start symbol of the first DMRS on the PDSCH is the start symbol of the PDSCH.

17. The terminal device according to claim 14, wherein $l_0$ indicates a quantity of symbols between the start symbol of the PDSCH and the start symbol of the first DMRS on the PDSCH.

18. The terminal device according to claim 14, wherein a frame structure parameter corresponding to the DMRS set is at least one of a 15 kHz subcarrier spacing, a 30 kHz subcarrier spacing, a 60 kHz subcarrier spacing, or a 120 kHz subcarrier spacing.

19. A network device comprising:
at least one processor; and
at least one non-transitory memory storing a program for execution by the at least one processor, the program including instructions to cause the network device to perform operations including:
sending first indication information to a terminal device, wherein the first indication information indicates a time domain position of a demodulation reference signal (DMRS) set on a physical downlink shared channel (PDSCH), and wherein the DMRS set comprises N DMRSs, and wherein N is a positive integer; and sending data to the terminal device on the PDSCH;

wherein:

when N is 2, when the DMRS set comprises a first DMRS and a second DMRS, and when a length of the first DMRS and a length of the second DMRS in time domain each are one symbol, the first indication information indicates at least one of:

a PDSCH mapping type being a type B, L being 10, $l_0$ being 0, and $\Delta l_1$ being 7; or when N is 3, when the DMRS set comprises a first DMRS, a second DMRS, and a third DMRS, and when a length of the first DMRS, a length of the second DMRS, and a length of the third DMRS in time domain each are one symbol, the first indication information indicates at least one of:

a PDSCH mapping type being a type B, L being 9, $l_0$ being 0, Ali being 4, and $\Delta l_2$ being 7; or a PDSCH mapping type being a type B, L being 10, $l_0$ being 0, $\Delta l_1$ being 4, and $\Delta l_2$ being 7; and wherein L indicates a total quantity of symbols of the PDSCH, wherein $l_0$ is used to indicate a position of a start symbol of the first DMRS on the PDSCH, wherein $\Delta l_1$ indicates a quantity of symbols between a start symbol of the PDSCH and a start symbol of the second DMRS on the PDSCH, and wherein $\Delta l_2$ indicates a quantity of symbols between the start symbol of the PDSCH and a start symbol of the third DMRS on the PDSCH.

20. The network device according to claim 19, the operations further comprising:

sending second indication information to the terminal device, wherein the second indication information is used to schedule the PDSCH.

21. The network device according to claim 19, wherein a frame structure parameter corresponding to the DMRS set is at least one of a 15 kHz subcarrier spacing, a 30 kHz subcarrier spacing, a 60 kHz subcarrier spacing, or a 120 kHz subcarrier spacing.

* * * * *

UNITED STATES PATENT AND TRADEMARK OFFICE
CERTIFICATE OF CORRECTION

PATENT NO. : 12,335,945 B2
APPLICATION NO. : 17/672037
DATED : June 17, 2025
INVENTOR(S) : Liu et al.

It is certified that error appears in the above-identified patent and that said Letters Patent is hereby corrected as shown below:

In the Claims

In Column 42, in Claim 1, Line 13, delete "on" and insert -- for --.

In Column 42, in Claim 1, Line 32, after "indicates" insert -- at least one of: --.

In Column 42, in Claim 1, Line 39, delete "on" and insert -- for --.

In Column 42, in Claim 1, Line 42, delete "on" and insert -- for --.

In Column 42, in Claim 1, Line 44, delete "on" and insert -- for --.

In Column 42, in Claim 3, Line 50, delete "on" and insert -- for --.

In Column 42, in Claim 3, Line 51, delete "$l_0+412$" and insert -- $l_0+\Delta l_2$ --.

In Column 42, in Claim 3, Line 52, delete "on" and insert -- for --.

In Column 42, in Claim 4, Line 54, delete "on" and insert -- for --.

In Column 42, in Claim 5, Line 58, delete "on" and insert -- for --.

In Column 43, in Claim 7, Line 17, delete "412" and insert -- $\Delta l_2$ --.

In Column 43, in Claim 8, Line 23, delete "on" and insert -- for --.

In Column 43, in Claim 8, Line 42, delete "All" and insert -- $\Delta l_1$ --.

In Column 43, in Claim 8, Line 47, delete "on" and insert -- for --.

Signed and Sealed this
Twenty-second Day of July, 2025

Coke Morgan Stewart
*Acting Director of the United States Patent and Trademark Office*

CERTIFICATE OF CORRECTION (continued)
U.S. Pat. No. 12,335,945 B2

In Column 43, in Claim 8, Line 49, delete "on" and insert -- for --.

In Column 43, in Claim 8, Line 52, delete "on" and insert -- for --.

In Column 43, in Claim 10, Line 58, delete "on" and insert -- for --.

In Column 43, in Claim 10, Line 60, delete "on" and insert -- for --.

In Column 43, in Claim 11, Line 62, delete "on" and insert -- for --.

In Column 43, in Claim 12, Line 66, delete "on" and insert -- for --.

In Column 44, in Claim 14, Line 5, delete "A" and insert -- An apparatus that is a terminal device or a chip system in the --.

In Column 44, in Claim 14, Line 5, delete "device" and insert -- device, --.

In Column 44, in Claim 14, Line 14, delete "on" and insert -- for --.

In Column 44, in Claim 14, Line 33, after "one of:" insert -- a PDSCH mapping type being a type B, L being 9, $l_0$ being 0, $\Delta l_1$ being 4, and $\Delta l_2$ being 7; or --.

In Column 44, in Claim 14, Line 38, delete "on" and insert -- for --.

In Column 44, in Claim 14, Line 41, delete "on" and insert -- for --.

In Column 44, in Claim 14, Line 43, delete "on" and insert -- for --.

In Column 44, in Claim 15, Line 44, delete "terminal device" and insert -- apparatus --.

In Column 44, in Claim 15, Line 45, delete "on" and insert -- for --.

In Column 44, in Claim 15, Line 47, delete "on" and insert -- for --.

In Column 44, in Claim 16, Line 48, delete "terminal device" and insert -- apparatus --.

In Column 44, in Claim 16, Line 49, delete "on" and insert -- for --.

In Column 44, in Claim 17, Line 51, delete "terminal device" and insert -- apparatus --.

In Column 44, in Claim 17, Line 53, delete "on" and insert -- for --.

In Column 44, in Claim 18, Line 55, delete "terminal device" and insert -- apparatus --.

In Column 44, in Claim 19, Line 60, delete "A" and insert -- An apparatus that is a network device or a chip system in the --.

CERTIFICATE OF CORRECTION (continued)
U.S. Pat. No. 12,335,945 B2

In Column 45, in Claim 19, Line 2, delete "on" and insert -- for --.

In Column 45, in Claim 19, Line 11, delete "indicates at least one of:" and insert -- indicates: --.

In Column 45, in Claim 19, Line 22, delete "Ali" and insert -- $\Delta l_1$ --.

In Column 46, in Claim 19, Line 5, delete "on" and insert -- for --.

In Column 46, in Claim 19, Line 8, delete "on" and insert -- for --.

In Column 46, in Claim 19, Line 10, delete "on" and insert -- for --.

In Column 46, in Claim 20, Line 12, delete "network device" and insert -- apparatus --.

In Column 46, in Claim 21, Line 17, delete "network device" and insert -- apparatus --.